(12) United States Patent
Dunnill et al.

(10) Patent No.: US 7,099,721 B2
(45) Date of Patent: Aug. 29, 2006

(54) METHOD AND APPARATUS FOR PRODUCING A BIOMATERIAL PRODUCT

(75) Inventors: Peter Dunnill, London (GB); Mike Hoare, London (GB); Nigel Titchener-Hooker, London (GB)

(73) Assignee: University College London, London (GB)

( * ) Notice: Subject to any disclaimer, the term of this patent is extended or adjusted under 35 U.S.C. 154(b) by 141 days.

(21) Appl. No.: 10/312,447

(22) PCT Filed: Jun. 26, 2001

(86) PCT No.: PCT/GB01/02841

§ 371 (c)(1),
(2), (4) Date: Jul. 28, 2003

(87) PCT Pub. No.: WO02/01303

PCT Pub. Date: Jan. 3, 2002

(65) Prior Publication Data

US 2004/0030516 A1  Feb. 12, 2004

(30) Foreign Application Priority Data

Jun. 27, 2000  (GB) ................... 0015743.8

(51) Int. Cl.
*G05B 13/02* (2006.01)

(52) U.S. Cl. .............. 700/73; 700/30; 700/31; 700/117; 700/266; 700/267; 700/271; 700/273; 703/2; 703/13; 703/18; 703/3

(58) Field of Classification Search .......... 700/28, 700/29, 30, 31, 73, 117, 266, 267, 268, 271, 700/273; 703/2, 3, 18, 13; 702/19, 22
See application file for complete search history.

(56) References Cited

U.S. PATENT DOCUMENTS

| 5,370,599 | A | * | 12/1994 | Marque et al. | ............... 494/37 |
| 5,666,297 | A | * | 9/1997 | Britt et al. | .................... 703/18 |
| 5,811,255 | A | * | 9/1998 | Hunter et al. | ................ 435/29 |
| 5,862,514 | A | * | 1/1999 | Huse et al. | ................... 702/22 |
| 6,251,657 | B1 | * | 6/2001 | Hunter et al. | .............. 435/264 |

FOREIGN PATENT DOCUMENTS

| EP | 0 640 399 | | 3/1995 |
| EP | 000640399 A2 | * | 3/1995 |
| WO | WO 98/37504 | | 8/1998 |

OTHER PUBLICATIONS

Bulmer et al.; "Computer-Based Simluation of the Recovery of Intracelluar Enzymes and Pilot-Scale Verification"; Biopress Engineering, vol. 15, No. 6, pp. 331-337, (1996).
Mao et al.; "High-Performance Liquid Chromatography of Amino Acids, Peptides and Proteins CXXXIX☆. Impact of Operating Parameters in Large-Scale Chromatography of Proteins"; Journal of Chromatography A, vol. 691, Nos. 1-2, pp. 273-283, (1995).
Clarkson et al.; "A Study of Process Interactions Between Cell Disruption and Debris Clarification Stages in the Recovery of Yeast Intracellular Products"; Biotechnology Progress, vol. 9, No. 5, pp. 462-467, (1993).

(Continued)

*Primary Examiner*—Ramesh Patel
(74) *Attorney, Agent, or Firm*—Finnegan, Henderson, Farabow, Garrett & Dunner, LLP

(57) ABSTRACT

A development tool (2) includes a plurality of measuring tools (71) to (76) and an industrial process simulation device (60). The simulation device (60) simulates a whole industrial scale bioprocess in order to obtain acceptable operating parameters for the industrial scale bioprocess. The measuring tools (71) to (76) enable various significant properties of the biomaterial to be measured and evaluated using only a small test quantity of the biomaterial.

37 Claims, 15 Drawing Sheets

OTHER PUBLICATIONS

Clarkson et al., Modelling and Simulation of Fractional Precipitation—Comparison with Pilot Plant Data, European Symposium on Computer Aided Process Engineering-1, pp. S441-S447.

Lu et al., Simulation as a Tool in Process Design and Management for Production of Intracellular Enzymes, Trans IChemE, vol. 72, Part A, May 1994, pp. 371-376.

Zhou et al., A study of the use of computer simulations for the design of integrated downstream processes, Bioprocess Engineering 16 (1997), pp. 367-374, Springer-Verlag 1997.

Hoare et al., Disruption of Protein Precipitates during Shear in Couette Flow and in Pumps, Ind. Eng. Chem. Fundam., vol. 21, No. 4, 1982, pp. 402-406.

Shamlou et al., Growth-Independent Breakage Frequency of Protein Precipitates in Turbulently Agitated Bioreactors, P. Ayazi Shamlou et al., Chemical Engineering Science, vol. 49, No. 16, pp. 2647-2656, 1994.

Virkar et al., Studies of the Effects of Shear of Globular Proteins: Extension of High Shear Fields and to Pumps, Biotechnology Bioengineering, vol. XXII (1981), pp. 425-429.

Soon et al., Processing of Emulsions using a High Velocity Jet Device, Submission of Paper for the Fluid Mixing VI, Bradford, Jul. 7-8, 1999.

Levy et al., The effects of Material properties and fluid flow intensity on plasmid DNA recovery during cell lysis, Chemical Engineering Science 54 (1999), 3171-3178.

Mannweiler et al., The scale-down of an industrial disc stack centrifuge, Bioprocess Engineering 8 (1992), pp. 19-25.

Maybury et al., The performance of a scaled down industrial disc stack centrifuge with a reduced feed material requirement, Bioprocess Engineering 18 (1998), pp. 191-199.

De Luca et al., A study of the expansion characteristics and transient behaviour of expanded beds of adsorbent particles suitable for bioseparations, Bioseparation 4: pp. 311-318, 1994.

Hearle et al., Quantifying the fouling effects of a biological process stream on chromatographic supports, The 1994 ICHEME Research Event, pp. 174-176.

Yim et al., The Engineering Effects of Fluid Flow on Freely Suspended Biological Macro-Materials and Macromolecules: A Critical Review, Sep. 20, 1998, pp. 1-70.

Theodossiou et al., Methods of enhancing the recovery of plasmid genes from neutralised cell lysate, Bioprocess Engineering 20 (1999) pp. 147-156.

Levy et al., Effect of shear on plasmid DNA in solution, Bioprocess Engineering 20 (1999) pp. 7-13.

Zhou et al., Simulation and optimisation of integrated bioprocesses: a case study, Journal of Chemical Technology and Biotechnology 74: 289-292 (1999).

Siddiqi et al., The effects of fermentation conditions on yeast cell debris particle size distribution during high pressure homogenisation, Bioprocess Engineering 14 (1995) pp. 000-000.

Siddiqi et al., Simulation of Particle Size Distribution Changes Occurring During High-Pressure Disruption of Bakers' Yeast, Biotechnology and Bioengineering, vol. 50, pp. 145-150 (1996).

\* cited by examiner

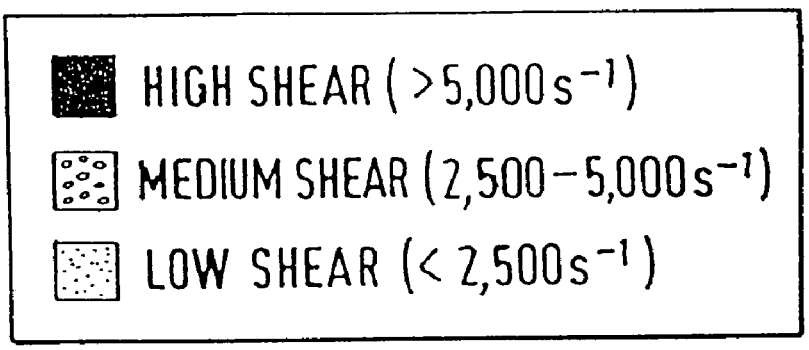
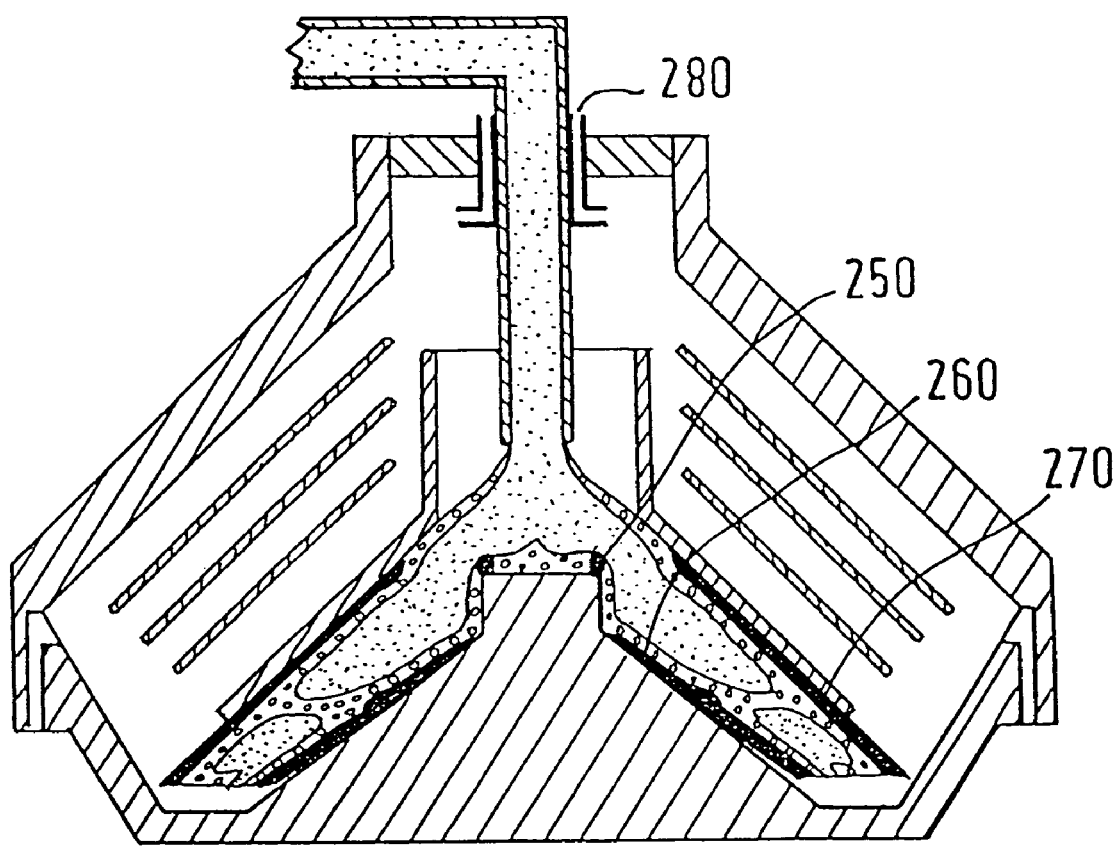
FIG. 4

■ HIGH SHEAR (>5,000s⁻¹)
▨ MEDIUM SHEAR (2,500–5,000s⁻¹)
▧ LOW SHEAR (<2,500s⁻¹)

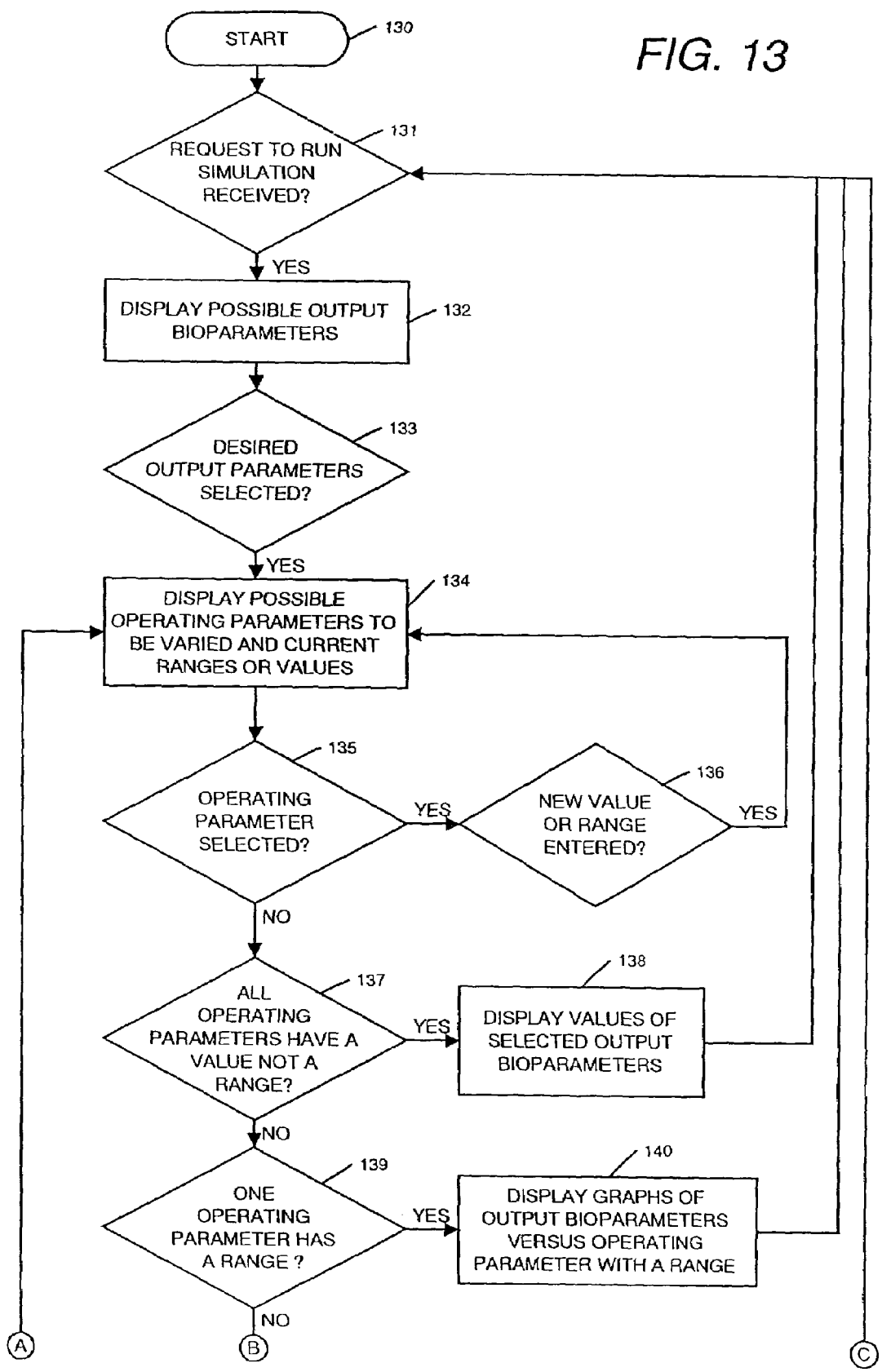

METHOD AND APPARATUS FOR PRODUCING A BIOMATERIAL PRODUCT

The present invention relates to a method of producing a biomaterial product and to a development tool for use in developing an industrial or pilot scale bioprocess.

Conventionally, in order to produce a new biomaterial product (for example an intracellular protein or a DNA plasmid) on an industrial scale (which might for example process 10,000 liters or more of biomaterial in each run), pilot scale trials (which might for example process about 100 liters of biomaterial in each run) are carried out. Various measuring tools are used to determine significant properties of the biomaterial being processed at various stages in the pilot process. From this information, the process engineers may vary operating parameters of the bioprocessing devices used until the pilot process is deemed to be working acceptably well. The biomaterial product may then be produced at an industrial scale by scaling up the acceptable pilot process.

A drawback with this method is the time and expense involved in pilot scale trials in order to develop a new industrial bioprocess. Furthermore, where the bioproduct is destined for medical uses, it is often necessary to obtain regulatory approval for the bioproduct and the regulatory approval is specific to the process by which the bioproduct is manufactured. Since it usually takes some time to obtain regulatory approval for a new bioproduct, any substantial changes to the final process which come about as a result of the pilot scale trials can significantly delay the time to market for the bioproduct.

According to a first aspect of the present invention, there is provided a method for producing a biomaterial product comprising:
(a) performing a series of experiments on biomaterial using scale down devices;
(b) obtaining measurements of one or more properties of the biomaterial using said scale down devices;
(c) modelling the operation of at least one industrial bioprocess device to determine how it modifies one or more properties of a biomaterial in dependence on the way in which the device is operated and in dependence on at least one of the properties of the biomaterial measured in step (b) in order to determine acceptable ways of operating the one or more industrial bioprocess devices; and optionally performing the further steps of:
(d) providing an industrial bioprocess system comprising a plurality of industrial bioprocess devices; and
(e) operating the industrial bioprocess system in the way determined in the modelling step, thereby (obtaining a biomaterial product.

Note, throughout this description, the term biomaterial(s) will be used to refer generally to any material involved in a bioprocess. For example, an initial broth including both nutrient and a cell culture could be classified as biomaterial, as could either the nutrient or the cell culture individually. Similarly, a sludge output from a centrifuge comprising cell debris, or the liquid formerly contained within the cells of a cell culture (often referred to as the supernatant) could also be classified as biomaterials. Furthermore, any combination of the above-described biomaterials could also be described as a biomaterial. The term biomaterial product or bioproduct will be used to refer to the desired end product of a bioprocess and will typically be an enzyme, or a DNA plasmid, for example.

Preferably, the method according to the first aspect of the present invention includes:

using the one or more measurements obtained in step (b) to determine a biomaterial index or a plurality of biomaterial indices relating to the biomaterial, or a component thereof, measured in step (b); and (c).

using the one or more biomaterial indices in step

One of the key features of the processes for producing and processing biological materials is that there are pronounced interactions between the stages. For example, the degree of mechanical disruption of a microbial cell influences the extent of removal of cell debris by solid-liquid separation in a centrifuge. In turn the extent of debris removal affects the degree to which later stage chromatography columns are fouled.

This implies that, to be meaningful, tests on scale down mimics of later stage industrial scale operations must be done with material which has passed through carefully controlled mimics of the earlier stage(s) having comparable effects on the material.

The ability to define indices for characterising the effects of individual operations allows such material to be prepared.

Equally the values for the individual indices can be used by the process models to provide an accurate description of the process.

The term biomaterial index is used to refer to the result of at least one scale down experiment which is designed to mimic at least one aspect of an industrial scale bioprocess. Typical features of a biomaterial index are the dependencies of material properties of the respective biomaterial (or a component thereof), which properties may include size, particle size distribution, viability, biological activity and/or composition, on the extent of, or means of exposure to, at least one aspect of the engineering environment occurring in a stage of an industrial scale process which the scale down experiment is designed to mimic. Preferably, at least one of the following biomaterial indices is determined:

shear index, combined clarification and de-watering index or fouling index. The above-mentioned specific biomaterial indices will be described below.

Preferably, step (c) of modelling one or more industrial bioprocess devices involves using an industrial process simulation device which preferably takes the form of a suitably programmed computer. Preferably, the or each property of the biomaterial measured in step (b) of the first aspect of the present invention, or the or each biomaterial index determined therefrom, is used in generating one or more input biomaterial parameters which are used by the industrial process simulation device.

The present invention enables reliable evaluation of how biomaterials are affected by their interaction with industrial devices and/or how industrial devices deviate from their ideal performance as a result of their interaction with biomaterials. The term ideal performance is intended to denote substantially no incapacity or substantially no improved performance as a result of interaction between the device and a biomaterial.

The term scale down device is used to refer to a device which is able to process small quantities of biomaterial (eg quantities preferably of less than 1 liter, more preferably of the order of tens of milliliters, or even of the order of tens of microliters), and includes conventional laboratory devices such as a laboratory centrifuge, a homogeniser adapted to process small quantities of biomaterial, small chromatography columns (eg having an internal volume of approximately 1 cm$^3$). It also includes biomaterial index-related devices. These are specially designed to mimic at least one significant aspect of an engineering environment occurring in an industrial scale device which does not occur (or which does not occur to the same extent) in the corresponding conventional laboratory device. Such specially designed scale down devices include a scale down rotating disk device which is adapted to mimic the level of shear generated within an industrial scale centrifuge device and other devices such as pumps.

Similarly, the term scale down experiment is used to refer to an experiment performed using one or more scale down devices and involving only a small quantity of (biomaterial (eg preferably less than 1 liter, more preferably of the order of tens of milliliters, or even of the order of tens of microliters). The term scale down experiment is used to refer to both conventional laboratory experiments performed on a biomaterial to determine one or more properties of the biomaterial, and specially designed biomaterial index related experiments which are intended to mimic at least one of, and most preferably to mimic all of, the aspects of an engineering environment occurring within an industrial scale device which significantly impact on the material properties of a biomaterial processed by the industrial scale device.

Preferably, the scale down devices and scale down experiments are used to generate material similar in properties to that which would be obtained in an industrial or pilot scale bioprocess.

An advantage of the first aspect of the present invention is the provision of a systematic way of determining one or more input biomaterial parameters for any given biomaterial for use in a computer simulation of an industrial bioprocess. Furthermore, this can be achieved without having to employ large industrial or pilot scale machinery.

Preferably, the step of generating the input biomaterial parameters includes using one or more scale down device computer models, each such scale down device computer model being adapted to generate one or more input biomaterial parameters on the basis of one or more output biomaterial parameters (whose value or values are preferably able to be ascertained directly from the measurements obtained in step (b) of the first aspect of the present invention discussed above) and one or more operating parameters (which depend on the manner in which the scale down devices are operated). Such a step means that the conditions generated by the scale down device or devices need not correspond exactly to those occurring in the industrial process being modelled. For example, a given biomaterial will behave differently in a rotating disk device which is first filled with the biomaterial to be tested and then started slowly and spun for say tens of seconds at high speed compared to in an industrial centrifuge which is already spinning when the biomaterial to be processed by the centrifuge is fed in at the feed zone; in the industrial centrifuge, the biomaterial is subjected to a very high shear for a very short period of time only, typically a fraction of a second. However, by using a model both of the industrial centrifuge and of the rotating disk device in which both models share (at least some of) the same input biomaterial parameters (for example a shear index or critical shear value), the model of the rotating disk device may be used to obtain a theoretical input biomaterial parameter on the basis of the observed output biomaterial parameters for given operating parameters, which theoretical input biomaterial parameters may be used in a computer model of the industrial process.

Note that this step is particularly useful in the case where an output biomaterial parameter such as the percentage of clarification achieved by a centrifuge is far more readily measurable than an input biomaterial parameter such as particle size distribution or critical shear value. Where an output biomaterial parameter of a first model is used as an input biomaterial parameter of a subsequent downstream model, it may be possible, and advantageous, to determine the value of the input biomaterial parameter to the first model by a 2-stage process in which the output biomaterial parameter of the first model is not measured directly. Instead, only an output parameter of the downstream model is obtained by direct measurement and the intermediate input biomaterial parameter of the downstream model is obtained by running the downstream model backwards, from which the input biomaterial parameter of the first model can be obtained by running the first model backwards. This process may of course be extended to 3 or more stages and a combination of 1, 2 and higher stage processes may advantageously be employed. In this way it is possible to obtain biomaterial parameters with which to set up a computer simulation of a specific industrial process (i.e. one performed on a specific, new biomaterial) using only a few small devices, a small amount of biomaterial and a few simple laboratory measurement techniques. This provides the advantage that the simulation may be set up in a laboratory without requiring the use of any large scale devices. Also, expensive or difficult analysis techniques may be avoided.

According to a second aspect of the present invention, there is provided a method for producing a biomaterial product comprising (i) analysing the engineering environment experienced by biomaterial within at least one stage of an industrial process to identify the aspects of the engineering environment which substantially influence the material properties of the biomaterial;

(ii) subjecting a test quantity of biomaterial to conditions within a scale down device which mimic the aspects of the engineering environment identified in step (i), (iii) analysing the response of the test quantity of biomaterial to the conditions within the scale down device, (iv) determining how best to operate the industrial process to decrease adverse effects, or to increase beneficial effects, caused by the engineering environment experienced by biomaterial in the industrial process; and optionally including the further step of:

(v) performing the industrial process on the basis of determinations made in step (iv), thereby obtaining a biomaterial product.

Note that the method of either the first or the second aspects of the invention may include the additional step of performing pilot scale trials prior to step (v) of performing the industrial process. In such a case, the method has the advantage of significantly reducing the risk of the need for a substantial change to the proposed industrial scale process occurring at the pilot scale trials.

The present inventors have determined a number of features affecting the correct prediction of an industrial scale process on the basis of corresponding conventional laboratory processes including: the significantly greater rate of hydrodynamic shear occurring in a typical industrial scale process; the significantly greater impact of fouling of chromatographic columns occurring within an industrial process compared with a conventional laboratory chromatography experiment; and the amount of solids passing through with the output liquid stream and the amount of liquid centrifuged out with solids during industrial scale centrifugation compared to a conventional laboratory scale centrifugation experiment. Since many biomaterial products are shear sensitive (i.e. they are affected in some way by the stresses caused in regions of high hydrodynamic shear such as typically found in industrial bioprocessing devices), a significant advantage provided by a preferred embodiment of the method in accordance with the second aspect of the present invention in which the test quantity of the biomaterial is subjected to shear stress conditions in step (ii), is that predictive information about how the biomaterial of interest will behave in an industrial scale process can be obtained in the laboratory prior to performing any pilot scale trials.

Note that steps (e) or (v) of the first or second aspects of the present invention, are intended to include effecting substantial changes in the final industrial process. Thus, for example, the processing system can be envisaged as including a number of alternative industrial devices (for example, at each stage of the process where it is necessary to separate out particles dispersed in a solution, the processing system could include a centrifuge and/or a microfilter) and an operating parameter for producing the product with acceptable properties could include using one device or the other depending on the outcome of the preceding steps. Note that the finalised industrial processing system need not physically include unused devices in order to be considered as operating in accordance with an operating parameter specifying that one device should be used in preference to an alternative device.

Preferably, the first analysing or modelling operation includes the use of computational fluid dynamics. This has the advantage of providing a large amount of information about the internal conditions within an industrial device being modelled by means of the computational fluid dynamics, including shear profiles within the device during its operation and how these will vary for different operating conditions. For example, information may be obtained about how different viscosities of the biomaterial being processed within the machine will affect the stress profiles within the machine.

According to one preferred embodiment of the second aspect of the present invention, step (ii) of subjecting a test quantity of biomaterial to conditions within a scale down device comprises generating each of a plurality of shear conditions in a scale down device which is preferably in the form of a rotating disk device. Preferably the rotating disk device is a shear index device which comprises a disk mounted within a correspondingly shaped chamber for rotation about its central axis. The disk and chamber are shaped so as to permit a small amount of biomaterial to be contained within the chamber. The device also includes a motor for causing relative rotation between the disk and the chamber at a controllable rate whereby the biomaterial introduced into the chamber may be subjected to shear in a controllable manner. The use of such a device enables the shear sensitivity of a particular biomaterial to be determined even if only a small amount of such material is available for experimentation. Preferably, the device is arranged to permit quantities of biomaterial less than 100 ml in volume to be subjected to shear in the absence of air/liquid interfaces. Preferably, the device is arranged to generate flow conditions which may occur in typical industrial scale equipment, for example shear rates of at least $10^6 s^{-1}$ in feed zones to continuous flow centrifuges.

The terms shear rate and shear stress commonly used throughout this document are both used to reflect all methods of describing the effect of hydrodynamic and mechanical forces on biomaterials. Such methods commonly include power dissipation per unit volume or mass, mean velocity gradient and address a wide range of stresses or strains arising from different flow patterns including extensional, rotational, laminar, turbulent, linear flow etc.

Preferably, the step of determining how best to operate the industrial process includes performing a second modelling operation preferably using a second computer model of the scale down device or devices, each such computer model being adapted to generate a value of a shear index parameter or a critical shear value for the biomaterial, or a constituent thereof, contained within the device. The shear index parameter is indicative of the relationship between one or more material properties of the biomaterial and the amount of shear stress to which it is subjected, whilst the critical shear value is indicative of the magnitude of shear rate at which the biomaterial or constituent thereof begins to suffer damage, such as reduction in size or loss of activity.

According to one preferred embodiment of the second aspect of the present invention, the first analysing or modelling operation step comprises analysing the feed zone of an industrial centrifuge to establish the maximum shear rate inflicted on a biomaterial processed by the industrial centrifuge as a function of the operating speed of the centrifuge device, the second determining or modelling operation step comprises identifying the shear rate at which the biomaterial product starts to be damaged and determining therefrom the corresponding speed of the centrifuge at which the maximum shear rate generated in the feed zone of the centrifuge equals the shear rate at which the biomaterial product starts to be damaged, and the operating step comprises operating the centrifuge at a speed below that at which damage to the biomaterial product starts to occur.

According to a third aspect of the present invention, there is provided a development tool system for use in the design of a process for producing a biomaterial product from a biomaterial including a simulation device for simulating an industrial bioprocess and measuring tools for measuring properties of the biomaterial which affect said industrial bioprocess and for deriving suitable values of parameters which are input to the simulation device on the basis of the measured properties of the biomaterial.

Preferably, said measuring tools include one or more scale down devices. Preferably one of these devices is adapted to generate a shear rate corresponding to that generated in an industrial centrifuge device on any biomaterial contained within the scale down device.

Preferably, said measuring tools include means for generating one or more input biomaterial parameters which comprises one or more computer models of one or more of said scale down devices, each model being adapted to generate one or more input biomaterial parameters on the basis of one or more output biomaterial parameters and one or more operating parameters, said one or more output biomaterial parameters being derivable from measurements of the test quantity of biomaterial after having being subjected to the conditions generated by a scale down device or devices forming part of said measuring tools.

According to a fourth aspect of the present invention, there is provided a development tool system for use in the design of a process for producing a biomaterial product from a biomaterial including means for determining at least one aspect of an engineering environment generated in an industrial device and at least one scale down device adapted to generate an engineering environment corresponding to that generated by said industrial device, in order to permit at least one biomaterial index to be determined in respect of a biomaterial processed by said at least one scale down device.

Note that steps (d) and (e) of the first aspect and step (v) of the second aspect of the invention are regarded as optional steps because they need not be carried out by the same party that carries out the preceding steps. It will therefore be apparent to a person skilled in the art that a party which caries out only steps (a) to (c) of the first aspect or steps (i) to (iv) of the second aspect of the invention, will nonetheless be carrying out the invention even if another party performs the optional steps, ie steps (d) and (e) of the first aspect or step (v) of the second aspect of the invention.

In order that the present invention may be better understood, embodiments thereof will now be described by way of example only with reference to the accompanying drawings in which:

FIG. 4 is a diagrammatical cross-sectional view similar to FIG. 3 but illustrating a shear rate profile of biomaterial flowing through the centrifuge of FIG. 3 shown in more detail;

Figure 1:
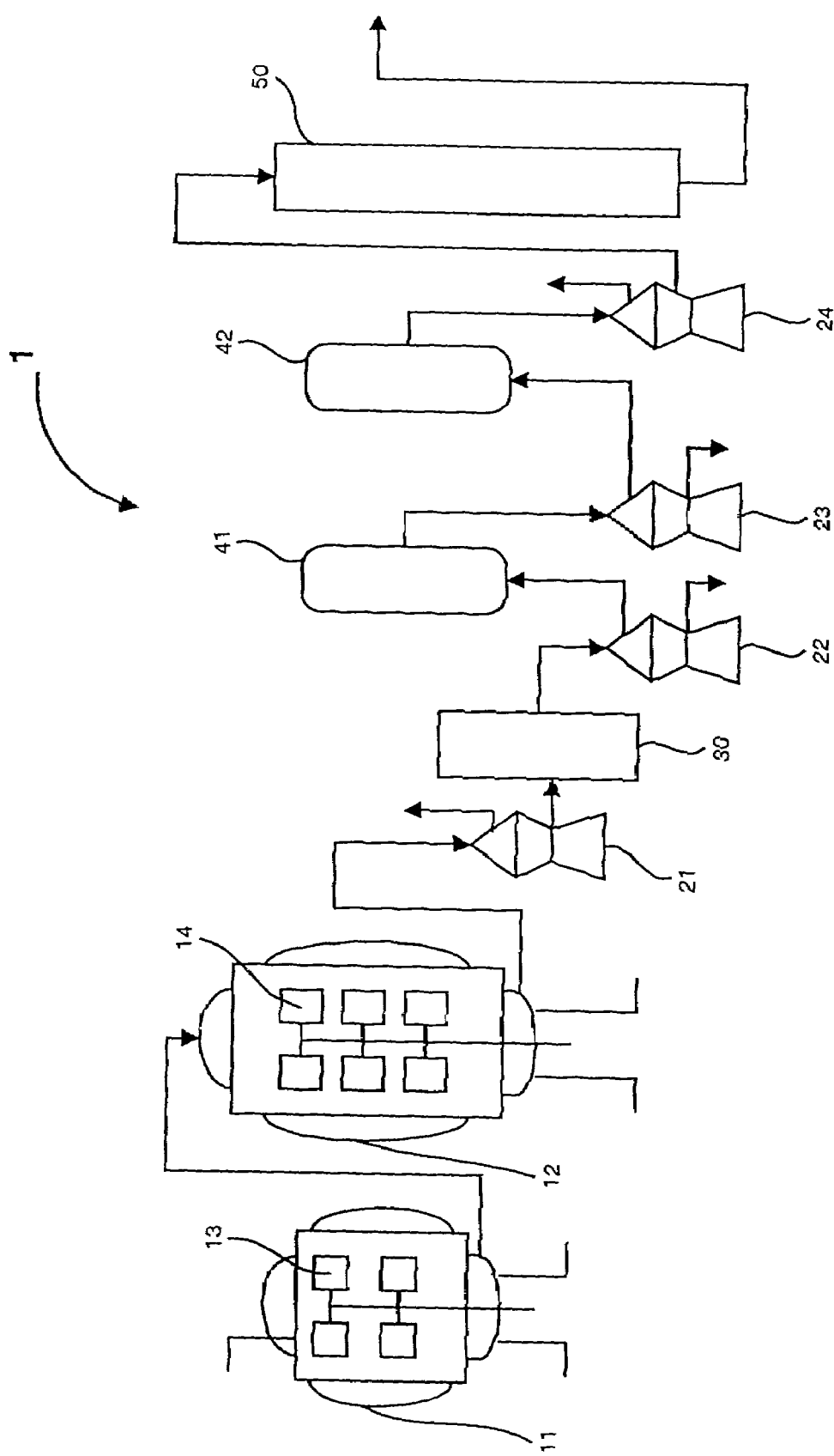
FIG. 1 is a diagrammatic representation of key aspects of a bioprocessing system for producing and isolating an intracellular enzyme in accordance with a preferred embodiment of the present invention.
Figure 2:
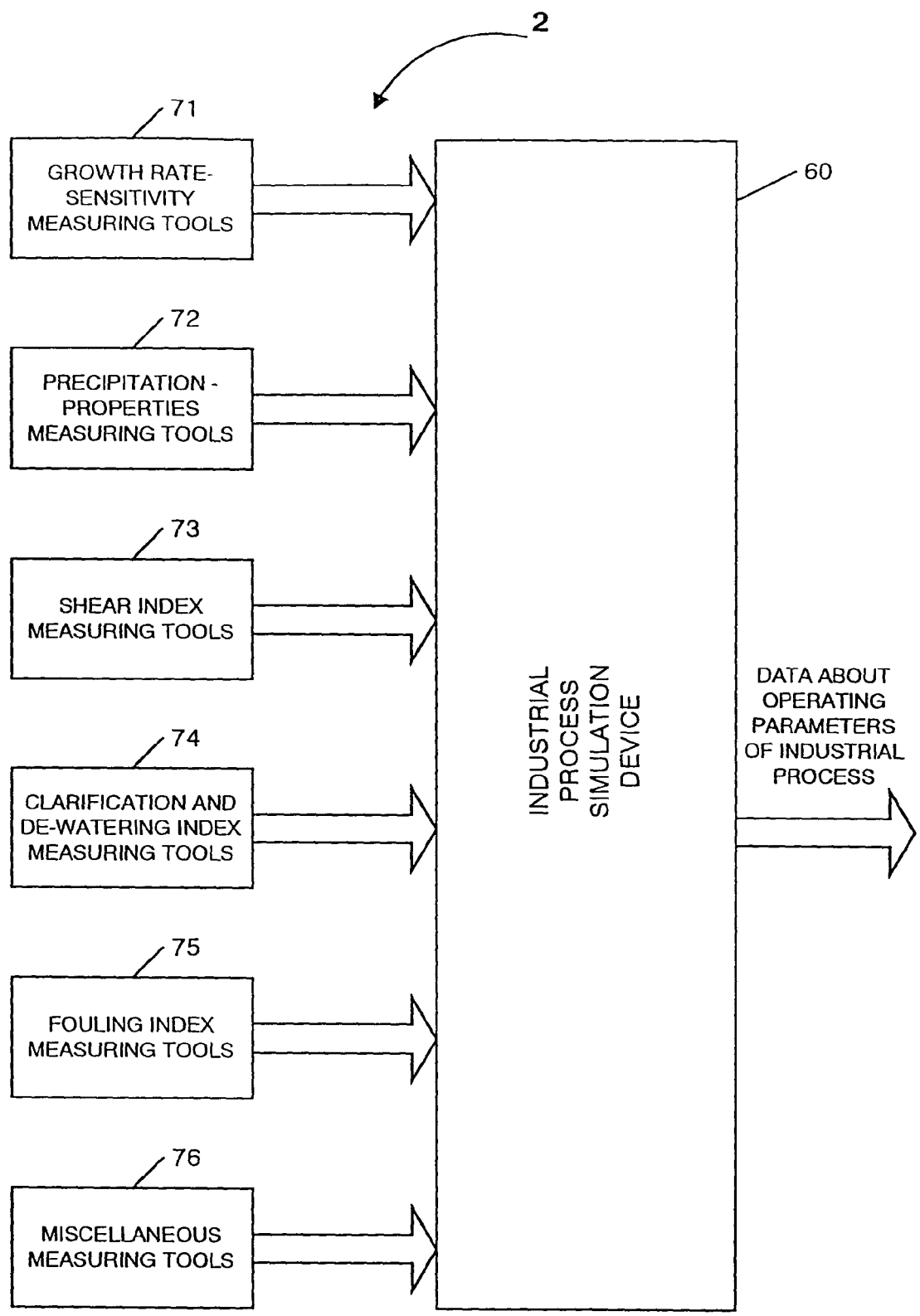
FIG. 2 is a block diagram of an industrial bioprocess development tool in accordance with a preferred embodiment of the present invention.

FIG. 1 shows an industrial bioprocessing system 1 for the production of the enzyme alcohol dehydrogenase from yeast. Bioprocessing system 1 is made up of a number of industrial bioprocessing devices which will be described in greater detail below. FIG. 2 illustrates in block diagram form an industrial bioprocess development tool which, in one preferred embodiment, is used for determining optimum operating conditions of the industrial bioprocessing devices of bioprocessing system 1.

Bioprocessing system 1 comprises first 11 and second 12 fermentation tanks, harvest centrifuge device 21, homogeniser 30, cell debris removal centrifuge device 22, unwanted protein precipitation tank 41, precipitates removal centrifuge device 23, wanted protein precipitation tank 42, precipitates recovery centrifuge device 24 and chromatography column 50.

The industrial bioprocess development tool 2 of FIG. 2 is a general purpose tool which may be used in the development of a wide range of industrial bioprocesses. As an example only, there is described below the development of an industrial bioprocess for producing an intracellular enzyme.

Example of Producing Alcohol Dehydrogenase with Reference to FIG. 1

A process for producing the enzyme alcohol dehydrogenase in accordance with a preferred embodiment of the present invention includes the following stages:

first and second fermentation stages in fermentation tanks 11 and 12;

first, second, third and fourth centrifugation stages in centrifuge devices 21, 22, 23, 24;

a homogenisation stage using homogeniser 30;

first and second protein precipitation stages using precipitation tanks 41, 42; and a chromatography column stage using chromatography column 50.

The fermentation used in bioprocessing system 1 is of the fed-batch type. During fermentation, a yeast culture which intracellularly produces the wanted enzyme (alcohol dehydrogenase) is initially grown from an inoculum in a series of preliminary fermentation tanks which are schematically illustrated in FIG. 1 by the first fermentation tank 11. The resulting fermentation broth is then transferred and further grown in a larger fermentation tank which is schematically illustrated in FIG. 1 by the second fermentation tank 12. Within the second fermentation tank (illustrated by fermentation tank 12), the yeast culture is further grown in what is known as a fed-batch mode. As is well understood in the art, a fed-batch mode involves supplying a nutrient solution to the fermentation broth to enable an approximately constant growth rate to be maintained. In the present case, there is a first unfed stage during which the concentration of nutrients in the broth diminishes which in turn causes the growth rate to diminish. During the second stage, a nutrient rich feed solution is continually supplied to the broth at a rate which is controlled to maintain the cell culture growth rate at an approximately constant value. The rate at which nutrients are supplied to the tank 12 during the second stage is determined using the development tool 2 to achieve a predetermined growth rate. The speed of rotation of the impeller blades 13, 14 for keeping the broth well mixed is set to be consistent with the rate of supply of nutrients and oxygen to the fermentation tanks 11, 12.

The biomaterial output from the fermentation stages comprises the wanted yeast cells suspended in fermentation liquors which together make up the fermentation broth. This is then passed to the harvest centrifuge device 21 for harvesting of the yeast cells. At this first centrifugation stage the majority of the fermentation liquors are removed leaving behind a harvested yeast cell paste which is resuspended in a buffer to achieve an appropriate concentration prior to disruption of the cells by means of the high pressure homogeniser 30. The speed of rotation of the centrifuge device 21, the flow-rate of fermentation broth through the centrifuge device 21 and the frequency with which the centrifuge device is emptied are all determined by the development tool 2.

At the high pressure homogenisation stage, resuspended yeast cells are forced through a small hole within the homogeniser 30 at a pressure, P. During this process, the cell walls of the yeast cells are broken. The resuspended yeast cells are passed through the homogeniser 30 a number of times, N, to ensure that nearly all of the yeast cells are broken up in this way. The breaking up of the cells in this way causes them to release their internal contents. The internal contents of the cells may collectively be referred to as the supernatant and include, amongst various other biological components, the wanted enzyme (alcohol dehydrogenase) in solution. The biomaterial output from the high pressure homogenisation stage also includes cell debris which is particulate in nature. The pressure, $\mu$, at which the homogeniser 30 is operated and the number of passes, N, of the biomaterial being homogenised are set in accordance with values determined using the development tool 2 to optimise the conflicting requirements of preserving the maximum size of the cell debris (for easy removal later) and also maximising the amount of the wanted enzyme released.

The biomaterial output from the high pressure homogenisation stage is passed to the second centrifugation stage (cell debris removal centrifuge device 22) where the majority of the particulate cell debris is removed from the supernatant. Again, the speed of rotation, flow rate of biomaterial through and frequency of emptying the centrifuge device 22 are determined by the development tool 2. The clarified supernatant from the second centrifugation stage is then passed to the unwanted protein precipitation tank 41 for the first protein precipitation stage.

In the first protein precipitation stage, a precipitating agent (such as ammonium sulphate) is applied to the biomaterial up to a concentration which is determined by development tool 2 to cause some of the proteins dissolved in the supernatant (but not a substantial amount of the wanted enzyme) to precipitate out of solution into aggregates or precipitate particles.

The precipitate particles are removed from the remainder of the supernatant in the third centrifugation stage (precipitates removal centrifuge device 23). The operating parameters of protein precipitates removal centrifuge device 23 (i.e. the speed of rotation, the flow rate of biomaterial through the device and the frequency with which the device is emptied) are determined by the development tool 2. Note that the development tool 2 takes into account the effects of shear generated within the device 23 as is explained in greater detail below.

The clarified supernatant output from the third centrifugation stage is input to the second protein precipitation stage (wanted protein precipitation tank 42) where further precipitating agent is added up to a second higher concentration as determined by the development tool 2. The aim of this protein precipitation stage is to precipitate out only the wanted enzyme. However, it will also generally cause the precipitation of other proteins which have a similar propensity to precipitate out at the same concentration of precipitating agent.

The biomaterial output from the wanted protein precipitation tank 42 is input to the fourth centrifugation stage (formed by precipitates recovery centrifuge device 24) where the precipitate particles of the wanted enzyme are separated out from the remainder of the supernatant (i.e. the precipitate paste is de-watered) before being redissolved in a neutral buffer (together with any unwanted contaminants which were also separated out with the precipitate particles of the wanted enzyme). The operating parameters of centrifuge device 24 are determined by development tool 2.

Development tool 2 balances the conflicting requirements of both minimising the amount of time taken to process the biomaterial (by increasing the flow rate through the centrifuge device) and maximising the amount of precipitate which is centrifuged out (by decreasing the flow rate through the centrifuge device) as well as determining the optimum frequency at which the centrifuge device should be emptied. The way in which development tool 2 determines these parameters is described below.

The proteins sedimented out in the preceding stage are redissolved, then passed through the chromatography column 50 in which a resin is provided which permits differently sized proteins to pass through the chromatography column 50 at different rates. This property can be used to separate the wanted enzyme from the other proteins by collecting the output stream from the chromatography column only during the period of time when there will be a high concentration of the wanted enzyme, but a low concentration of unwanted proteins present. The period of time during which the output steam is collected is determined using the development tool 2. Note that the particular type of resin used as well as the dimensions of the chromatography column (or columns) used will all affect the relevant time during which the output stream should be collected and thus all of these parameters need to be assessed by the development tool 2.

An Industrial Bioprocessing Device

Figure 3:
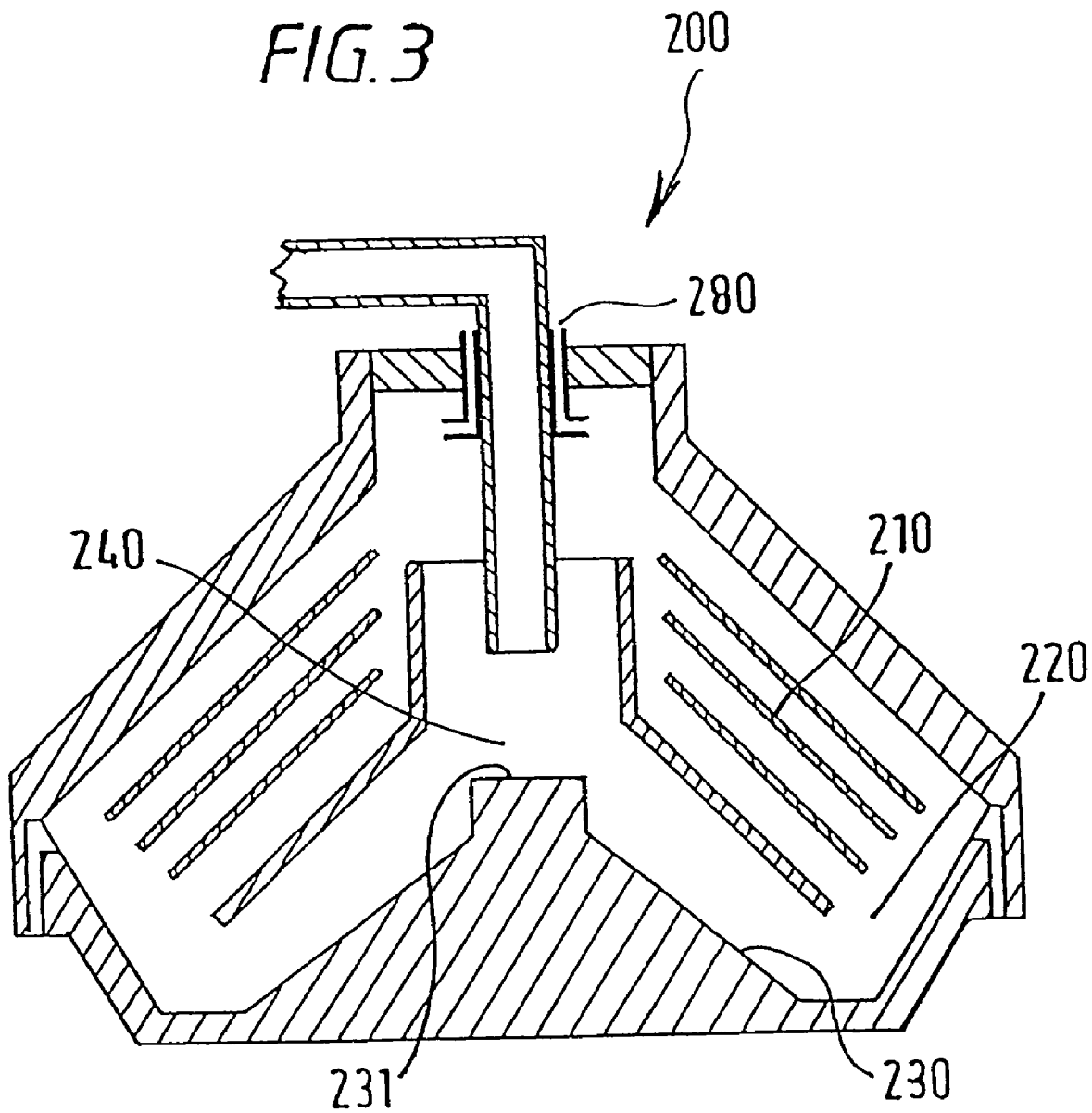
FIG. 3 is a diagrammatical cross-sectional view of an industrial disk stack centrifuge.

As an example of an industrial scale device suitable for use in the industrial bioprocessing system 1 of FIG. 1, there is now described an industrial scale, disk stack centrifuge 200 as illustrated in FIG. 3. Disk stack centrifuge 200 is of the type which would be suitable for use as any one of the harvest centrifuge device 21, cell debris removal centrifuge device 22, precipitates removal centrifuge device 23 or precipitates recovery centrifuge device 24 of the industrial bioprocessing system of FIG. 1.

The disk stack centrifuge 200 comprises a disk stack 210 which rotates within a rotating chamber 220. The bottom of the rotating chamber is formed by a bottom plate 230 which includes a central impact surface 231 located within the feed zone 240. Biomaterial to be processed by the centrifuge 200 enters through the top of the feed zone 240 and flows down until it makes contact with the central impact surface 231 which forces the biomaterial out to the edge of the rotating chamber 220 whereupon the less dense liquid is forced through the disk stack 210 and out through the exit 280 at the top of the centrifuge 200 while the particulate matter collects as a paste around the bottom outside edge of the centrifuge for removal when the centrifuge bowl capacity is approached.

Referring now to FIG. 4 which shows a shear strain profile generated by a computational fluid dynamics model of the centrifuge device 200, it can be seen that there are three regions 250, 260 and 270 of high shear. Furthermore, the computational fluid dynamics analysis is able to show the proportion of biomaterial processed by the centrifuge 200 which will pass through such regions 250, 260, 270 of high shear. The computational fluid dynamics analysis is incorporated into the industrial process simulation device 60 as part of each computer model of each centrifuge device 21, 22, 23, 24.

A Scale Down Device

Figure 5:
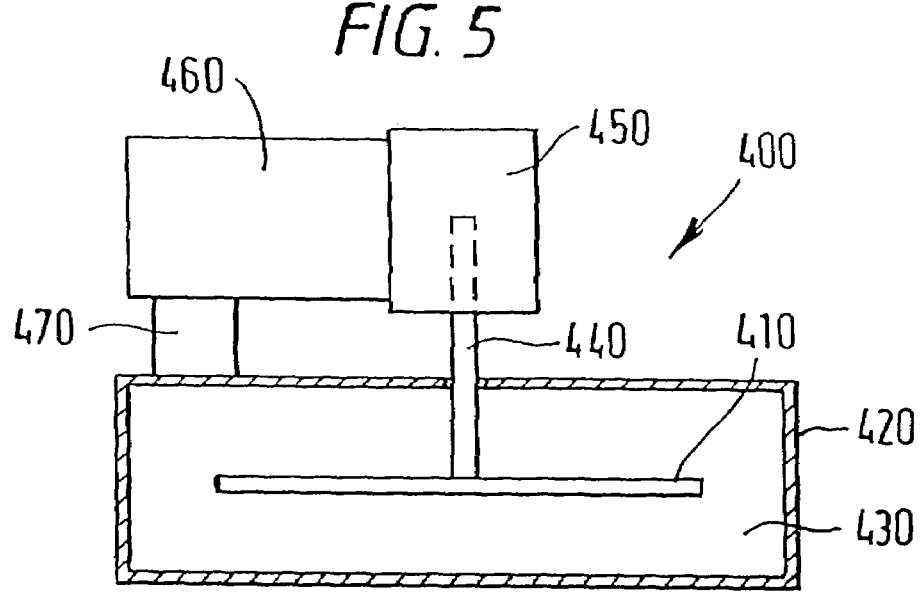
FIG. 5 is a diagrammatical cross-sectional view of a rotating disk device suitable for use in the shear-sensitivity tools of the development tool of FIG. 2.

In order to provide predictive information about how a particular biomaterial will behave in an industrial device such as the disk stack centrifuge of FIG. 3, scale down devices such as the rotating disk device 400 shown in FIG. 5 are used. The rotating disk device 400 forms one of the shear index measuring tools 73. The rotating disk device 400 comprises a disk 410 rotatably mounted within a housing 420 which defines a chamber 430 within which the disk is located. The disk has a spindle 440 extending through the housing 420 and permitting the disk to be rotated relative to the housing. The spindle 440 is attached to the rotor of a motor 450 whose stator is anchored to the housing 420 via an anchorage structure 460 and a load transducer 470 (for detecting the load on the motor). The motor 450 also includes a speed detector for detecting the rotational speed of the rotor (and hence the spindle 440 and disk 410) relative to the stator (and hence the housing 420). The motor is a direct current electric motor which is powered by rechargeable batteries.

Figure 6:
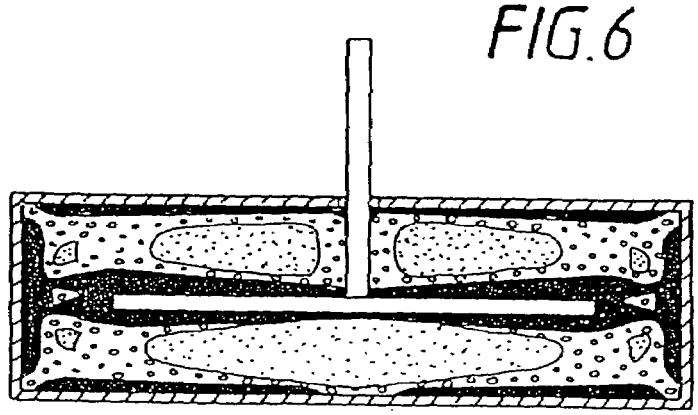
FIG. 6 is a diagrammatical cross-sectional view similar to FIG. 4 but showing the shear rate profile of biomaterial being processed within the rotating disk device of FIG. 5.

The shear strain profile of the rotating disk device 400 as generated by computational fluid dynamics analysis of the rotating disk device is shown in FIG. 6. This represents a device having disks of 30 mm diameter and operating at 27,700 RPM. From FIG. 6, it can be seen that adjacent to the external surfaces of the disk, especially towards the circumference of the disk, and also adjacent to the inner surface of the housing 420, there are regions of high shear similar in magnitude to those produced by the disk stack centrifuge 200 operating at a typical operation speed of 7,500 RPM. The computational fluid dynamics analysis is incorporated into the centrifuge properties measuring tools 73 as will be described in greater detail below.

The rotating disk device 400 may be provided with a lid machined to have a slight conical taper to assist in eliminating air, prior to use.

Computer Models of Laboratory Scale Devices

From the above discussion of an industrial centrifuge and a scale down rotating disk device, it will be apparent that it will not always be possible to mimic accurately the engineering environment experienced by a biomaterial within an industrial centrifuge device with a simple device such as a scale down rotating disk device. To overcome this problem, a computer model of the scale down device is used to enable the material properties of a biomaterial which is processed by the scale down device to be accurately evaluated.

Figure 7:
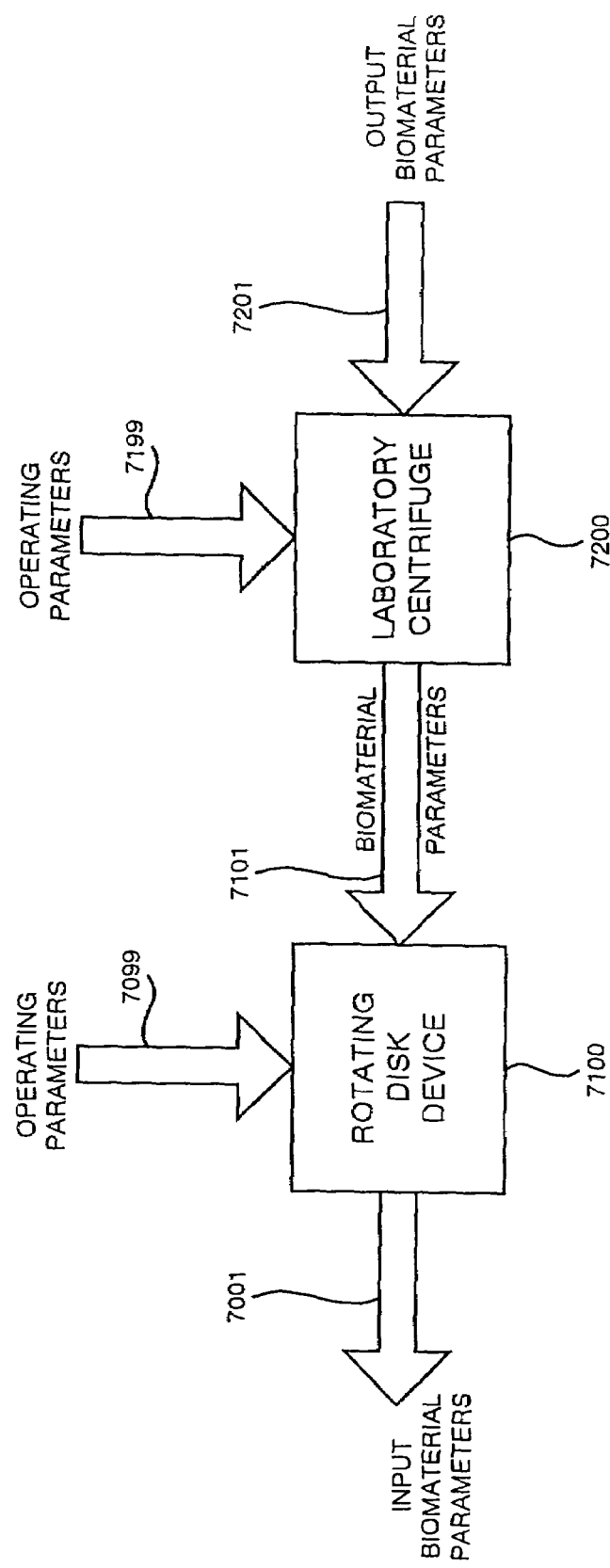
FIG. 7 is a schematic block diagram of a computer simulation of a series of scale down devices for use with shear-sensitivity measuring tools of the development tool of FIG. 2.

FIG. 7 illustrates two examples of scale down device models arranged together in an arrangement which is useful in evaluating a shear index in respect of a particular species of protein precipitate particles such as alcohol dehydrogenase precipitate particles.

Laboratory centrifuge model 7200 is adapted to receive "output" bioparameters 7201 and operating parameters 7199 in order to generate "input" bioparameters 7101. The output bioparameters 7201 include the degree of compaction of the sediment and the degree of clarification of the supernatant. The operating parameters 7199 are the speed at which the centrifuge is spun, the time for which it is spun, the time taken for the centrifuge to speed up and slow down and whether the centrifuge vials are decanted only once or whether there is a re-spinning of the sediment after a first decant of the supernatant. Note that by testing the supernatant decanted after only a relatively short spin, but testing the sediment after a much longer spin, a much better scale down simulation of an industrial centrifuge such as a disk stack centrifuge is obtained than if the sediment and supernatant are tested after the same amount of spinning. This is because in an industrial centrifuge such as disk stack centrifuge 200 the supernatant will on average spend much less time in the centrifuge than the sediment. Also, the relationships between the sum of the centrifugal forces to which the supernatant is exposed and to which the sediment is exposed are different in laboratory centrifuges and industrial centrifuges.

From these parameters, the laboratory centrifuge model 7200 is able to deduce input biomaterial parameters 7101 such as the particle size distribution of the input biomaterial (i.e. the biomaterial which is input to a laboratory centrifuge as part of a laboratory scale experiment which is being modelled) and the density difference between the particles in solution and the supernatant. The laboratory centrifuge model 7200 is an important component of a number of different measuring tools. For example, the laboratory centrifuge model 7200 is an important component of both the growth-rate-sensitivity measuring tools 71, the precipitation-properties measuring tools 72, the shear index measuring tools 73 and the clarification and de-watering index measuring tools 75.

However, since a laboratory centrifuge does not generate any significant shear it is not possible from this information alone to determine the shear sensitivity of the particles to be spun or of the product in solution. Therefore to obtain this information, the shear index properties measuring tools 73 further include a scale down rotating disk device 400 which is used in a suitable laboratory experiment to apply a controlled amount of shear to a biomaterial, having components whose sensitivity to shear it is desired to measure, such as alcohol dehydrogenase precipitate particles.

Model 7100 is a further component of the shear index measuring tools 73. "output" bioparameters 7101 comprise the particle size distribution of any particulate matter, such as alcohol dehydrogenase precipitate particles, suspended in biomaterial processed by the rotating disk device, and/or the percentage of wanted product dissolved in the biomaterial which is rendered non-viable or inactive or non-useful by the effects of the shear generated within the rotating disk device operating parameters 7099 of the rotating disk device model include the speed of rotation of the disk, the time taken for the disk device to reach its maximum speed, the time spent rotating at its maximum speed and the time taken for it to slow down back to zero.

From these parameters 7099 and 7101 the rotating disk device model 7100 is used to determine the particle size distribution of the particulate matter suspended in the biomaterial prior to its being sheared by the rotating disk device or the shear sensitivity of the particulate matter provided one or other of these values is already known. Models 7100 and 7200 are preferably provided using a suitably programmed computer.

In the present example, the same computer was used to provide the industrial process simulation device 60 and to provide the laboratory scale device models 7100, 7200. Furthermore, in the present embodiment, the scale down device models 7100, 7200 were created and connected together using the software product LabView (version 3.11, National Instruments) which provides a graphical programming environment allowing the construction of a user friendly interface. The exact methods used to connect together the models and to edit them are similar to those used to manipulate the industrial scale device models. These methods are described in greater detail below with reference to FIGS. 9 to 14.

Referring now to FIG. 2, the industrial bioprocess development tool 2 includes an industrial process simulation device 60 and a plurality of measuring tools 71, 72, 73, 74, 75, 76. The simulation device 60 is a computer suitably programmed to carry out a simulation of an industrial process.

In order to obtain details of the material properties of the biomaterial whose processing is to be simulated to enable the parameters stored by the models within the simulation to be correctly set up for a particular bioprocess, the development tool includes a number of measuring tools 71, 72, 73, 74, 75, 76 which are adapted to measure the various biomaterial properties which will be required by the simulation device 60. All of the measuring tools include scale down devices and may also include computer models of the scale down devices to permit the various properties of interest to be determined using only small test quantities of biomaterial.

Growth-rate-sensitivity measuring tools 71 measure properties of a biomaterial which determine how it behaves during fermentation. In particular, measuring tools 71 measure how the cell size distribution and parameters relating to the average cell wall strength of the culture of cells being tested vary with respect to the growth-rate.

Similarly, precipitation-properties measuring tools 72, measure properties of a biomaterial (such as a particular enzyme) which determine how it precipitates. In particular, tools 72 measure the solubility of a biomaterial as a function of the concentration of a precipitation agent and the aggregation and breakage rates associated with a particular biomaterial which reflect how readily precipitate particles bind together to form larger particles or are broken to form smaller particles.

Shear index measuring tools 73 measure properties of a biomaterial which determine how it behaves in a device such as a centrifuge in which the biomaterial is exposed to large shear forces. In particular, the shear index measuring tools 73 measure a shear sensitivity of the biomaterial or a particular component of the biomaterial which gives an indication of the biomaterial's (or a particular component thereof) susceptibility to shear forces. For example, in the case of a biomaterial comprising a supernatant having protein precipitate particles suspended therein, shear index measuring tools 73 measure how the particle size distribution of the protein precipitates varies with respect to applied shear. The shear index measuring tools 73 can also measure a critical shear value which indicates the shear stress above which a biomaterial is appreciably damaged by the shear stress.

Clarification and dewatering index measuring tools 74 measure the viscosity of a biomaterial, the difference in density between liquid and solid components of the biomaterial, and the particle size distribution of a biomaterial to be centrifuged, to enable the clarification and dewatering of a biomaterial to be centrifuged to be modelled accurately for given properties of the geometry and operation of a centrifuge device. Measuring tools 74 also permit an estimate of both the clarification of the output liquid and the dewatering of sediment which may be achieved by running an industrial continuous flow centrifuge device at a given rate.

Fouling index measuring tools 75 measure the propensity of the biomaterial to foul, for example, a chromatography column or a microfilter. The fouling index measuring tools 75 can also be used to measure other properties of a biomaterial required to simulate how the biomaterial will behave on a chromatography column.

Miscellaneous properties measuring tools 76 measure miscellaneous properties of a biomaterial which may be required to simulate a particular bioprocess. These properties include the amount of wanted enzyme, protein, plasmid DNA, denatured nucleic acid, etc. contained in a biomaterial which can be determined, for example, using commercially available assays.

In order for simulation device 60 to simulate the industrial bioprocess described above with reference to FIG. 1, a computer model of each of the industrial devices 11, 12, 21, 22, 23, 24, 30, 41, 42, 50 is provided and these are linked together using suitable software described in greater detail below with reference to FIGS. 9 to 14. In order to provide a computer model of an industrial process it is necessary to know the geometry and details of the operation of at least some of the particular industrial devices being modelled. For example, in order to provide models of the centrifuge devices 21, 22, 23, 24, a typical disk stack centrifuge such as that shown in FIG. 3 was analysed and modelled. A computational fluid dynamics analysis of the disk stack centrifuge as illustrated in FIG. 4 was performed to enable the amount of shear generated within the feed zone of the centrifuge device as a function of the speed of rotation of the device to be accurately modelled. In particular, the computational fluid dynamics package used was CFX produced by AEA Technology of Harwell, United Kingdom.

Another important requirement to enable simulation device 60 to simulate accurately the process described above with reference to FIG. 1 is that the various properties measured by the measuring tools 71, 72, 73, 74, 75 are pertinent to the biomaterials which will actually be processed in the simulated process. In theory this could only be definitely achieved by performing the actual process to be simulated, which would nullify a major advantage of a preferred embodiment of the present invention (which is to be able to perform a large amount of the design of an industrial bioprocess without having to use industrial devices to process the particular biomaterial to be processed). However, the present inventors have found that a laboratory scale process corresponding to the industrial bioprocess to be simulated can be used to generate biomaterials whose properties can be used in the simulation device even where the laboratory scale process does not on its own provide useful quantitative predictive information about how well the industrial process will perform. Thus in the present embodiment, a laboratory process is effectively set up in which the starting biomaterial (the yeast culture) is fermented, harvested, homogenised, etc., all at a small scale and the properties of the resulting biomaterials are measured and fed into the simulation device 60. The exact procedures used in the present embodiment are described in greater detail below.

Computer Simulation of the Industrial Bioprocess of FIG. 1

Figure 8:
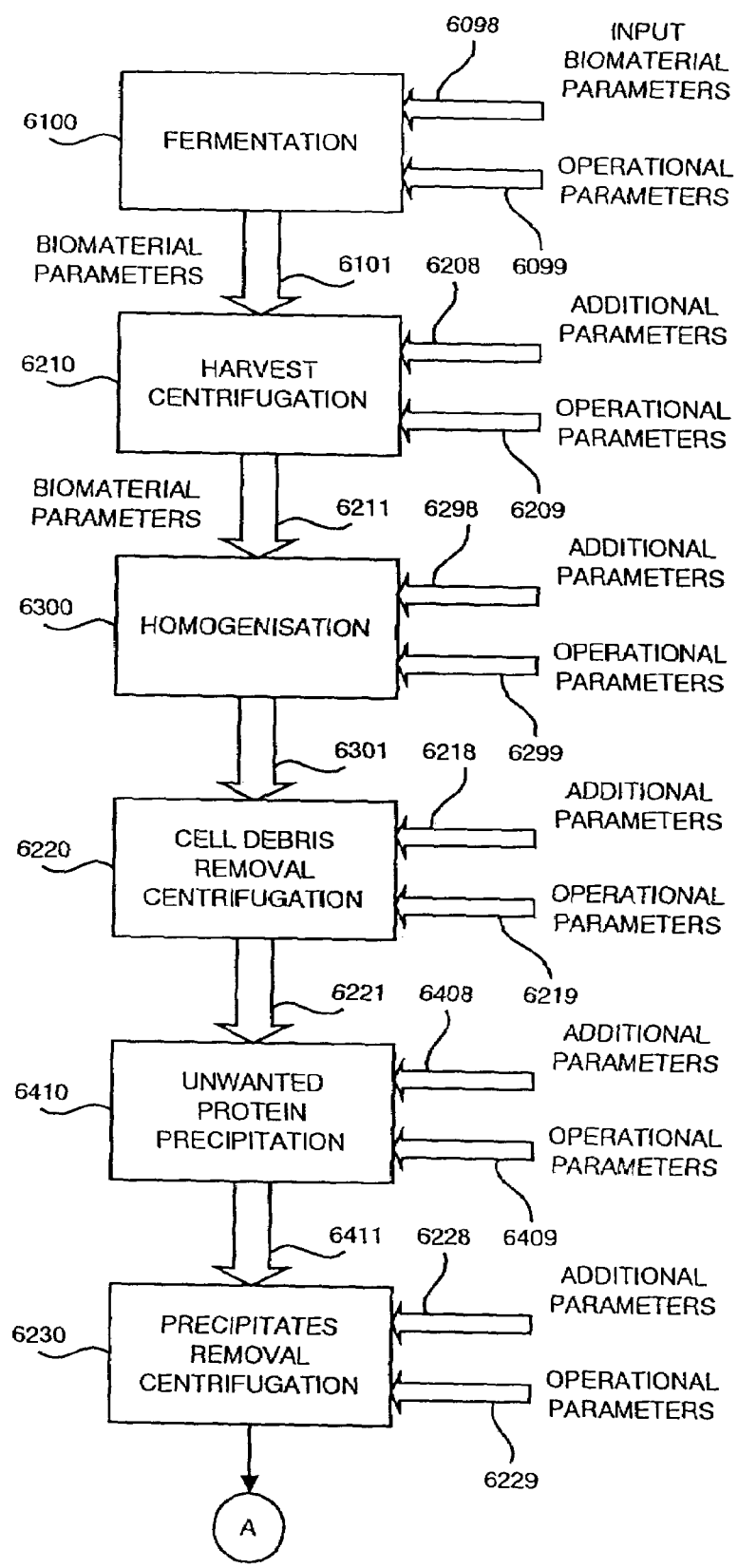
FIG. 8 is a schematic block diagram of the computer simulation of the bioprocess of FIG. 1 which is performed by the simulation device of the development tool of FIG. 2.
Figure 8:
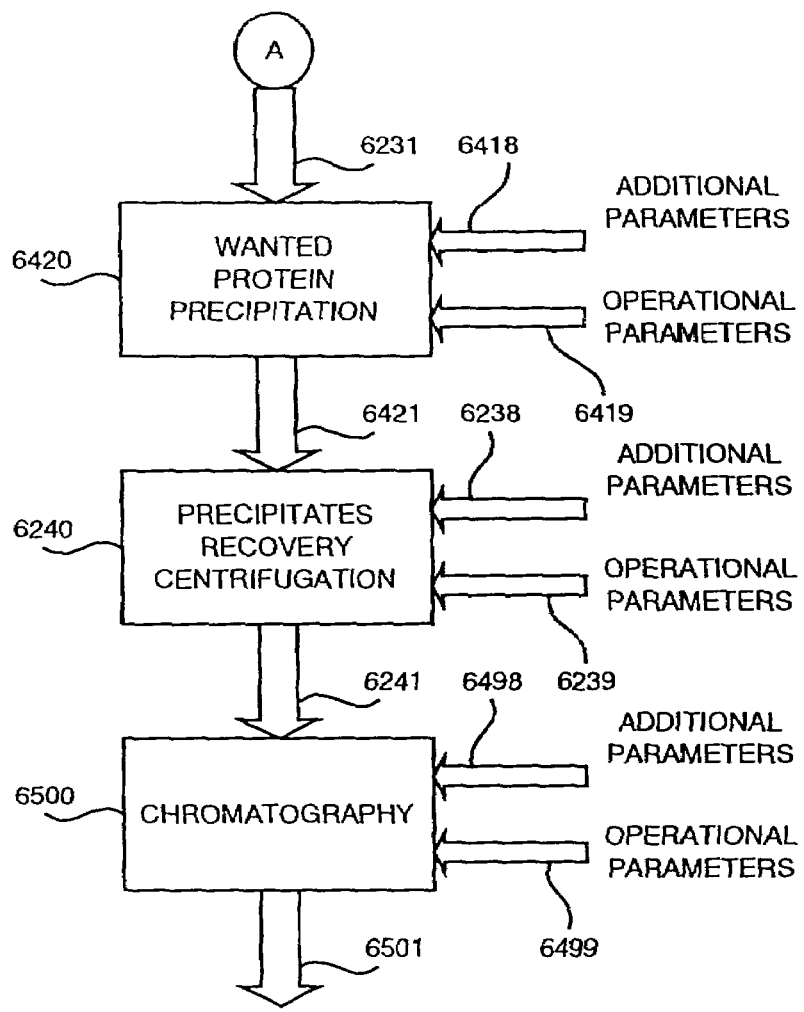

Referring now to FIG. 8, the actual models used by simulation device 60 to simulate the industrial scale production of the enzyme alcohol dehydrogenase using the plant depicted in FIG. 1 will now be described. The computer simulation comprises a number of interlinked models 6100, 6210, 6300, 6220, 6410, 6230, 6420, 6240 and 6500 of the different stages of the process being simulated. Each model is adapted to generate one or more output parameters which will be designated in the text which follows as biomaterial parameters because they are representative of properties of a biomaterial whose production is being simulated.

The biomaterial parameters output by any one model will generally be used to form input biomaterial parameters for a subsequent or downstream model and/or may be displayed by the simulation device 60 to provide information about the operation of the process as a whole at various different stages. For example, fermentation model 6100, which is adapted to receive input biomaterial parameters 6098 and operating parameters 6099, generates output biomaterial parameters 6101. The biomaterial parameters 6101 generated by fermentation model 6100 are then input to harvest centrifugation model 6210, together with operating parameters 6209 and additional bioparameters 6208. Harvest centrifugation model 6210 generates output bioparameters 6211 which are used in the next model, and so forth for each successive model in the simulation.

In the present embodiment, the above-described models were created and connected together in simulation device 60 using software which provides a user-friendly interface. In particular, the programming application LabView (version 3.11, National Instruments) was used. The procedures used in setting up and running the simulation are described in greater detail below with reference to FIGS. 9–14.

In the example below, the production and isolation of alcohol dehydrogenase from commercial bakers' yeast (*S. cerevisiae*) is considered, beginning with fed batch fermentation in two stages. The initial fermentation conditions, such as broth temperature, pH and nutrient concentration, determine the growth rate of the biomass which, in turn, influences the cell debris particle size distribution. As will be seen in the discussion which follows, the biomass at the end of fermentation, $m_f$, and the particle size distribution are important factors affecting the overall yield and purity of the target enzyme, alcohol dehydrogenase.

Fermentation Model 6100

The purpose of the fermentation process is to generate intra-cellularly a large amount of the wanted product, alcohol dehydrogenase. In the present case, this is done using a two stage fed-batch process in which a small seed amount of a yeast cell culture (an inoculum) is grown in a series of preliminary fermentation tanks in the first stage. In the second stage, the fermentation broth is grown in a large fermentation tank. The second stage is itself split into a penultimate and a final phase.

Within the penultimate phase, no nutrients are fed to the broth and the cell culture is allowed to grow with a steadily declining growth rate as the fixed supply of nutrients is diminished. In the final phase, a supply of liquid containing nutrients is fed at a variable rate $F_f$ (expressed in liters/hour) to the fermentation tank to maintain the yeast culture growing at an approximately constant growth rate, $\mu$.

The output parameters of the fermentation model 6100 are the biomass, $m_f$, the amount of alcohol dehydrogenase, $E_f$, the amount of total protein, $R_f$, the cell size distribution of the resulting yeast cell culture and the output volume of broth, $V_f$.

The biomass concentration, x, is calculated using equations relating the growth rate, $\mu$, the initial volume, $V_{fi}$, of the fermentation broth, the initial cell biomass concentration, $x_{fi}$, at the start of the final phase of fermentation, and the duration of the final phase of fermentation, $t_f$.

In particular, the following equations are used in the present example to model the increase in biomass concentration during the final phase of the fermentation:

$$\frac{dx}{dt} = x\left(\mu - \frac{F_f}{V}\right) \quad (1)$$

$$F_f = F_{fi} \exp(F_{para} t) \quad (2)$$

$$V = V_{fi} + \int_o^t F_f \, dt \quad (3)$$

in which:

x is the concentration of biomass at any time, t;

t is the time elapsed from commencement of the final phase of the fermentation;

$\mu$ is the growth rate;

$F_f$ is the feed rate (in terms of volume per unit time);

V is the volume of the broth at any time, t;

$F_{fi}$ is the initial feed rate at the commencement of the final fed phase of the fermentation;

$F_{para}$ is a rate of increase parameter which describes how quickly the feed rate, $F_f$, increases during the final fed phase of the fermentation; and $V_{fi}$ is the initial volume of the broth at the commencement of the final fed phase of fermentation.

The fermentation model 6100 integrates Equation 1 to calculate the final concentration of biomass, $X(t_f)$, on the basis of the initial concentration of biomass, $X_{fi}$, the growth rate $\mu$, and F and V as calculated using Equations 2 and 3. The model evaluates Equation 2 using the initial feed rate, $F_{fi}$, and the parameter $F_{para}$. The model evaluates Equation 3 using the initial volume, $V_{fi}$ and the feed rate, $F_f$. The initial biomass, $X_{fi}$, the initial feed rate, $F_{fi}$, and the initial volume, $V_{fi}$, are all input by the user as "fixed" operating parameters. The duration, $t_f$, of the final phase of fermentation and the rate of increase parameter, $F_{para}$, are both typical operating parameters whose values may be varied, or considered over a range, to see what effect they have on one or more output bioparameters. Note that the present model does not expect the "fixed" operating parameters to be varied in this way. In particular, the model does not model how changes in the parameters $X_{fi}$, $V_{fi}$ and $F_{fi}$ will affect the growth rate, $\mu$. This issue is discussed in greater detail below.

The model assumes an exponential feed rate, $F_F$, having the general form given in Equation 2. Furthermore, the model assumes that such a feeding strategy will give rise to a constant value for the growth rate, $\mu$ (Note that this is a reasonable assumption as an exponential feed rate will generally result in an approximately constant value for the growth rate under normal industrial fermentation conditions). As already mentioned, the initial feed rate, $F_{fi}$, is a "fixed" operating parameter which is input by the user of the simulation device 60 (Note that the user determines an appropriate value for $F_{fi}$ on the basis of the expected values of a number of properties of the broth at the time the final phase commences including the initial concentration biomass, $x_{fi}$, the initial volume, $V_{fi}$, the initial concentration of nutrients within the broth, the concentration of nutrients within the feed solution and the initial growth rate of the biomass). The rate of increase parameter, $F_{para}$, however is a typical operating parameter which may take any value between a range of possible values. The value for $F_{para}$ is not only used to determine how the feed rate, $F_f$, increases with time, but is also used to determine the value for the growth rate, $\mu$.

To determine the growth rate, μ, the model requires the user to input a number of coupled values of the growth rate, μ, and the rate of increase parameter $F_{para}$. The model then interpolates between these fixed points to determine a corresponding growth rate, μ, for any value of the rate of increase parameter, $F_{para}$. Note that the correlation between the rate of increase parameter, $F_{para}$, and the growth rate, μ, will not hold if any of the main properties (such as those referred to above) of the broth at the time of commencement of the final phase of fermentation are altered significantly. For this reason, the initial feed rate, $F_{fi}$, the initial concentration of biomass, $x_{fi}$, and the initial volume, $V_{fi}$, of broth are considered as "fixed" operating parameters. Thus, if the user wishes to simulate the effect of changing one or more of the "fixed" operating parameters, $x_{fi}$, $V_{fi}$ or $F_{fi}$, the user should determine new correlating pairs of values (ie coupled values) of μ and $F_{para}$ which reflect how the correlation between μ and $F_{para}$ has changed as a result of changing the "fixed" operating parameters. The user should then enter the new correlating values of μ and $F_{para}$ at the same time as entering the new values of the "fixed" operating parameters in order for the model 6100 to simulate the altered fermentation process more effectively. The biomass concentration, $x(t_f)$, and the volume, $V(t_f)$, of the broth, at the end of the final phase are used to determine the biomass, $m_f$, at the end of the fermentation. From the biomass, $m_f$, the amount, $E_f$, of alcohol dehydrogenase and the amount, $R_f$, of total protein are calculated by assuming a direct proportionality or yield of enzyme per unit mass of biomass, $Y_E$, and yield of total protein per unit mass of biomass, $Y_p$. The yields $Y_E$ and $Y_p$ are determined by experiment using the miscellaneous measuring tools 76. The yields $Y_E$ and $Y_p$ are entered in the fermentation model 6100 as input biomaterial parameters 6098.

The fermentation model 6100 also models the output particle (cell) size distribution of the fermented yeast culture. The cell size distribution is characterised by the median diameter, $d_{50f}$ and the Boltzmann parameter, $w_f$, which are used in a Boltzmann type equation for $\Phi(d)$ of the general form given in equation 4 below.

$$\Phi(d) = \frac{1}{1 + \exp\left(\frac{d - d_{50}}{w}\right)} \quad (4)$$

The values of mean yeast cell size, $d_{50f}$, and spread of yeast cell size, $w_f$, output by the model are calculated as a function of growth rate, μ, in accordance with equations 5 and 6:

$$d_{50f}(\mu) = d_{50f}(\mu_0) + a_1(\mu - \mu_0) + a_2(\mu - \mu_0)^2 \quad (5)$$

$$w_f(\mu) = w_f(\mu_0) + b_1(\mu - \mu_0) + b_2(\mu - \mu_0)^2 \quad (6)$$

in which:

$d_{50f}(\mu_0)$ and $w_f(\mu_0)$ are the measured values of $d_{50f}$ and $w_f$ at a given growth rate, $\mu_0$, and $a_1$, $a_2$, $b_1$ and $b_2$ are experimentally determined coefficients found by measuring $d_{50f}$ and $w_f$ at different growth rates.

The output bioparameters 6101 ($m_f$, $R_f$, $E_f$) calculated in this way are passed on to the harvest centrifugation model 6210.

Harvest Centrifugation Model 6210

The purpose of the harvest centrifugation process is to separate the yeast cells from the remainder of the broth. Biomaterial for the purposes of this model refers to the feed suspension, in this case, the output of the fermentation stage.

The output bioparameters of the harvest centrifugation model are the mass of harvested cells, $m_{hc}$, the mass of cells lost because they were not sedimented, modified values, $d_{50hc}$ and $w_{hc}$, which characterise the particle size distribution of the harvested cells, the mass of total protein $R_{hc}$, the mass of alcohol dehydrogenase, $E_{hc}$, and the time, $t_{hc}$, taken for the centrifuge to fill up.

Harvest centrifugation model 6210 takes into account the equivalent settling area Σ which is dependent on the geometry and speed of the disk stack centrifuge 200 being modelled. If the operating speed of centrifuge 200 is variable, the equivalent settling area may be expressed as a function of the operating speed. The equivalent settling area is normally specified by the centrifuge manufacturer. From the equivalent settling area Σ, Stoke's law of particle settling or sedimentation is applied to derive the critical particle diameter, $d_c$, of particles having a known density difference with respect to the feed suspension. This determines the theoretical minimum size of particles which will be sedimented out by the centrifuge. The model 6210 then uses the critical diameter $d_c$ in a grade efficiency curve equation to estimate sedimentation by real centrifuge 200.

The grade efficiency curve equation used in the present model takes the form:

$$T(d) = 1 - \exp\left[-\left(\frac{Kd}{d_c}\right)^n\right] \quad (7)$$

$$\text{where } d_C = \sqrt{\frac{18\eta Q}{\Delta\rho \Sigma (1 - C_V)^\tau g}}$$

in which:

T(d) represents the fraction of particles of diameter d sedimented out of the flow, K and n are constants which depend only on the centrifuge device being modelled, n is the viscosity of the biomaterial being centrifuged, Q is the flow rate of biomaterial through the centrifuge (Note that., in the case of a batch or laboratory centrifuge, this term can be replaced by $V_{cent}/t$ where $V_{cent}$ represents volume of biomaterial and t represents total centrifuge time), Δρ is the difference in density between the yeast cells and the feed suspension, Σ is the equivalent settling area of the centrifuge being modelled, $(1-C_v)^\tau$ is a correction term in which $C_v$ is the volume fraction of solids in the biomaterial present case, and τ, is a parameter which is assumed by centrifugation models 6210, 6220, 6230 and 6240 to have a value of 4.6, and g is the acceleration due to gravity.

Note that Q and Σ are operating parameters since these are controlled by an operator of the centrifuge 200. The constants represented by g, K and n are all stored with constant associated values in the model 6200. The variable $C_v$ is calculated by the model using the values for $V_f$ and $m_f$ which are two of the bioparameters 6101 passed on from the fermentation model 6100 and the measured value $\rho_f$ of the density of the cells which is input as an additional bioparameter 6208. The remainder of the terms in Equation 7, namely η, $\rho_f$ and Δρ, are additional biomaterial parameters 6208 which are determined experimentally using combined clarification and dewatering measuring tools 74. The tools 74 include computer model 7200 of a laboratory centrifuge in which the same equations are used, but with different values for operating parameters Q (or $V_{cent/t}$) and $\Sigma$.

The volume of the solids holding space in centrifuge 200 is known, so the time, $t_{hc}$, taken for the centrifuge to fill up is calculated from the flow rate Q and the total concentration of biomass in the liquid undergoing centrifugation.

Note that the time at with which the centrifuge is emptied can be regarded as an operating parameter because it is under the control of the user. In practice, the operator will empty the centrifuge earlier than the time, $t_{hc}$, calculated by the model, but needs to know this threshold time in order to avoid running the centrifuge when it is full. Hence, the current model does not have to account for biomass lost due to running the centrifuge when full and such losses are assumed to be negligible.

Homogenisation Model 6300

The purpose of the homogenisation stage is to rupture the harvested yeast cells so that the wanted enzyme, alcohol dehydrogenase is liberated for downstream processing. Biomaterial will be used to refer to the cell culture for the purposes of the present model.

The output bioparameters of the homogenisation model in the present example are the amount of alcohol dehydrogenase, $E_h$, released from within the yeast cells into the output supernatant, the amount of total protein, $R_h$, released, the amount, $m_h$, of yeast cell debris (which is mostly broken up cell walls), and the particle size distribution, $d_{50h}$ and $w_h$, of the debris formed as a result of breaking up the yeast cells.

In order to derive these output bioparameters, the homogenisation model 6300 relates the total amount of protein available for release, the number of passes through the homogeniser and the pressure at which the homogeniser is operated. The particular mathematical relationship used in this case (the Hetherington equation) is given by Equations 8 and 9 below:

$$\ln\left(\frac{R_{hc}}{R_{hc} - R_h}\right) = K_h N P^{a_h} \quad (8)$$

$$\ln\left(\frac{E_{hc}}{E_{hc} - E_h}\right) = K_h N P^{a_h} \quad (9)$$

in which:

$R_{hc}$ represents the maximum amount of total protein available for release, $E_{hc}$ represents the maximum amount of alcohol dehydrogenase available for release, $R_h$ represents the actual amount of protein released, $E_h$ represents the actual amount of alcohol dehydrogenase released (according to the Hetherington equation), $K_h$ and $a_h$ are constants which depend on the nature of the cells being homogenised, especially the average cell wall strength of the cells (i.e. they are additional biomaterial parameters 6298), N is the number of passes through the homogeniser, and P is the pressure at which the homogeniser is operated (i.e. N and P are operating parameters 6299).

Note that $K_h$ and $a_h$ are functions of the growth rate, $\mu$, which is one of the parameters 6101 output by the fermentation model 6100 and then passed on unchanged from the harvest centrifugation model 6210 as one of the parameters 6211. In the present model, the same values of $K_h$ and $a_h$ are used for equation 8 (total protein) and equation 9 (wanted enzyme). Since $K_h$ and $a_h$ depend upon the rate of growth of the cell culture during fermentation and the nature of the cell culture itself, these parameters are determined experimentally using the growth rate sensitivity measuring tools 71. Typically, a series of small scale experiments is conducted at different growth rates, and different values of $K_h$ and $a_h$ are determined, which values are used for working out a mathematical relationship between growth rate and cell characteristics. A more complete discussion of how these relationships are determined for the present embodiment is given later in this document.

The particle size distribution $\Phi(d)$ (i.e. the fraction of particles having a size greater than d) of the resulting cell wall debris depends on the operating parameters of the homogeniser (i.e. the number of passes and the pressure at which the homogeniser is operated). In order to determine the particle size distribution, the Boltzmann relationship previously seen in Equation 4 is used in which $d_{50}$ and w are as given below:

where $$d_{50h} = \left(1 - e^{-\frac{C_{hd}}{N^{b_{hd}} \Delta P}}\right) d_{50hc} \quad (10)$$

and $$w_h = \left(1 + C_{hw1} e^{-\frac{C_{hw2}}{N^{b_{hw}} \Delta P}}\right) w_{hc} \quad (11)$$

in which:

$d_{50h}$ is the mean particle size, $d_{50hc}$ represents the mean particle size for zero passes (i.e. the mean cell size distribution), $w_h$ represents the spread of the debris particle size, $w_{hc}$ represents the spread of the cell size distribution for zero passes, $b_{hd}$, $b_{hw}$, $C_{hd}$, $C_{hw1}$ and $C_{hw2}$ are constants which depend upon the biomaterial being homogenised and the rate of growth of the cell culture during fermentation, and $\Delta P$ is the difference between the pressure, P, at which the homogeniser is operated and a threshold pressure, $P_{th}$, below which substantially no cell breakage occurs. In the present case, $P_{th}$ has a default value of 13 MPa which may be varied by an operator if, for example, a small scale experiment has been performed to determine $P_{th}$ more accurately for the subject biomaterial.

The constants $b_{hd}$, $b_{hw}$, $C_{hd}$, $C_{hw1}$ and $C_{hw2}$ are some of the additional biomaterial parameters 6298 input by a user when setting up the simulation. They are determined experimentally using the growth rate sensitivity measuring tools 71 by conducting a series of small scale experiments.

The output bioparameters 6301 calculated in this way by homogenisation model 6300 are then passed onto the cell debris removal centrifugation model 6220.

Cell Debris Removal Centrifugation Model 6220

The purpose of cell debris removal is to separate unwanted yeast cell matter from the materials of interest.

The cell debris removal centrifugation model is similar to the harvest centrifugation model 6210 except that it determines the following output parameters: mass of cell debris, $m_{dr}$, carried through to the next stage due to non-ideal sedimentation, the particle size distribution, $d_{50dr}$ and $w_{dr}$, of the cell debris particles carried through, the amount, $R_{dr}$, of total protein and the amount $E_{dr}$ of alcohol dehydrogenase passing through to the next stage in the supernatant, the volume, $V_{dr}$, of the supernatant and the time taken, $t_{dr}$, for the centrifuge to fill up. The mass of cell debris, $m_h$, generated in the homogenisation stage is also carried forward.

Note that, in the production of alcohol dehydrogenase from yeast cells, neither the yeast cell debris nor the wanted enzyme in solution is greatly affected by the amount of shear generated in the industrial centrifuge operating within its normal range. Therefore cell debris removal centrifugation model 6220 ignores shear effects in this example.

Also, it is assumed that the solids concentration of the feed material is sufficiently low that dewatering losses are negligible. Hence $R_{dr}$ and $E_{dr}$ approximate to the values $R_h$ and $E_h$ output from the preceding stage.

Unwanted Protein Precipitation Model 6410

In the unwanted protein precipitation stage, a differential precipitation is carried out to precipitate out some of the unwanted proteins, leaving the bulk of the wanted alcohol dehydrogenase in solution.

The output bioparameters of unwanted protein precipitation model 6410 are the following bioparameters unchanged from the preceding model: mass of cell debris, $m_{dr}$, carried through to the next stage due to non-ideal sedimentation, the particle size distribution, $d_{50dr}$ and $w_{dr}$, of the cell debris particles carried through, the amount, $R_{dr}$, of total protein and the amount $E_{dr}$ of alcohol dehydrogenase passing through to the next stage in the supernatant, and the following bioparameters determined during the modelling step: the volume, $V_{up}$, of total material being taken forward to the next centrifugation stage, the particle size distribution, $d_{50up}$ and $w_{up}$, of the precipitates formed, and the fractions $F_R$ and $F_E$ of total protein and alcohol dehydrogenase, respectively, that remain soluble in the supernatant.

In order to derive the proportions of the total amount of protein and the amount of wanted enzyme which are precipitated out, unwanted protein precipitation model 6410 employs an equation which specifies the solubilities of the total amount of protein and the wanted enzyme as functions of the concentration of ammonium sulphate acting as precipitation agent. In particular, the model 6410 employs the following equation:

$$F = \frac{1}{1+(C_{pa}/\alpha)^m} \quad (12)$$

in which:

F is a fraction of biomaterial remaining soluble, $C_{pa}$ is the concentration of precipitation agent expressed as percentage saturation, and α and m are additional bioparameters 6408 characteristic of a particular material.

Note that α and m take different values for the total protein and the alcohol dehydrogenase, thus permitting selective precipitation of alcohol dehydrogenase as required. Hence, two fractions are calculated, one being the fraction of total protein, $F_R$, remaining soluble and the other being the fraction of alcohol dehydrogenase, $F_E$, remaining soluble. The additional biomaterial parameters α and m are experimentally determined using the precipitation properties measuring tools 72 by conducting a series of small scale experiments.

Additionally, the unwanted protein precipitation model 6410 determines the particle size distribution of the precipitates using a population balance model involving differential equations in which the rates of aggregation and breakage of particles of a particular size are used to estimate the rate of change of population of each of an arbitrarily determined, but finite, number of volumetric doubling intervals of particle size. Changes in population arise from smaller particles aggregating together or from larger particles breaking up.

In this particular case, the following equations are used:

$$\left(\frac{dN_i}{dt}\right)_{Agg} = N_{i-1}\sum_{j=1}^{i-2} 2^{j-i+1}\beta_0 N_j + \quad (13)$$

$$\frac{1}{2}\beta_0 N_{i-1}^2 - N_i\sum_{j=1}^{i-1} 2^{j-1}\beta_0 N_j - N_i\sum_{j=1}^{i=n} \beta_0 N_j$$

$$\left(\frac{dN_i}{dt}\right)_{Break} = \frac{3}{2}K_D K_V (2d_{i+1}^3 N_{i+1} - d_i^3 N_i) \quad (14)$$

$$\left(\frac{dN_i}{dt}\right)_{Batch} = \left(\frac{dN_i}{dt}\right)_{Agg} + \left(\frac{dN_i}{dt}\right)_{break} \quad (15)$$

$$m_i = \rho_a K_V d_i^3 N_i \quad (16)$$

in which:

$\beta_0$ and $K_D$ are the aggregation and breakage rates, $K_V$ is a shape factor which is assumed in this example to be Π/6 (corresponding to spherical particles), $\rho_a$ is the density of the particles, $m_i$ is the total mass of particles within the $i^{th}$ interval, $N_i$ is the total number of particles within the $i^{th}$ interval, and $d_i$ is the median diameter of particles within the $i^{th}$ interval.

Equation (16) is used to convert number density particle size distribution to mass-density particle size distribution.

$\beta_0$ and $K_D$ are dependent on the precipitate material and thus form additional bioparameters 6408 which are determined using the precipitation properties measuring tools 72. This is done by means of a computer model of precipitation which includes a method of moments analysis from which the rates are calculated for different particle size distributions after different aging times, or combinations of different aging times and mean shear rate, G.

In this embodiment, the aggregation and breakage rates are assumed to be functions (as opposed to constants) of the form $\beta_0 = A_{up}\exp(G/B_{up})$ and $K_D = H_{up}G + D_{up}$ where G represents the extent of shear experienced by the biomaterial within the precipitation tank and $A_{up}$, $B_{up}$, $H_{up}$ and $D_{up}$ are constants which depend on the precipitation agent used and the biomaterial. In other words, these are additional bioparameters, and they are found using precipitation properties measuring tools 72 by conducting a series of small scale experiments in which the biomaterial being processed is subjected to different shear rates and by plotting graphs to determine intercepts.

The output bioparameters 6411 ($m_{dr}$, $d_{50dr}$, $w_{dr}$, $R_{dr}$, $E_{dr}$, $V_{up}$, $d_{50up}$, $w_{up}$, $F_R$ and $F_E$) from the unwanted protein precipitation model 6410 are input to the precipitation removal centrifugation model 6230.

Precipitates Removal Centrifugation Model 6230

Precipitates removal centrifugation is carried out to get rid of some of the unwanted protein.

This model is similar to the two previous centrifugation models 6210 and 6220, except that the shear stress generated by the centrifuge device being modelled is significant because the precipitate particles are shear sensitive. The effect of shear is to reduce the average size of the protein precipitates, thus making it harder for the centrifuge device to sediment these particles out. Consequently, there is an increase in the amount of unwanted protein precipitates passing through the centrifuge device as part of the supernatant.

The output parameters from the precipitates removal centrifugation stage include the following output parameters unchanged from the preceding stage: the mass of cell debris, $m_h$, generated in the homogenisation stage, the amount, $R_{dr}$ of total protein and the amount $E_{dr}$, of alcohol dehydrogenase passing from the cell debris centrifugation stage in the supernatant, and the following bioparameters determined during the modelling step: the volume, $V_{pr}$ of supernatant, the mass, $m_{pr}$, of cell debris carried through in the supernatant, the particle size distribution, $d_{50pr}$ and $w_{pr}$, of cell debris carried through in the supernatant, the amount, $R_{pr}$, of total protein and the amount, $E_{pr}$, of alcohol dehydrogenase carried through in the supernatant, and the time taken, $t_{pr}$, for the centrifuge to fill up.

Note that the particle size distribution of the fraction of precipitate particles carried through in the supernatant is not determined. This is because, in the following stage of wanted protein precipitation, a new population of precipitates is created which is a combination of old precipitates carried through in the supernatant and newly generated precipitates. As previously discussed, changes in population arise due to aggregation of smaller particles and break-up of larger particles so that, after a period of equilibration, the population of precipitate particles attains a characteristic particle size distribution, which is substantially independent of the psd of the precipitate particles carried through in the supernatant.

The additional biomaterial parameters 6228 include parameters characterising the shear sensitivity of the precipitate particles as a function of the maximum severity of shear, as expressed in Equation 17 below, the viscosity of the biomaterial as a whole, the density of the precipitate particles for the purposes of allowing the model to calculate the volume fraction of solids and the difference in densities between the biomaterial as a whole and the solid components thereof. The viscosity, the density and density difference are easily measured using standard laboratory tools forming part of the clarification and dewatering index measuring tools 74.

In order to determine the maximum extent of shear generated during feeding of biomaterial through a centrifuge feed zone, computational fluid dynamics analysis of an actual centrifuge device (i.e. centrifuge device 200 shown in FIG. 3) is used. The results of this analysis permit the model to determine the maximum severity of shear generated within the feed zone for a given speed of operation of the industrial device being modelled.

Precipitates removal centrifugation model 6230 uses the following equation to represent a fractional time-independent shear index, $I_s^{d50}$, for determining how the median diameter, $d_{50}$, of the precipitate particles varies when the particles are subjected to shear forces:

$$I_s^{d50} = 1 - c_s\left(1 - \exp\left(-\frac{(y^* - f_S)}{d_s}\right)^{e_s}\right) \quad \text{for } y^* > f_S \qquad (17)$$

$$I_s^{d50} = 1 \quad \text{for } y^* \leq f_S$$

in which:

$y^*$ is the (time-independent) severity of shear and is expressed by:

$$y^* = \left(\frac{P_{Vmax}}{\eta}\right)^{0.5} \qquad (18)$$

where $c_s$, $d_s$, $e_s$ and $f_s$ are shear index coefficients, $P_{Vmax}$ is the maximum power dissipated per unit volume, and $\eta$ is the viscosity of the biomaterial being centrifuged.

Note that for protein precipitates, the change in particle diameter is largely independent of the time spent in a high shear force (effectively the precipitate particles react very quickly to the shear forces). Therefore, it is acceptable for model 6230 to ignore the duration of the shear forces. However, in more sophisticated models which are required to model the influence of shear forces on biomaterials having a less straightforward reaction to shear forces (eg the viability of a shear sensitive biomaterial product such as a plasmid DNA) a more sophisticated shear index can be used as discussed below.

Similarly, the variation in the size distribution spread, w, of the precipitate particles as a result of subjecting the particles to shear forces is ignored in the present example. However, a more sophisticated model could use an additional shear index, $I_s^w$, for expressing how the spread w, of precipitate particles varies when the particles are subjected to shear forces.

The terms $c_s$, $d_s$, $e_s$, and $f_s$, are constants which characterise shear sensitivity. They depend upon the biomaterial of interest (in this case unwanted protein precipitate particles) and they are found experimentally using the shear index measuring tools 73.

The shear index $I_s^{d50}$ is used within model 6230 to model how the median diameter, $d_{50up}$ of the precipitate particles to be centrifuged is altered in the feed zone of the industrial centrifuge device 23 being modelled for a particular value of $y^*$ using the following equation:

$$d'_{50up} = I_s^{d50}(y^*)d_{50up} \qquad (19)$$

giving rise to a new expression for the post-shearing particle size distribution of precipitate particles, characterised by $d'_{50up}$ and $w_{up}$. This new particle size distribution is then used (together with Equation 7) to determine the fraction of material sedimented out, from which the total amount of material passing through is calculated, enabling $R_{pr}$ and $E_{pr}$ to be derived.

It will be apparent to a person skilled in the art that Equation 19 represents a specific example of a family of equations of the form:

$$prop'=I_s^{prop}(y^*)prop$$

where:
  prop' is the new value of a property,
  prop is the original value of the property, and
  $I_s^{prop}(y^*)$ is the shear index for that property.

Such properties include particular features of a size distribution of a population of precipitate particles (eg spread, w, or median diameter, $d_{50}$).

The output bioparameters 6231 ($m_h$, $R_{dr}$, $E_{dr}$, $V_{pr}$, $m_{pr}$, $d_{50pr}$, $w_{pr}$, $R_{pr}$, $E_{pr}$, $t_{pr}$) from the precipitates removal centrifugation model 6230 are then input to the wanted protein precipitation model 6420.

Wanted Protein Precipitation Model 6420

In the wanted protein precipitation stage, further precipitating agent is added to cause precipitation of alcohol dehydrogenase in a second differential precipitation operation, leaving additional unwanted proteins in solution.

This model is similar to the unwanted protein precipitation model 6410, but accounts for the proteins which were not precipitated out in the preceding precipitation stage in addition to the fraction of unwanted precipitated proteins carried in the supernatant which passed through the precipitates removal centrifugation stage. Note, as mentioned above, the model does not require the particle size distribution of the precipitate particles carried through in the supernatant.

The output bioparameters 6421 from the wanted protein precipitation model 6420 include the following output parameters unchanged from the preceding stage: the mass of cell debris, $m_h$, generated in the homogenisation stage, the mass of cell debris, $m_{pr}$, passing through the precipitation removal centrifugation stage, the particle size distribution, $d_{50pr}$ and $w_{pr}$, of the cell debris passing through the precipitates removal centrifugation stage, the amount, $R_{pr}$, of total protein and the amount, $E_{pr}$, of alcohol dehydrogenase passing through the precipitates removal centrifugation stage in the supernatant, and the following bioparameters determined during the modelling step: the particle size distribution, $d_{50wp}$ and $w_{wp}$, of the precipitates formed in the second differential precipitation step, and the fractions $F_R'$ and $F_E'$ of total protein and alcohol dehydrogenase, respectively, that remain soluble in the supernatant.

For the sake of simplicity, the model assumes that the values of $\alpha$ and $m$ determined in the first differential precipitation stage are still valid for the second differential precipitation stage.

In order to determine the fractions $F_R'$ and $F_E'$ of total protein and alcohol dehydrogenase that remain soluble, Equation 12 is reapplied using the new value $C_{pa}$ for concentration of the precipitating agent. Ideally, the operator selects a value for $C_{pa}$ which gives a small fraction $F_E'$ of alcohol dehydrogenase remaining in solution. The majority of the wanted enzyme should be precipitated so that it can be collected in the next stage.

The output bioparameters 6421 ($m_h$, $m_{pr}$, $d_{50pr}$, $W_{pr}$, $R_{pr}$, $E_{pr}$, $d_{50wp}$, $w_{wp}$, $F_R'$, $F_E'$) from the wanted protein precipitation model 6420 are input to the precipitates recovery centrifugation model 6240.

Precipitates Recovery Centrifugation Model 6240

In the precipitates recovery centrifugation stage, the precipitates containing the wanted enzyme alcohol dehydrogenase are separated from the bulk liquid which contains further unwanted proteins.

This model is similar to the precipitates removal centrifugation model 6230, except that in this case it is the sediment which is wanted instead of the supernatant.

The output biomaterial parameters 6241 from the precipitates recovery centrifugation model 6240 include just one output parameter unchanged from the preceding stage: the mass of cell debris, $m_h$, generated in the homogenisation stage, and the following bioparameters determined during the modelling step: the mass, $m_{ph}$, of cell debris carried through in the sediment, the amount $R_{ph}$ of total protein and the amount $E_{ph}$ of alcohol dehydrogenase recovered in the sediment, and the time taken, $t_{ph}$, for the centrifuge to fill up.

Again, it takes account of the shear sensitivity of the protein precipitates. A new shear index $I_s$ specific to the alcohol dehydrogenase-rich precipitate particles may be required. This will depend on the other proteins being precipitated in the respective precipitation stages. Note that the shear sensitivity of the alcohol dehydrogenase-rich precipitates is one of the additional bioparameters 6238 directly entered to model 6240 without having passed through preceding models.

Chromatography Model 6500

The bioparameters 6501 output from chromatography model 6500 output are the amount of product output from the chromatography column and the amount of any contaminants also output from the chromatography column.

In this example, size-exclusion chromatography or gel filtration is used and chromatography model 6500 uses the following equations as the basis of its modelling process:

$$D_L' \frac{\partial^2 C}{\partial z^2} - u \frac{\partial C}{\partial z} - \frac{3k_f}{m_\varepsilon R_p}\left(C - C_p\big|_{r=R_p}\right) = \frac{\partial C}{\partial t} \quad (20)$$

$$\varepsilon_p' \frac{\partial C_p}{\partial t} = D_e'\left(\frac{\partial^2 C_p}{\partial r^2} + \frac{2}{r}\frac{\partial C_p}{\partial r}\right) \quad (21)$$

In which $D_L'$ is the modified convective axial dispersion coefficient,

C is the concentration of the solute of interest (ie either the wanted enzyme or a contaminant protein) as a function of time, t, and axial distance through the column z, u is the interstitial fluid velocity, based on the area $\epsilon A$ where $\epsilon$ is the inter particle void fraction within the packed bed of the chromatography column and A is the internal cross-sectional area of the chromatography column, $k_f$ is the fluid-phase mass transfer coefficient, $m_\epsilon$ is given by $\epsilon/(1-\epsilon)$, $R_p$ is the mean stationary phase particle radius, $C_p|_r=R_p$ is the concentration of the solute of interest within a pore of a stationary phase particle at a distance from the centre of the particle of $r=R_p$, as a function of time, t, and axial distance, z, $C_p$ is the concentration of the solute of interest within a pore of a stationary phase particle as a function of time, t, axial distance, z, and distance, r, from the centre of the particle, $\epsilon_p'$ is the modified intraparticle inclusion porosity of the solute of interest, and $D_e'$ is the modified effective intraparticle diffusivity of the solute of interest.

Coupled equations (20) and (21) can be solved in the Laplacian domain (provided various boundary conditions, which are determined by analysing the physical conditions of the chromatography process being modelled, are met).

The solution in the Laplacian domain derived in this way is given below in equation (22):

$$\overline{C}(z,s) = C_0 \exp\left\{\left[\frac{u}{2D_L} - \sqrt{\left(\frac{u}{2D_L}\right)^2 + \frac{s}{D_L} + \frac{3k_f}{mD_L R_P}\alpha(s)}\right]z\right\} \quad (22)$$

where s is the Laplace transform variable and $\alpha(s)$ is given by:

$$\alpha(s) = \frac{\sqrt{\frac{\varepsilon_p s}{D_e}}\cosh\sqrt{\frac{\varepsilon_p s}{D_e}}R_P - \frac{1}{R_P}\sqrt{\frac{\varepsilon_p s}{D_e}}R_P}{\sqrt{\frac{\varepsilon_p s}{D_e}}\cosh\sqrt{\frac{\varepsilon_p s}{D_e}}R_P + \left(\frac{k_f}{D_e} - \frac{1}{R_P}\right)\sinh\sqrt{\frac{\varepsilon_p s}{D_e}}R_P}$$

assuming the following initial and boundary conditions:

$$C(z,0) = 0$$
$$C_P(r,z,0) = 0$$
$$C(0,t) = \begin{cases} C_0 & 0 \leq t \leq t_0 \\ 0 & t_0 \leq t \end{cases}$$
$$C(\infty, t) = 0$$
$$C_P(0,z,t) \neq \infty$$

where $C_0$ represents the pulse or sample concentration, and wherein the mobile phase and stationary phase expressions are related by the matching condition of flux continuity at the particle surface:

$$k_f(C - C_P)\Big|_{r=R_P} = De\frac{\partial C_P}{\partial C_r}\Big|_{r=R_P}$$

The computer model calculates a plurality of values of C(s) (ie at different values of s with z fixed as equal to the length of the packed bed—note this length is considered to be an operating parameter) and then performs a fast Fourier transformation on the values to convert the concentration, $\overline{C}$, back to the time domain. The computer model can then use this information to calculate the total amount of either the wanted enzyme or the total protein obtained by collecting the output stream for a particular period. By expressing the collection period in terms of a time of commencement operating parameter and a duration of collection operating parameter, the results of the model can be displayed in a convenient windows of operation style display (see the description of FIG. 14). Note that the computer model performs the above described process three times (once with the modified transport parameters $D_L'$, $D_e'$ and $\epsilon_p'$ corresponding to the wanted enzyme and once each with the modified transport parameters $D_L'$, $D_e'$ and $\epsilon_p'$ corresponding to the contaminant proteins which elute immediately before and after the wanted enzyme). In this way, windows of operation can be displayed which will highlight collection periods for which less than a specified amount of contaminant proteins and more than a specified amount of wanted enzyme can be collected.

Note that $D_L'$, $D_e'$ and $\epsilon_p'$ are all expressed as the following functions of respective fouling indices $I_{f1}$, $I_{f2}$, $I_{f3}$, which are modifying factors reflecting the susceptibility of the column stationary phase to fouling and the susceptibility of the biomaterial being processed to cause fouling, and the unmodified transport parameters $D_L$, $D_e$ and $\epsilon_p$, which are biomaterial specific parameters which must be separately measured for each biomaterial of interest (ie the wanted enzyme and the contaminant proteins which elute immediately before and after the wanted enzyme):

$$D_L' = D_L I_{f1} \quad (23)$$

$$D_e' = D_e I_{f2} \quad (24)$$

$$\epsilon_p' = \epsilon_p I_{f3} \quad (25)$$

where $I_{f1}$, $I_{f2}$ and $I_{f3}$ are assumed to be functions of the percentage of cell debris remaining in the biomaterial entering the chromatography stage:

$$I_{f1} = 1 + b_{f1}(\% \text{ of cell debris}) \quad (26)$$

$$I_{f2} = 1 + b_{f2}(\% \text{ of cell debris}) \quad (27)$$

$$I_{f3} 1 + b_{f2}(\% \text{ of cell debris}) \quad (28)$$

where $b_{f1}$, $b_{f2}$ and $b_{f3}$ are constants which depend on the biomaterial to be centrifuged. In the present model, the percentage of cell debris is used as an approximation of the proportion of homogenate remaining in the biomaterial.

The biomaterial parameters $k_f$, $D_L$, $D_e$ and $\epsilon_p$ (for the wanted enzyme and the contaminant proteins) and $b_{f1}$, $b_{f2}$ and $b_{f3}$ are entered by a user as the additional bioparameters 6498. Fouling index measuring tools 75 can be used to measure all of the additional bioparameters 6498. The percentage of cell debris is calculated from the mass of cell debris generated during homogenisation, $m_h$, and the mass of cell debris carried through in the sediment from the precipitates recovery centrifugation model, $m_{ph}$, both of which values are passed on from the previous centrifugation model 6240 as two of parameters 6241. The variables m and $R_p$ depend only on the stationary phase used within the chromatography column and they will usually be given by the manufacturer of the matrix (eg Sepharose) used in the chromatography column and can be input to the model as additional bioparameters 6498. The variable u which represents the speed of the mobile phase relative to the stationary phase is input as an operating parameter 6499.

Obtaining Input Bioparameters for Computer Simulation

There is now described how the required input biomaterial parameters for the above-described simulation may be found, using the various measuring tools 71, 72, 73, 74, 75 in the present embodiment which concerns a method of producing the enzyme alcohol dehydrogenase. The complete method for producing alcohol dehydrogenase according to the present embodiment includes the following steps. Firstly, a reasonable first guess of a suitable process for isolating the alcohol dehydrogenase is determined. For this example, the process described with reference to FIG. 1 was selected. Secondly, a computer simulation of this process is made on industrial process simulation device 60. For this example the computer simulation illustrated in FIG. 8 is selected. Thirdly, various scale down experiments are carried out using the various measuring tools 71, 72, 73, 74, 75 to provide a systematic method of determining at least some of the biomaterial parameters used within the simulation. At this stage, process engineers experiment with different operating parameters in the simulation until the simulation indicates acceptable values of important output parameters such as percentage yield, amount of product produced per unit time and purity of the output biomaterial product, etc. Once suitable operating parameters for the various stages of the process have been determined in this way, the process is scaled up to a full industrial scale process.

Input Bioparameters for Fermentation Model 6100

The input bioparameters required by the fermentation model 6100 are the yield coefficients of protein, $Y_p$, and enzyme $Y_E$, per unit mass of biomass (ie constants of proportionality) and the coefficients $a_1$, $a_2$, $b_1$ and $b_2$ which specify the dependence of the particle (cell) size distribution of the fermented yeast culture.

The yield coefficients $Y_p$, $Y_E$ are obtained by performing the following scale down experiment. A test quantity of liquor is fermented for a predetermined time and then subjected to centrifugation in a laboratory centrifuge. The centrifuge is operated at high speed for a protracted period to obtain a thoroughly dewatered sample of biomass sediment. Then a sample of the sediment is taken from that part of the sediment which is most throughly dewatered. This sample is then weighed, resuspended in a neutral buffer and passed through a homogeniser. The homogeniser is operated at a relatively high pressure (eg 100 MPa) and the homogenate is passed through the homogeniser a relatively large number of times (eg 8 passes) to ensure that essentially all of the proteins contained within the fermented cells are released. The biomaterial output from this homogenisation stage is then divided into four equal portions which are tested using commercially available assays to determine the total amount of protein (in 2 out of the 4 portions) and the total amount of alcohol dehydrogenase (in the remaining 2 portions). The average of each pair of assays is taken and used to calculate $Y_p$ and $Y_E$ respectively in relation to the previously-weighed sample of biomass.

The coefficients $a_1$, $a_2$, $b_1$ and $b_2$ are determined by fermenting a plurality of test quantities of the yeast culture at different growth rates and obtaining the values of $d_{50f}$ and $w_f$ which most closely fit the particle (cell) size distributions resulting therefrom. In the present example, $d_{50f}$ and $w_f$ were obtained by measuring the cell sizes found in samples of the yeast cultures. These measurements were made using an electrical sensing zone method employing an Elzone model 80XY (Particle Data Ltd.) arranged to detect particles whose diameters range from 1.00–15.01 μm. This range is divided into 128 size sub-ranges. In the present case, yeast cultures were fermented at three different growth rates, $\mu_1$, $\mu_2$, $\mu_3$. The particle (cell) size distributions resulting from these fermentations were analysed to obtain three different values for $d_{50f}$ and $w_f$, namely $d_{50f}(\mu_1)$, $d_{50f}(\mu_2)$, $d_{50f}(\mu_3)$ and $w_f(\mu_1)$, $w_f(\mu_2)$, $w_f(\mu_3)$. The three values for $d_{50f}$ were then used to calculate appropriate values for $a_1$ and $a_2$ and the three values of $w_f$ were used to calculate appropriate values for $b_1$ and $b_2$.

Input Bioparameters for Harvest Centrifugation Model 6210

The input bioparameters required by the Harvest Centrifugation Model 6210 are the particle (cell) size distribution parameters $d_{50f}$ and $w_f$ of the fermented cell culture, the total biomass of the cells, $m_f$, and the volume of biomaterial, $V_f$, all of which are output from the preceding model 6100, together with the additional bioparameters of the difference in density between the cells and the fermentation broth, $\Delta\rho$, the density of the cells, $\rho_f$, for use by the model 6210 in calculating $C_v$ and the viscosity of the fermentation broth, $\eta$, all of which are input as the additional bioparameters 6208.

The difference in density $\Delta\rho$ is determined by isolating (eg by spinning a sample of fermented broth in a laboratory centrifuge) and measuring the density of the cells and separately measuring the density of the original broth and taking the difference between these values. In order to measure the density of the cells, it is convenient to use a technique in which the isolated cells are divided up into a number of different portions which are resuspended in respective materials with incrementally increasing densities. Each of these suspensions is then centrifuged in a laboratory centrifuge. Since the cells will only sediment out of a suspension having a density which is less than that of the cells, the density of the cells is determined approximately by noting the least dense suspension for which the cells do not sediment out (or the most dense suspension for which the cells are sedimented out). In order to measure the density of the original broth, it is convenient simply to use a specific gravity bottle.

The density of cells $\mu_f$ for use in calculating $C_v$ is measured by spinning a sample of the biomaterial at a high speed and measuring the fraction of the total volume occupied by the sediment (using a graduated tube designed for such a purpose within the centrifuge). By correlating the volume fraction of the solids measured in this way with the original mass contained within the sample, the density of the cells is calculated. The density value obtained in this way is convenient for use by the model in estimating the volume fraction of the biomaterial output from the fermentation stage as a function of the total biomass and the total volume of biomaterial.

The viscosity, $\eta$, of the biomaterial (which in this case is the fermented broth) is directly measured using a viscometer.

It can therefore be seen that the clarification and de-watering measuring tools 74 include a laboratory centrifuge, a specific gravity bottle and a viscometer.

Input Bioparameters for Homogenisation Model 6300

The input bioparameters required by homogenisation model 6300 are the mass of harvested cells, $m_{hc}$, the maximum amounts of total protein, $R_{hc}$, and wanted enzyme $E_{hc}$, the cell size distribution parameters, $d_{50hc}$ and $w_{hc}$, and constants $a_h$, $K_h$, $b_{hd}$, $b_{hw}$, $C_{hd}$, $C_{hw1}$ and $C_{hw2}$. The input bioparameters $m_{hc}$, $R_{hc}$, $d_{50hc}$, $w_{hc}$ are all passed onto the homogenisation model 6300 from the harvest centrifugation model 6210 as part of bioparameters 6211.

The additional parameters $a_h(\mu)$, $k_h(\mu)$, $b_{hd}(\mu)$, $b_{hw}(\mu)$, $C_{hd}(\mu)$, $C_{hw1}(\mu)$ and $C_{hw2}(\mu)$ are input as additional input bioparameters 6298. Each of these additional parameters varies with growth-rate, $\mu$. In order to account for this variation with growth-rate, each of these parameters is determined at a number of different growth rates to generate specific points (each point corresponds to a value for one of the parameters and the corresponding value of the growth rate). The points generated in this way are then entered into the homogenisation model 6300 as described below with reference to FIG. 12. The homogenisation model 6300 then uses these points to generate a function for each parameter which describes how the parameter varies with growth-rate and which is correct at the entered points. In the present case, the function takes the form of straight-line interpolations between the entered points.

In order to determine $a_h$ and $K_h$ for a particular value of the growth-rate $\mu$, in the present example, a quantity of the yeast culture is fermented at the desired growth-rate. The resulting yeast culture is then harvested in a laboratory centrifuge and resuspended in a neutral buffer. The resuspended culture is then divided into three equal portions such that approximately the same quantity of biomass is contained in each portion. One of these portions is then homogenised at high pressure (ie at approximately 100 MPa) for a large number of passes through the homogeniser (ie N=10 passes) and then an assay is performed on the resulting homogenised solution to determine an approximate figure for the maximum amount of total protein contained within each portion. Secondly, one of the two remaining portions is homogenised at a lower pressure (ie 80 MPa) with only a single pass through the homogeniser and a similar assay is performed to establish the amount of protein released in this case. Finally, the third portion is homogenised at a third pressure (ie 40 MPa) again with only a single pass through the homogeniser and a similar assay is performed to establish the amount of protein released in this case. The value for $a_h$ is then derived by expressing these results in terms of the Hetherington equation (see equation 8) to generate two simultaneous equations which are solved to find $a_h$ and thereafter $K_h$.

By noting that equations 10 and 11 can be reformulated to correspond to the form of equations (8) and (9) (except that $b_{hd}$ and $b_{hw}$ are negative exponents to which N is raised and $\Delta P$ is raised to the exponent $-1$), a similar approach to that described above can be used to determine values for $C_{hd}$, $C_{hw1}$, $C_{hw2}$, $b_{hd}$ and $b_{hw}$ for a given growth-rate. Thus, in the present case, a quantity of yeast culture is fermented at the desired growth-rate and harvested. The particle (cell) size distribution of the harvested cell culture is then measured to determine values for $d_{50hc}$ and $w_{hc}$, using a sample from the harvested cell culture. The remainder of the harvested cell culture is then resuspended in a neutral buffer and divided into three equal portions which are homogenised at a moderate pressure (ie 50 MPa) with each portion being passed through the homogeniser a different number of times. The resulting particle size distributions of the first, second and third portions after homogenisation are then determined and from this information the six resulting simultaneous equations are solved to obtain values for $C_{hd}$, $C_{hw1}$, $C_{hw2}$, $b_{hd}$ and $b_{hw}$.

In order to measure the particle size distribution, the electrical zone sensing method as described above with relation to obtaining the input bioparameters for the fermentation model could have been used. However, in the present case an alternative method was used. In the alternative method, the first and second portions after homogenisation are each further sub-divided into 3 sub-portions which are then spun at different speeds in a laboratory centrifuge and the mass of the resulting sediment is measured for each sub-portion. The measured masses are then input to the laboratory centrifuge model 7200 in terms of the percentage of mass recovered by the centrifuge as "output" bioparameter 7201 together with the required operating parameters 7199 (ie the spin speed associated with each sub-portion and the time of spinning). The model 7200 uses the operating parameters to determine a value for the critical diameter $d_c$ (see equation 7) and then the model 7200 iteratively selects different values for $d_{50}$ and w and compares the predicted values of recovered masses for the given operating parameters with the selected values of the $d_{50}$ and w until values for $d_{50}$ and w are found for which the predicted values of the recovered masses compare well with the measured values. In the present case, the model assumes the following relationship exists between $d_{50}$ and w to ensure that a unique solution for both $d_{50}$ and w is found:

$w^* = -2.3 d^*_{50}$ for $d^*_{50} < 0.33$ $w^* = 5.5 d^*_{50} - 2.4$ for $d^*_{50} \geq 0.33$ where $d^*_{50} = (d_{50hc} - d_{50h})/d_{50hc}$ and $W^* = (w_{hc} - w_h)/w_{hc}$ Input Bioparameters for Cell Debris Removal Centrifugation Model 6200

The input bioparameters required by the cell debris removal centrifugation model 6220 are the particle size distribution parameters $d_{50h}$, and $w_h$ of the debris formed as a result of breaking up the yeast cells during homogenisation, the total biomass of the cell debris, $m_h$, and the total volume of biomaterial, $V_f$, output from the homogenisation stage, all of which are output from the preceding model 6300. Model 6220 also requires the additional bioparameters of the difference in density between the cell debris and the density of the biomaterial output from the homogenisation stage as a whole, and the viscosity, $\eta$, of the cell homogenate, both of which are input as additional bioparameters 6218.

As before, in the harvest centrifugation model 6210, the density difference is determined by isolating a small sample of cell wall debris, measuring its density and comparing this with the directly measured density of the biomaterial output from the preceding stage (in this case the homogenate output from the homogeniser) similarly, the viscosity of the biomaterial is again directly measured using a viscometer.

Finally, the model also requires the volume fraction of solids, $C_v$. This is again evaluated using the method described above with reference to the harvest centrifugation stage.

Input Bioparameters for Unwanted Protein Precipitation Model 6410

The input bioparameters required by the unwanted protein precipitation model 6410 are:
  the amounts of total protein, $R_{dr}$, and wanted enzyme, $E_{dr}$;
  the total volume, $V_{dr}$, of biomaterial passed on from the cell debris removal centrifugation stage;
  the constants $\alpha_p$, and $m_p$ which characterise the solubilities of the total protein contained in the biomaterial and the constants $\alpha_E$ and $m_E$ which characterise the solubility of the wanted enzyme contained within the biomaterial; and
  the constants $A_{up}$, $B_{up}$, $H_{up}$ and $D_{up}$ which express how the aggregation and breakage rates $\beta_o$ and $K_D$ vary according to the extent of shear, G, experienced by the biomaterial within the precipitation tank.

The amounts of total protein, $R_{dr}$, and wanted enzyme, $E_{dr}$, and the total volume, $V_{dr}$, of biomaterial passed on from the cell debris removal centrifugation stage are passed on to the unwanted protein precipitation model 6410 from the preceding model 6220. The solubility constants $\alpha_p$, $m_p$, $\alpha_E$ and $m_E$ are determined by performing small scale experiments in which the fractions of total protein and wanted enzyme precipitated out are measured separately as a function of the percentage saturation of a precipitation agent. Similarly, the constants $A_{up}$, $B_{up}$, $H_{up}$ and $D_{up}$ are determined by performing small scale experiments in which the shear rate applied to the precipitating solution is varied and the particle size distributions of the resulting precipitate particles are measured at different aging times. The measured distributions are then compared to the predicted distributions from models using iteratively chosen values for the constants until a good match is found between the predicted and measured values of the particle size distribution.

Input Bioparameters for Precipitates Removal Centrifugation Model 6230

A first set of the input bioparameters required by the precipitates removal centrifugation model 6230 are the amounts of total protein, $R_{dr}$, and wanted enzyme, $E_{dr}$, contained in the output from the preceding stage, the total volume, $V_{up}$ of biomaterial output from the preceding stage, the proportions of the total protein, $F_R$, and the wanted enzyme, $F_E$, which remain in solution, the particle size distribution, $d_{50up}$ and $w_{up}$, of the precipitate particles, the total amount, $m_{dr}$, of cell debris remaining in the biomaterial, and the particle size distribution, $d_{50dr}$ and $w_{dr}$, of the cell debris. All of these parameters are directly passed on to the precipitates removal centrifugation model 6230 from the preceding model. The precipitates removal centrifugation model also requires the volume fraction of solids, $C_v$, which is calculated from the parameters directly passed on from the preceding model in the way described above with regard to the harvest centrifugation model 6210.

The precipitates removal centrifugation model 6230 also requires the differences in density between the precipitate particles and the biomaterial as a whole and between the cell debris and the biomaterial as a whole.

These differences are calculated from direct measurements of the density of the precipitate particles, the density of the biomaterial as a whole, and the density of the cell debris previously determined. The viscosity of the biomaterial is also required by the precipitates removal centrifugation model 6230 and is again directly measured using a viscometer.

Further input biomaterial parameters required by the precipitates removal centrifugation model are the shear coefficients $c_s$, $d_s$, $e_s$, and $f_s$. These parameters are measured in the following way.

A small scale experiment is conducted to generate precipitate particles which are similar to those that would be generated at an industrial scale (ie by precipitating out particles from the homogenate from one of the small scale experiments described above) and dividing the precipitate particle suspension into a plurality of different portions. Each of the different portions is then subjected to a different predetermined severity of shear, $y^*$, in the small scale rotating disk device. This is done by rotating the disk at a predetermined speed which generates the desired shear severity in a region of the device, and operating the device for a time (eg>20 secs.) sufficient to ensure that substantially the entire portion is effectively sheared. The resulting particle size distributions are measured and compared with the particle size distribution prior to being sheared. Using this information equation (19) is applied to plot a plurality of different values for $I_s^{d50}$ against different severities of shear, $y^*$. Optimum values for $c_s$, $d_s$, $e_s$, and $f_s$ are then determined by fitting equation 17 to these plots using a commercially available software package (eg MatLab), provided at least four different points are determined.

$$I_s^{d50} = 1 - c_s\left(1 - \exp\left(-\frac{y^* - f_s}{d_s}\right)^{e_s}\right) \text{ for } y^* > f_s \quad (17)$$

$$d'_{50up} = I_s^{d50}(y^*)d_{50up} \quad (19)$$

The relationship between the speed of operation of the scale down rotating disk device and the maximum severity of shear $y^*$ is modelled by the computer model 7100 using the following equation:

$$y^* = u_r/\delta \quad (29)$$

where $u_r$ is the maximum velocity of the rotating device and $\delta$ is a defined distance (ie distance away from the surface of the disk) over which the shear forces apply and is determined using a computational fluid dynamics analysis of the rotating disk device. To enhance the values for the shear coefficients determined in this way, the computer model 7100 is pre-correlated to the precipitates removal and recovery centrifugation models 6230 and 6240 by determining what speeds of operation of the industrial centrifuge device being modelled correspond to what speeds of operation of the scale down rotating disk device.

Input Bioparameters for Wanted Protein Precipitation Model 6420

The input bioparameters required by the wanted protein precipitation model 6420 are:

the amounts of total protein, $R_{pr}$, and wanted enzyme, $E_{pr}$;

the total volume, $V_{pr}$, of biomaterial passed on from the precipitates removal centrifugation stage;

the constants $\alpha_p$ and $m_p$ which characterise the solubility of all of the proteins contained within the biomaterial when considered as a whole and the constants $\alpha_E$ and $m_E$ which characterise the solubility of the wanted enzyme alone contained within the biomaterial; and the constants $A_{up}$, $B_{up}$, $H_{up}$ and $D_{up}$ which express how the aggregation and breakage rates $\beta_0$ and $k_d$ vary according to extent of shear, G, experienced by the biomaterial within the precipitation tank.

The amounts of total protein, $R_{pr}$, and wanted enzyme, $E_{pr}$, and the total volume of biomaterial are directly passed onto the wanted protein precipitation model 6420 from the preceding model 6230. In the present case, the wanted protein precipitation model 6420 uses the same values for the solubility constants as were determined for the unwanted protein precipitation model 6410. Similarly, the constants $A_{up}$, $B_{up}$, $H_{up}$ and $D_{up}$ are simply reused from the earlier unwanted protein precipitation model 6410.

Input Bioparameters for Precipitates Recovery Centrifugation Model 6240

The input bioparameters required by the precipitates recovery centrifugation model 6240 correspond exactly to those required by the earlier precipitates removal centrifugation model 6230. In some cases updated values are used (ie the amount of total protein, $R_{pr}$, in the biomaterial, the amount of wanted enzyme, $E_{pr}$, in the biomaterial, the fractions $F'_R$, $F'_E$ of these remaining soluble, and the total volume, $V_{up}$, of biomaterial) which are calculated and passed on directly to the precipitates recovery centrifugation model 6240 from the preceding wanted protein precipitation model 6420. For most of the other parameters, the same values are used as were used in the precipitates removal centrifugation model 6230. However, the density of the biomaterial as a whole is re-measured and used to determine the difference in density between the solid component and the biomaterial as a whole. Also, the viscosity of the biomaterial is re-measured using a viscometer.

Input Bioparameters for Chromatography Model 6500

The input bioparameters required by the chromatography model 6500 are:

the amounts of total protein, $R_{ph}$, and wanted enzyme, $E_{ph}$;

the mass of cell debris, $m_h$, output from the homogenisation model 6300;

the mass of cell debris, $m_{ph}$, contained in the sediment output from the precipitates removal centrifugation model 6240;

the length, L, of the chromatography column;

the total volume, $V_c$, of biomaterial passing into the chromatography stage;

the interparticle void fraction, $\epsilon$;

the mean stationary phase particle radius, $R_p$;

the interstitial fluid velocity, u;

the time elapsed after commencement of elution, t;

the fluid phase mass transfer coefficient, $k_f$, for separately describing the behaviour of each of the protein contaminants eluting directly before and after the wanted enzyme as well as that for the wanted enzyme itself (ie 3 separate values of $k_f$ are required);

the axial dispersion coefficient, $D_L$, for separately describing the behaviour of each of the protein contaminants eluting directly before and after the wanted enzyme as well as that for the wanted enzyme itself (ie 3 separate values of $D_L$ are required);

the intra-particle inclusion porosity of the solute, $\epsilon_p$, for separately describing the behaviour of each of the protein contaminants eluting directly before and after the wanted enzyme as well as that for the wanted enzyme itself (ie 3 separate values of $\epsilon_p$ are required);

the intra-particle diffusivity, $D_e$, for separately describing the behaviour of each of the protein contaminants eluting directly before and after the wanted enzyme as well as that for the wanted enzyme itself (ie 3 separate values of $D_e$ are required); and the input bioparameters, $b_{f1}$, $b_{f2}$ and $b_{f3}$ which are used to calculate the fouling indices $I_{f1}$, $I_{f2}$ and $I_{f3}$ for a given percentage of cell debris.

The amounts of total protein, $R_{ph}$, and wanted enzyme, $E_{ph}$, and the masses of cell debris output from the homogenisation stage, $m_h$, and from the precipitates recovery centrifugation, $m_{ph}$, are all passed onto the chromatography model 6500 directly from the precipitates recovery centrifugation model 6240. The chromatography model 6500 uses the two cell debris masses, $m_h$ and $m_{ph}$, to calculate the proportion of cell debris remaining in the biomaterial passing through the chromatography stage. This is used by the model in equations 26, 27 and 28.

The length of the chromatography column, L, is considered to be an operating parameter since it is measured by the operator after the chromatography column is packed.

The total volume, $V_c$, of biomaterial passing into the chromatography stage is also an operating parameter. Prior to the chromatography stage, the sediment recovered from the precipitates recovery centrifugation is redissolved in a suitable solvent. The amount of solvent used is determined by an operator and for this reason $V_c$ is an operating parameter. Chromatography model 6500 uses $V_c$ to calculate the initial concentration, $C_0$, in respect of both the total protein and the wanted enzyme for use in generating simulated chromatograms);

The inter-particle void fraction, $\epsilon$, and the mean stationary phase particle radius, $R_p$, which are both properties of the stationary phase used within the chromatography column, are considered to be operating parameters. The values of these parameters can either be measured by the operator or, in many cases, they will simply be known to the operator—eg if the manufacturers of the stationary phase supply this information;

The interstitial fluid velocity, u, and the time, t, elapsed after commencement of elution are both classic operating parameters which the operator of the simulation device can vary to optimise the simulated performance of the process.

The transport parameters $K_f$, $D_L$, $\epsilon_p$ and $D_e$ and the fouling index coefficients, $b_{f1}$, $b_{f2}$ and $b_{f3}$ which are used to calculate the fouling indices $I_{f1}$, $I_{f2}$ and $I_{f3}$, respectively (for a given proportion of cell debris) form the additional bioparameters 6498 which in the present case are calculated by the operator for the specific biomaterial to be processed by the chromatography stage, and input to the simulation device 2.

In the present case, the fluid mass transfer coefficient, $k_f$, is calculated by the user of the simulation device 2 by means of the following expression:

$$k_f = \frac{Sh \cdot D_m}{2R_p} \tag{30}$$

$$\text{where } Sh = 2 + 0.51\left[\frac{E^{1/3}(2R_p)^{4/3}\rho_{ch}}{\eta_{ch}}\right]^{0.6} Sc^{1/3}$$

and E=energy dissipation rate per unit volume;

$R_p$=particle radius $\rho_{ch}$ biomaterial density $\eta_{ch}$=biomaterial viscosity $D_m$=solute diffusivity=$(8.34\times10^{-10}T)/(\mu_{ch}(Mw)^{1/3})$ where T=absolute temperature Mw=molecular weight Sc=Schmidt no.=$\eta_{ch}/(\rho_{ch}D_m)$ The values of the transport parameters $D_L$, $D_e$ and $E_p$ are estimated for the three components that can be considered to represent any gel filtration separation; namely the product and the impurity that elutes directly before the product, and that which elutes directly after.

To determine these values a small scale separation is performed. The resultant chromatogram is divided into a large number of component samples starting with the first volume of material eluted and finishing with the last. These samples are analysed by a small scale gel electrophoresis experiment in order to determine the composition of the three peaks corresponding to the product and the two protein contaminants one of which elutes immediately before the product and the other elutes immediately after the product.

The resultant peak shapes are then used as the input to the mathematical model (equations 20 and 21) in which the three transport parameters $D_L$, $D_e$ and $\epsilon_p$ are the unknown variables. By this procedure, the changes in elution behaviour of the three components being considered are determined for a range of operating conditions. The amounts of the two protein contaminants are calculated from the known total protein, $R_{ph}$, passed to this step, divided in direct proportion according to the results of the small scale gel electrophoresis experiment.

In the present case, the unmodified transport parameters input by the user are derived from biomaterial which is as similar as possible to biomaterial which might actually be generated immediately prior to the chromatography stage in the industrial process being simulated.

To this end, in the present case, the user performs a series of scale down experiments designed to mimic the industrial process being simulated in order to generate suitable material from which to measure the transport parameters. The simulation (up to, but not including, the chromatography model 6500) is used to determine likely operating conditions for the upstream processes and this information is used to enhance the mimicking of the upstream processes.

The biomaterial thus generated is then used in a number of scale down chromatography experiments and a method of moments analysis is performed on the results of the experiments. In this way, the transport parameters are obtained. Note that in these scale down chromatography experiments, only a small amount of biomaterial is passed through the column, and therefore fouling effects can be ignored such that the measured values of the transport parameters are used as the unmodified transport parameters.

The method of moments involves conducting pulse response experiments on a scale down chromatography column at different liquid velocities. A gel electrophoresis technique is then used to generate digitised chromatograms. The first absolute and the second central moments are then evaluated by numerical integration of the digitised chromatograms. The first absolute moments are used to determine the value of the intra-particle inclusion porosity of the solute, $\epsilon_p$, while the second moments are used to determine the axial dispersion coefficient, $D_L$, and the intra-particle diffusivity, $D_e$.

In order to determine the values for $b_{f1}$, $b_{f2}$ and $b_{f3}$ a further set of scale down experiments is performed. In this set of experiments, a sample of Bovine Serum Albumin (BSA) is passed through a scale down chromatography column containing the matrix of interest and the breakthrough curve thus obtained is measured. By performing this experiment a number of times at different values of u, the transport parameters $D_L$, $\epsilon_p$ and $D_e$ can be established using the method of moments as described above. After establishing the values of the transport parameters for the unfouled column, the column is then fouled using a diluted solution of biomaterial output as a result of a small scale fermentation and homogenisation experiment using the yeast culture of interest, and performing the homogenisation at moderate severity (eg N=4, P=50 MPa). In order to foul the column, a number (eg 30) of column volumes of the diluted fouling solution are passed through the column. After fouling the column, further small scale experiments are performed to determine new values for the transport parameters for BSA in the fouled column. By fouling the column with different concentrations of the homogenate (eg 1% dilution, 2% dilution, 3% dilution) values for $b_{f1}$, $b_{f2}$ and $b_{f3}$ are calculated.

User Interface

The way in which the simulation device 60 is set up to perform the simulation described above with relation to FIG. 8 will now be described with reference to FIGS. 9, 10, 11, 12, 13 and 14 which are flowcharts describing the operation of the user interface associated with simulation device 60. In the text which follows a particular example of a user interface is described in which icons are used to represent models graphically and these may be manipulated using a mouse to "drag and drop" icons, to "press buttons", to highlight icons, etc.

Figure 9:
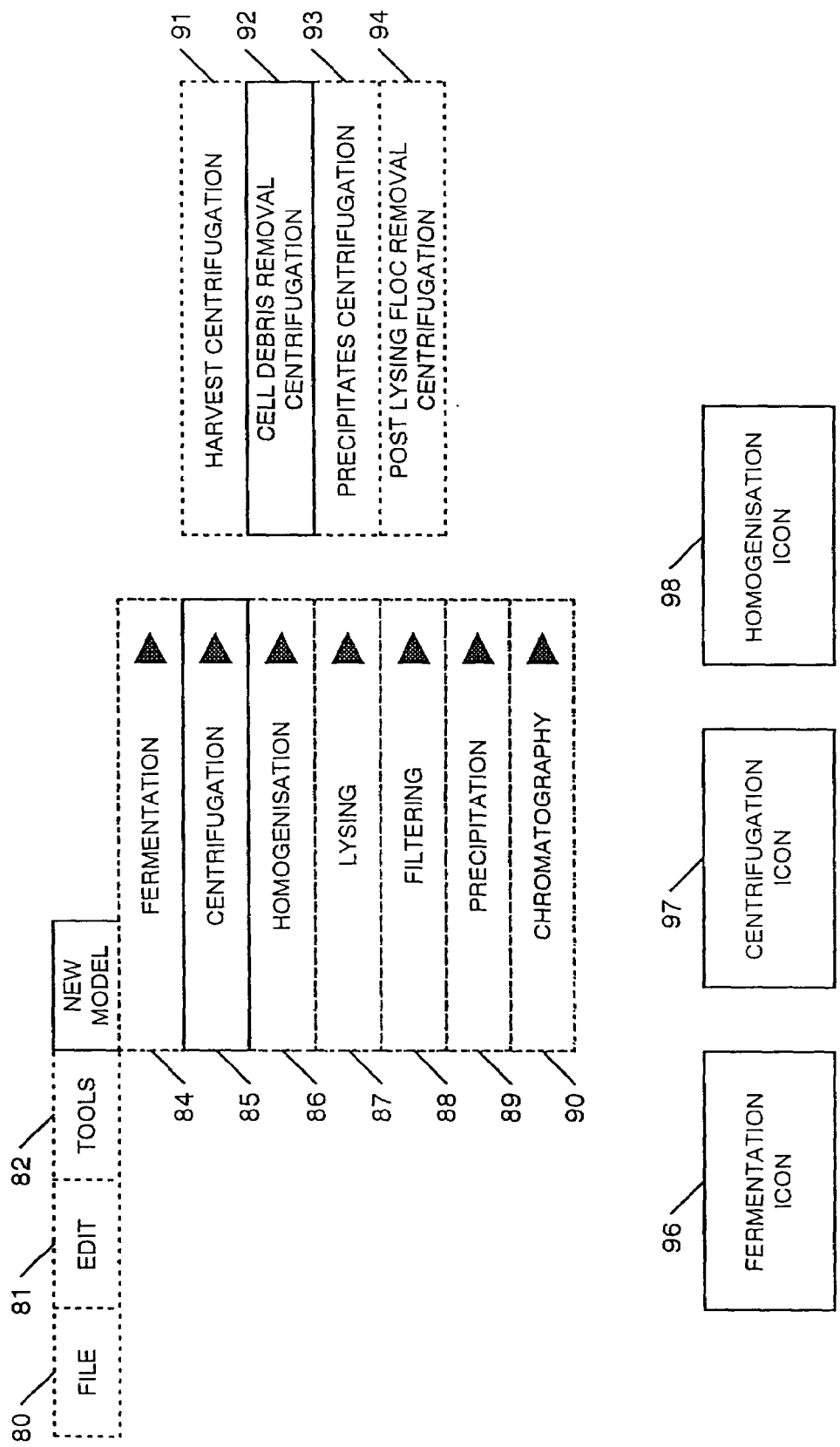
FIG. 9 is a schematic diagram of the display provided by a graphical user interface suitable for use with simulation device of the development tool of FIG. 2.

FIG. 9 illustrates a typical display produced by the graphical user interface of simulation device 60. The display includes a plurality of control buttons 80, 81, 82, 83;

a plurality of options 84, 85, 86, 87, 88, 89, 90;

a plurality of sub-options 91, 92, 93, 94 (note that the options and sub-options are contained within drop down menus); and a plurality of icons 96, 97, 98 representing industrial device or bioprocess stage models.

To arrive at the display of FIG. 9, the user interface detects that new model button 83 has been "pressed" by a user (eg by clicking on the button). In response to this, the user interface highlights the new model button 83 and displays the first drop down menu having options 84 to 90. The user interface then detects that centrifugation option 85 has been selected by a user (by holding the mouse pointer over this option). In response to this, the user interface highlights the centrifugation option 85 and displays a second drop down menu having sub-options 91 to 94. The user interface then detects that the user has moved the mouse pointer over the cell debris removal centrifugation sub-option 92. In response to this, the user interface highlights sub-option 92. If it is detected that the user selects sub-option 92 (by clicking on this sub option), the display illustrated in FIG. 10 is displayed by the user interface.

Figure 10:
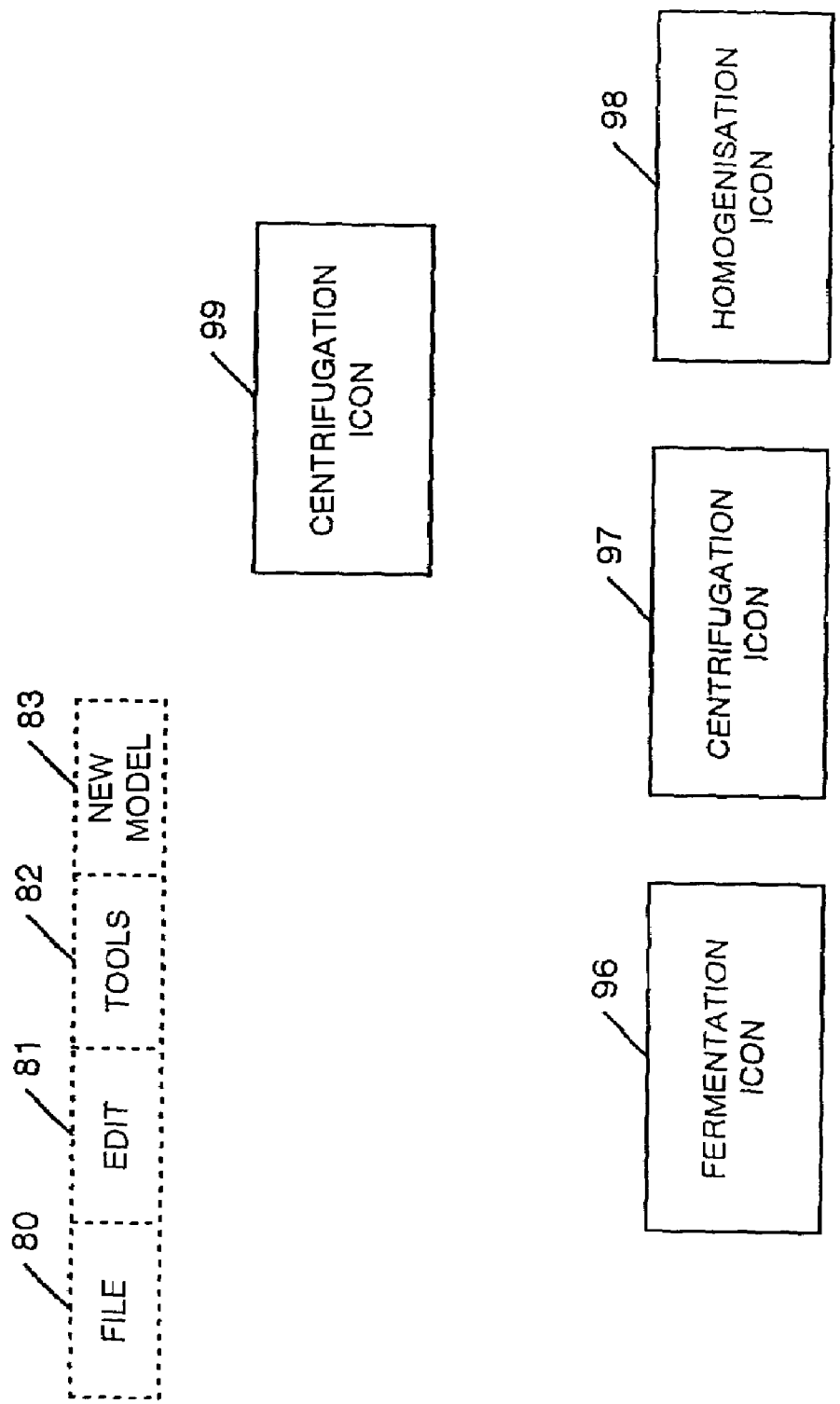
FIG. 10 is a schematic diagram similar to FIG. 9 of the display immediately following that of FIG. 9.

Referring to FIG. 10, it can be seen that once the user interface detects that sub-option 92 has been selected by a user the first and second drop down menus are erased and the new model button 83 ceases to be highlighted. In addition, the user interface now displays a new centrifugation icon 99. The new centrifugation icon 99 represents a computer model of an industrial cell debris removal centrifugation stage. When the icon 99 is initially produced, the model which it represents is a default model in which all of its parameters (including all input biomaterial parameters) have been set to default values.

Figure 11:
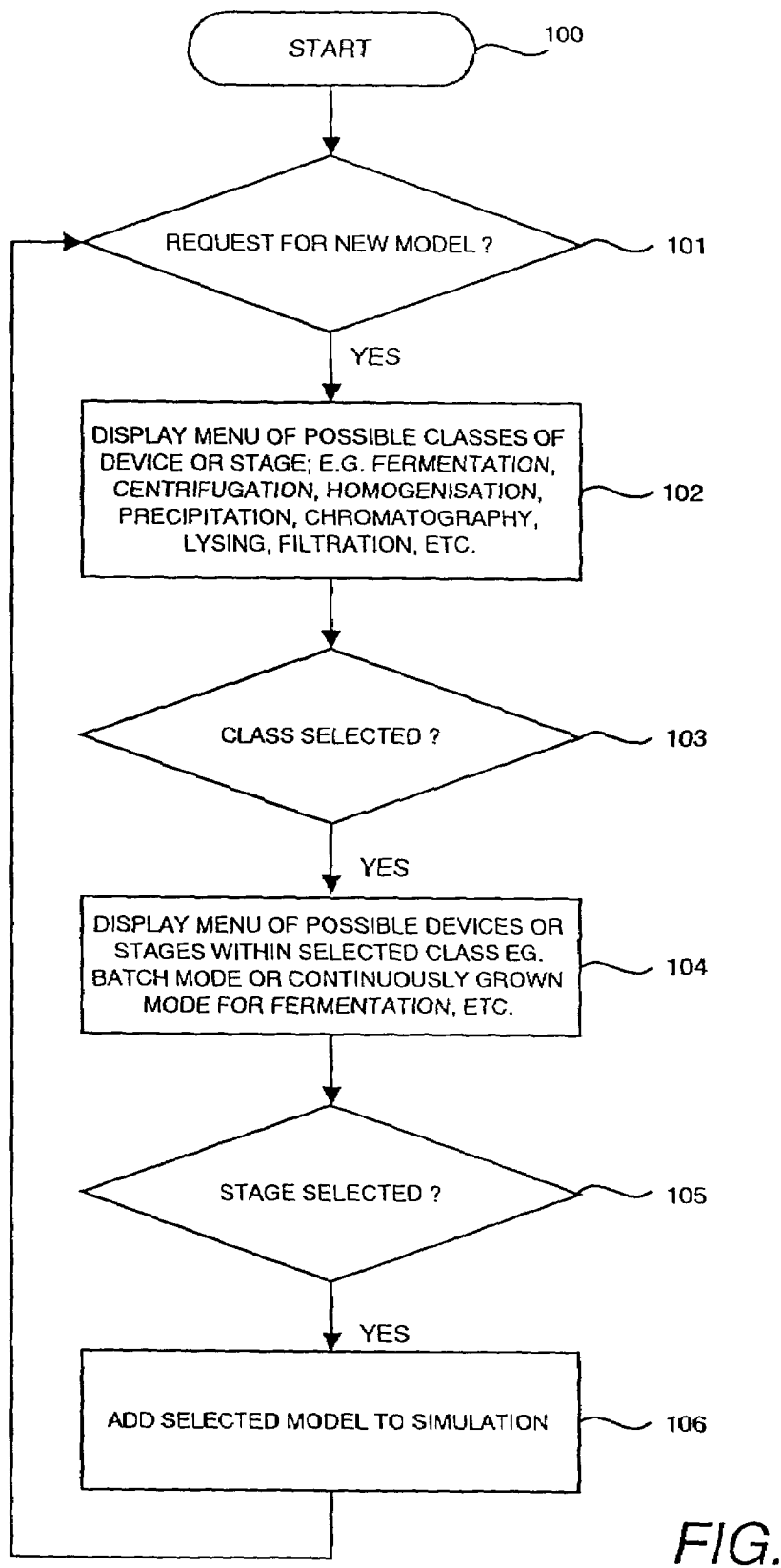
FIG. 11 is a flow diagram illustrating a procedure followed by a simulation device of the development tool of FIG. 2 by which the models used in a simulation may be selected and positioned by a user.

The procedure followed by the user interface to allow the creation of new icons representing new models to be used in a simulation will now be described with reference to FIG. 11 in addition to FIGS. 9 and 10.

Upon commencement of the method at step 100, the user interface of the simulation device 60 awaits a request from the user for a new model of an industrial bioprocess device or stage to be requested at step 101. Upon the user interface detecting such a request (by the user clicking on new model button 83 provided by the user interface), the control moves to step 102 in which a menu of possible classes of bioprocess devices or stages is displayed. In this example, the following options are displayed by the user interface:

fermentation, 84 centrifugation, 85 homogenisation, 86 lysing, 87 filtering, 88 precipitation, 89 and chromatography 90.

After displaying these options, the user interface awaits one of the options to be selected at step 103. When the user interface detects that one of these options has been selected (for example, by the user moving the pointer over centrifugation option 85), the control passes to step 104 where the different individual models available on the simulation device within the selected class are displayed. In this example, the above listed classes have the following specific model sub-options available:— fermentation—batch mode fermentation of yeast, continuously grown mode fermentation of yeast, batch mode fermentation of *E. coli*, continuously grown mode fermentation of *E. coli*;

centrifugation:—harvest centrifugation, 91, cell debris removal centrifugation, 92, protein precipitates centrifugation, 93, post-lysing floc removal centrifugation, 94;
homogenisation:—homogenisation of yeast;
lysing:—lysing of *E. coli*, lysing of yeast cells;
precipitation:—protein precipitation;
filtration:—filtration of post-lysing floc, filtration of protein precipitates, filtration of DNA plasmids;
chromatography:—size exclusion protein chromatography, size exclusion DNA plasmid chromatography.

Having displayed the appropriate options for whichever class of device or bioprocessing stage is selected in step 103, the control proceeds to step 105 where the user interface waits for the selection by the user of a particular device or stage sub-option within the selected class. When a particular device or stage has been selected by the user in stage 105 (for example cell debris removal centrifugation sub-option 92), the control proceeds to step 106 whereupon the selected model is added to the simulation (by generating a new icon 99). As part of step 106, the user interface may select the desired position on the screen of the icon 99 representing the selected model (for example, by means of the user clicking and dragging the respective icon 99 to the desired position on the screen ie immediately to the right of the icon 98). Once this has been completed, the control returns to step 101 whereupon the user interface awaits a further request for a new model from the user.

Figure 12:
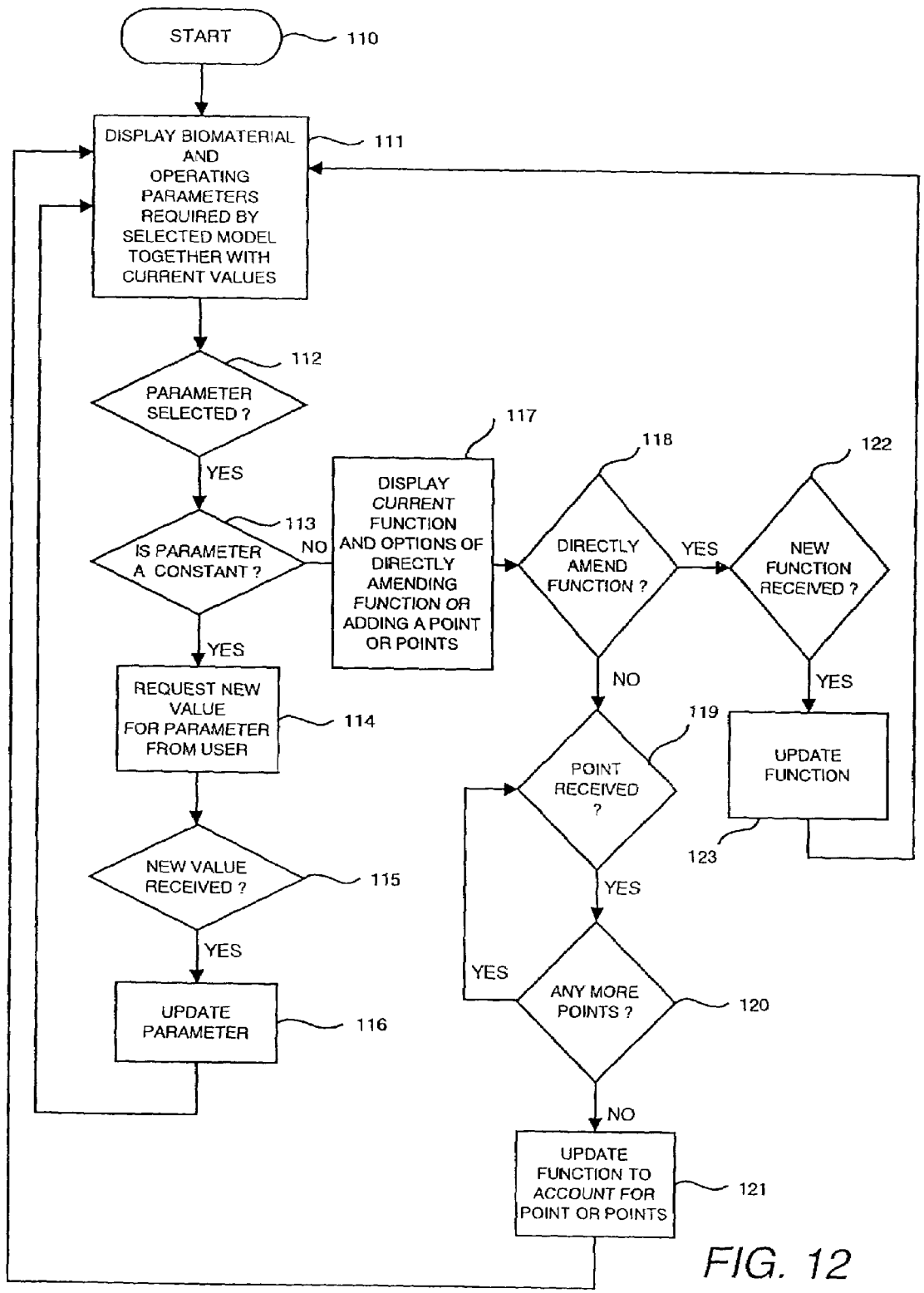
FIG. 12 is a flow diagram illustrating a further method of the simulation device of the development tool of FIG. 2 by which the models within a simulation may be edited.

Referring to FIG. 12, in addition to FIGS. 9 and 10, a method for editing a model within a simulation will now be described.

At any time during, or after, the construction of a simulation, a user may initiate the edit model mode by highlighting the icon representing the model to be edited and clicking on a suitable edit model button 81 provided by the user interface. This initiates the edit model procedure at step 110 and at step 111 the user interface displays the biomaterial and operating parameters required by the highlighted model together with their current values or, in the case of certain operating parameters, the range of values stored by the model. Note that each model has its own set of default values, or ranges of values, for all of the parameters it requires which are based upon a previous simulation of a particular industrial bioprocess. Where the process to be simulated is similar to the one on which the default values are based, the default values may well be acceptably close to the actually required values. However, where for example the biomaterial to be processed is quite different from that on which the default values were based, the default values will need to be replaced by the user.

At step 112, the user interface detects if a particular parameter has been selected by a user (in this example, by the user clicking on one of the displayed operating parameters). When a selection of a parameter has been detected, the control passes onto step 113 where it is determined if the parameter is a constant value or, in the case of certain operating parameters, a constant range of values, or whether the parameter is one which depends upon other parameters whose values may be modified by the simulation if the parameter is determined to be a constant (note that all operating parameters will fit into this category since they correspond to parameters which can be directly controlled by an operator of the industrial bioprocess independently of any properties of the material being processed) then the control proceeds onto step 114 in which the user interface requests the user to input a new value for the selected parameter.

At step 115 the user interface detects if a new value has been received and, if it has, the value associated with the parameter is updated to the newly entered value when the control returns to step 111. If it is detected at step 113 that the selected parameter is a function of one or more variable parameters whose values may change during the simulation, the control passes from step 113 to step 117. At step 117, the currently stored function is displayed and the user is asked to select either to directly amend the function or to add one or more points, each of which represents a particular value of the selected parameter for given value of the or each variable parameter upon which the selected parameter depends.

At step 118 the user interface detects which option is chosen. In the event that the option to input one or more points has been selected the control moves onto step 119 in which the user interface determines whether a suitable point has been input and, when it has, the control is passed onto step 120 where the user is asked if there are any more points to be input. If there are more points to be input the control is passed back to step 119. Alternatively the control is moved onto step 121 in which the function is updated to account for the point or points input by the user during steps 119 and 120. In the present embodiment, a function is updated to account for a point or points by means of parameterisation software. If at step 118 it is determined that the user has selected the option of directly amending the function used by the model, the control is passed to step 122 in which the user interface determines if a new function has been input by the user whereupon the control is passed to step 123 and the function is updated accordingly. After step 123 the control is returned to step 111. Although it is not explicitly illustrated in FIG. 12, the user may exit the edit mode at any time by clicking on an exit edit mode button provided by the user interface.

Figure 13:
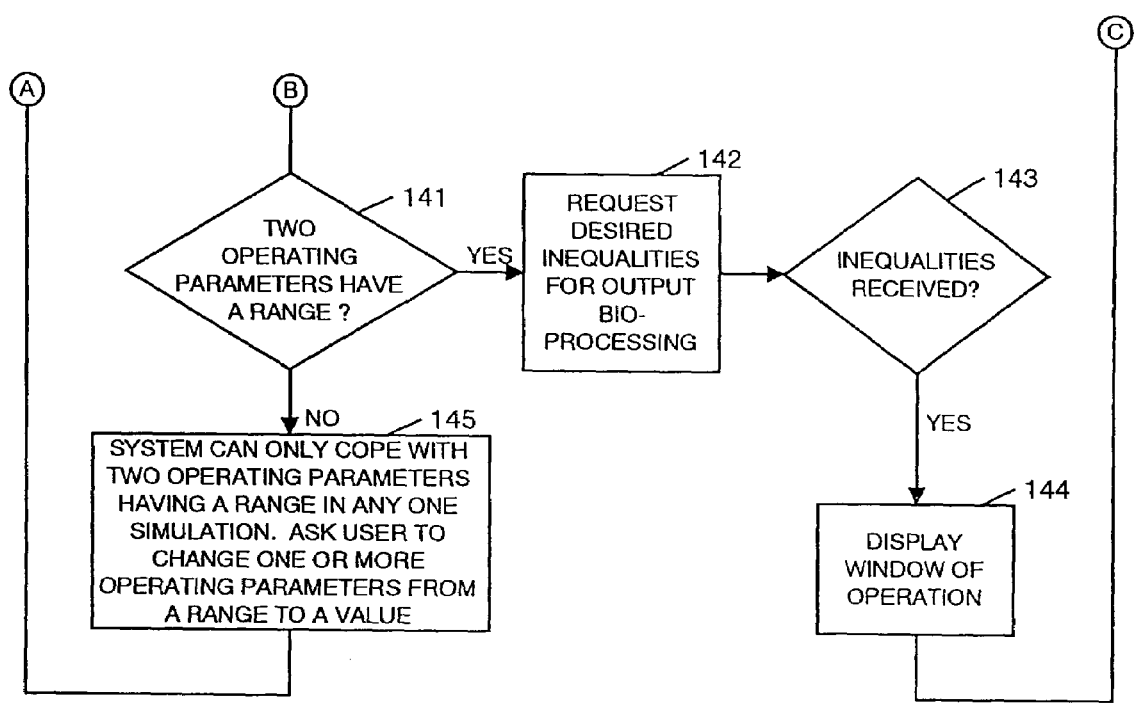
FIG. 13 is a flow diagram of a further method of the simulation device of FIG. 2 by which a simulation may be run and results of the simulation displayed to a user.

Referring now to FIG. 13, when the simulation has been set up as described above with reference to FIGS. 9, 10, 11 and 12, the user may initiate a method to run the simulation.

Running the simulation is initiated at step 130 whereupon control passes to step 131 at which the user interface awaits a request from a user to run a simulation (by the user clicking on a run simulation button). When such a request is received the control is passed onto step 132 at which all possible output bioparameters which could be displayed by the simulation are displayed by the user interface. Note that this list will include output bioparameters from all of the models used in the simulation as well as the output bioparameters output by the final model of the simulation.

At step 133 the user interface determines when one or more of the possible output bioparameters for display have been selected by the user and the control is passed to step 134 where all of the possible operating parameters which could be varied are displayed together with their current values or ranges of values and then control is passed to step 135 where the user interface determines if one of these operating parameters is selected. If an operating parameter has been selected control is passed to step 136 where the user interface waits for a new value or range to be entered by the user after which control is passed back to step 134. If it is detected at step 135 that no (or no further) operating parameter has been selected control is passed to step 137 where the user interface determines if all of the possible operating parameters (which are relevant to the output bioparameters selected by a user for display) have a single value as opposed to a range.

If it is determined that all relevant operating parameters do have a single value as opposed to a range the control is passed to step 138 in which the values of the selected output bioparameters are calculated on the basis of the values of the parameters stored by the relevant models within the simulation and the value of the or each selected output bioparameter is displayed to the user. Thereafter, the control is passed back to step 131 and the user interface awaits a new request for a simulation to be run.

If at step 137 it is determined that at least one operating parameter has a range as opposed to a specific value, the control is passed to step 139. At step 139 the user interface determines if only one operating parameter has a range in which case control is passed to step 140 whereupon a graph is displayed in respect of the or each selected output bioparameter showing how the or each selected output bioparameter varies with respect to the operating parameter having a range of values across that range of values. After displaying these graphs, the control is returned to step 131.

If at step 139 it is determined that more than one operating parameter has a range of values, control is passed to step 141. In step 141 it is determined if exactly two operating parameters have a range and if so control is passed to step 142 at which the user interface requests from the user an inequality in respect of each output bioparameter. For example, the user may request that the output bioparameter of total protein released from a homogenisation model be greater than or equal to 85% and that the output bioparameter of the percentage of debris removed by the cell debris removal centrifugation model be greater than or equal to 98%. When the required inequalities have been input by the user, control passes from step 143 to step 144 in which a window of operation is displayed by the user interface. The window of operation has orthogonal x and y axes each of which represents one of the two operating parameters having a range of values wherein all regions on the graph satisfying all of the inequalities are coloured or shaded in a particular manner to illustrate which combinations of the operating parameters will satisfy the desired inequalities. In this way, it is easy for a user to establish regions of operation (if any) which satisfy all of the inequalities desired by the user. From step 144 the control is passed back to step 131. If in step 141 it is determined that more than two operating parameters have a range of values, in the present embodiment, control is passed to step 145 in which an instruction is issued to the user indicating that results can only be displayed for up to two varying operating parameters and asking the user to choose specific values for one or more operating parameters to bring the total number of operating parameters having a range of values to two or fewer. From step 145 control is passed back to step 134.

Figure 14:
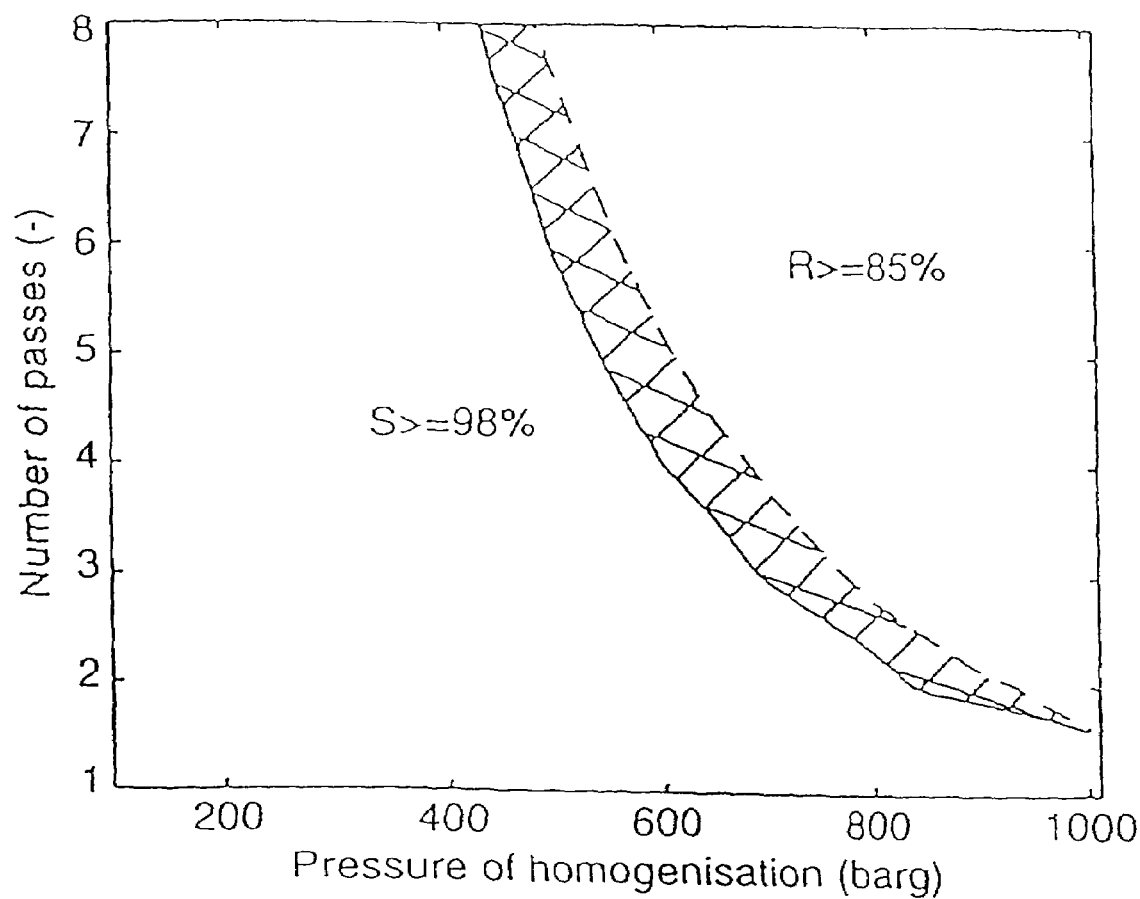
FIG. 14 is an illustration of a window of operation display which may be displayed as part of the method illustrated in FIG. 13.

An example of a window of operation display is illustrated in FIG. 14 in which the two operating parameters having a range of values are the number of passes of biomaterial through a homogeniser along the y axis and the pressure of operation of the homogeniser along the x axis. The selected output biomaterial parameters are:

(1) the amount of protein released by the homogenisation, R, which the user has requested at step 143 should be above 75% and (2) the amount of cell debris removed, S, during the cell debris removal centrifugation which the user has requested at step 143 should be greater than 90%.

The region satisfying the first inequality appears on the left hand side of the graph, whilst the region which satisfies the second inequality appears on the top right of the graph. The shaded portion represents the overlap of these regions, and therefore indicates the acceptable window of operation representing values of the operating parameters which would enable both inequalities to be satisfied.

Once the simulation has been set up in the manner described above, simulated pilot scale trials can be carried out in much the same way as is done in conventional pilot scale trials except that the trials are simulated instead of being physically carried out (i.e. by examining various properties of the biomaterial being processed at various stages of the process and adjusting the operation of one or more devices accordingly until the process is determined to be operating acceptably well).

Alternative Models

From the above description, it will be apparent that the invention provides a method of simulating an industrial process which is specific to a particular bioprocess involving a particular biomaterial (bakers' yeast) in order to obtain a specific desired bioproduct (alcohol dehydrogenase). The simulation does not require any large scale processes or trials but accounts for various effects of large scale processes or devices which do not occur in corresponding conventional laboratory equipment or processes.

However, a number of possible alternatives to the above-described embodiment are envisaged and it is intended that these alternatives should fall within the scope of the present invention. For example, in the above-described embodiment only the specific industrial devices illustrated in FIG. 1 were considered. It is, however, intended that the computer simulation could include a number of differing models of differing industrial devices with the possibility of substituting within the simulation one device for another (for example where a centrifuge device is found to be causing too much damage to the biomaterial to be processed by the device the operator of the computer simulation could try substituting the model of the centrifuge device with a model of a microfilter).

Formulation

Optionally, the final stage of the industrial process is product formulation which may be modelled by a product formulation model.

Microfiltration

In the above described example, the fermented cell culture is harvested using a centrifuge and this stage is modelled by the industrial bioprocess simulation device 2 using harvest centrifugation model 6210. However, in an alternative example, the fermented cell culture is harvested using a microfiltration method and resuspended in a neutral buffer. This is modelled by the industrial simulation device 2 using a harvest microfiltration model (not shown).

In the harvest microfiltration method, the solid phase (ie the cultured cells to be harvested) are separated from the liquid phase of the fermentation broth using one or both of two possible modes of operation which are referred to as a concentration mode and a diafiltration mode respectively.

In the concentration mode, the biomaterial (in this case the fermentation broth) to be filtered is loaded into a retentate tank (at this point the biomaterial is referred to as the retentate). The retentate is pumped over the microfiltration membrane surface and back to the retentate tank. Part of the fermentation broth will pass through the membrane and this is then referred to as the permeate. In practice, the nature of the permeate will depend upon the type and structure of the membrane, the nature of the retentate and the flow conditions over the membrane. In the case of harvesting a cell culture from a fermentation broth, an appropriate membrane is selected which will retain substantially all of the wanted cells in the retentate whilst permitting substantially all of the other components to pass through (since substantially all of the other components are in solution).

The diafiltration mode is similar to the concentration mode described above except that a wash buffer is added to the retentate at the same rate at which material is passing through from the retentate to the permeate. A complete microfiltration stage might comprise a number of sub-stages in these two different modes. By way of example only, the cell harvest microfiltration stage might comprise a first concentration mode sub-stage to increase the concentration of the cells in the retentate by approximately twofold, followed by a second diafiltration mode sub-stage to reduce the concentration of soluble components in the retentate by approximately fivefold.

Such a microfiltration stage would be modelled by the simulation device 2 using a microfiltration model (not shown) similar in its general structure to models 6100, 6210, 6300 etc. The output bioparameters of this model, for the case of harvesting cells, are the concentration of cells, $C_R''$, recovered, the total volume of the retentate at the end of microfiltration, the total biomass of harvested cells, the final concentration of soluble components, $C_p''$, the flux rate achieved, J, the resultant concentration factor, CF, achieved and the extent of diafiltration, D.

The following equations form the basis of the model:

$$\frac{C_R'}{C_{Ro}'} CF^{\sigma_R} \tag{31}$$

$$\frac{C_R''}{C_{Ro}''} = \exp(-D(1-\sigma_R)) \tag{32}$$

$$\frac{C_P'}{C_{Po}'} CF^{\sigma_P} \tag{33}$$

$$\frac{C_P''}{C_{Po}''} = \exp(-D(1-\sigma_P)) \tag{34}$$

$$J = \frac{\Delta P_{TM}}{\mu_T R_T} \tag{35}$$

in which:

$C_{R0}$ represents the original concentration of cells;

$C_{P0}$ represents the original concentration of soluble components;

the superscripts, ', ", are used to define the sequence of operation of concentration and diafiltration stages with various inputs and outputs;

$\sigma_R$ represents the rejection coefficient for whole cells (normally unity);

$\sigma_P$ represents the rejection coefficient of the soluble components;

CF represents the volume reduction ratio in the concentration sub-stage;

D represents the ratio of diafiltration buffer to feed volume used in the diafiltration sub-stage;

$\Delta P_{TM}$ represents the transmembrane pressure drop used;

$\mu_T$ represents the viscosity of the retentate; and $R_T$ represents the total resistance to permeate flow, components of which are related to the velocity of operation, the nature of the material being processed, the nature of the membrane being used, the extent of membrane usage and the extent of fouling.

In a relatively simple model, the values of $\sigma_R$ and $\sigma_P$ are considered to be constant for the given biomaterials and are measured using small scale experiments. In a more sophisticated model the rejection coefficients are related to the total resistance to flux which requires additional biomaterial parameters.

Additionally, the prevailing stress conditions in the membrane and associated equipment could be related to the extent of breakage of the whole cells and the extent of damage to the soluble components in a more sophisticated model.

The flow rate, the transmembrane pressure drop and the time of operation in the sub-stages are among the operating parameters required by the model.

The microfiltration model can also be used to model a microfiltration stage for removing unwanted cell debris. Such a model would be very similar to the harvest microfiltration model described above except that the wanted product is now contained in the permeate. The output bioparameters will include the amount of cell debris, the wanted enzyme alcohol dehydrogenase and total protein passed through into the permeate.

Centrifugation

The precipitates removal and recovery centrifugation models 6230, 6240 in the above-described embodiment employ a relatively simple type of shear index for use in modelling the reduction in size of protein precipitate particles within the feed zone of an industrial centrifuge device. However, the concept of a shear index can be extended to take into account the duration of time spent by a particular biomaterial within a shear field. In such a case, a shear index for fixed shear, $I_{ss}$ can be used. A mathematical function of the form:

$$I_{ss} = h_s - j_s \exp(-g_s t) \tag{36}$$

can be used to model how a property of a particular biomaterial species varies with the time of exposure for a constant maximum rate of shear, y*. A family of curves can be generated at different values of the maximum rate of shear (with each curve having different values for the time-dependent shear coefficients $h_s$, $j_s$, and $g_s$) using scale down experiments on the biomaterial species of interest. A similar family of curves can be generated from scale down experiments using the time independent shear index function of equation (17) at different constant values for the time of exposure (to generate a corresponding family of sets of values for the time independent shear coefficients $c_s$, $d_s$, $e_s$ and $f_s$, each such set of values corresponding to a particular duration of exposure). The sophisticated centrifugation model can then use the families of sets of values of the shear coefficients $c_s$, $d_s$, $e_s$, $f_s$, $g_s$, $h_s$ and $j_s$ to determine a shear index value for any maximum severity of shear and duration of exposure by interpolation. The shear index value is a number between 0 and 1 relating the fractional change in a property value to a particular maximum severity of shear y* and a particular duration of exposure, t. A shear index of 1 corresponds to no change, while a shear index of 0 corresponds to total change.

Note that the mathematical function given in equation (17) for relating the time-independent shear index $I_s^{d50}$ to the maximum severity of shear is only an example of a suitable function. The functions used describe complex behaviour and are empirical or semi-empirical and chosen to best fit the data in the area of greatest interest. Thus, for example, the time-independent shear index, $I_s^{d50}$, could be fitted to a function of the form:

$$I_s^{d50}=(1+(y^*/a_s)^{ms})/(1+(y^*/b_s)^{ns}) \qquad (37)$$

instead of that given in equation (17). In such a case, values for the shear coefficients $a_s$, $b_s$, $m_s$, and $n_s$ must be determined using scale down experiments in place of the shear coefficients $c_s$, $d_s$, $e_s$ and $f_s$.

The treatment of shear index so far assumes all the biomaterial is equally exposed to the shear in an item of process equipment. Where this is not the case, then computational fluid dynamics may be used to identify the different extents of exposure of the biomaterial. The shear index may then be used to evaluate the effect of the different extents of exposure with the resultant overall effect being the summation of these weighted in proportion to the mass or volume fractions of the material being exposed.

As an alternative to using the scale down rotating disk device to determine the sensitivity to shear of a biomaterial species in a scale down experiment, a scale down experiment in which the biomaterial is forced through a capillary (possibly even on a microfluidic scale using a microcapillary) could be performed instead. In such a case, the following equation can be used to determine the maximum shear rate applied to a biomaterial:

$$y^* = \frac{16 v_{cap}}{d_{cap}} \qquad (38)$$

where $V_{cap}$ is the mean velocity of flow in a capillary and $d_{cap}$ is the capillary diameter.

As an alternative to the harvest centrifugation model 6210, an extended harvest centrifugation model could have been used. In the extended harvest centrifugation model, equation (7) is modified to allow for non-spherical cells and interactions between sedimenting species which affect the rate of sedimentation. The extended harvest centrifugation model may also allow for non-Newtonian behaviour of the biomaterial and the addition of an efficiency factor for a particular centrifuge to allow for non-ideal flow conditions inside the centrifuge including turbulence and resuspension of sedimented particles. It is possible to use a similar expression for batch centrifuges replacing the flow rate with the volume of biomaterial divided by residence time. Equally with batch centrifuge operation, it is possible to make allowance for the start-up and slow-down phases of the centrifuge operation. Furthermore, it is possible to extend the mass balance used within the model so that the model can account for the loss of sedimenting species due to the feeding of the centrifuge when full of solids to such an extent that the particle recovery is adversely affected. Also, it is possible to account for dewatering effects to determine the time when the centrifuge will be filled and to evaluate the amount of soluble components which will be taken forward with or lost to the sediment phase. In addition, the shear index may be extended to account for the disruption of the solid material, in this case cells, on entry to the centrifuge or on discharge from the centrifuge and in the case of an extracellular product the damage of the product on entry to or exit from the centrifuge.

Similarly, a further enhanced shear index could be used to incorporate the effects of air/liquid interfaces or solid/liquid interfaces when these have damaging effects on the biomaterial species of interest which may be enhanced by the effect of shear.

The cell debris removal centrifugation model 6230 could be extended to account for all the additional effects described for the enhanced harvest centrifugation model. In particular, the impact of feed solids concentration and the sediment dewatering on product loss in the sediment can be evaluated.

The precipitates removal centrifugation model 6230 could be extended to account for all the additional effects described above. In particular, the method of precipitate preparation will determine characteristics of the precipitate particles and their susceptibility to breakage and the response of sediments of the particles to centrifugal pressure which affect dewatering. Information about these characteristics can be determined using scale down experiments and summarised in the form of a clarification and compaction index which can then be used by the enhanced precipitates removal centrifugation model.

The generalities described for centrifugation models also apply to all other operations involving the application of a centrifugal force to effect separation of the biomaterial, including cyclones and centrifugal filters. They also apply to particle classification operations using centrifugation including inclusion body recovery from cell debris and soluble cell-components. Furthermore, the application of the shear index can also be used when modelling the performance of other industrial processing devices which generate shear such as, for example, pumps.

Fermentation

The fermentation model is described as assuming that the growth-rate, $\mu$ is constant during the final phase of fermentation and is determined by the operating parameter $F_{para}$, for a given set of values of the "fixed" operating parameters $V_{fi}$, $X_{fi}$ and $F_{fi}$. However, a more sophisticated model could be used which considers the growth rate to change dynamically during fermentation on the basis of the amount of nutrient available. An example of an equation which can be used to model such a change in growth rate is: $\mu=(\mu_{max}S)/(K_s+s)$ where $K_s$ is a Monod constant, $\mu_{max}$ is the maximum growth rate (when $s>>K_s$) and s is the concentration of nutrient contained in the fermentation broth. The Monod constant $K_s$ can be determined (for a particular cell culture and for a particular type of sugar used as the nutrient) using scale down experiments. The fermentation could also model the change of s during fermentation using an equation such as: $ds/dt=(F/V)(S_{FEED}-s)-\mu_{max}(x/Y_s)$ where F is the rate at which a nutrient solution supply is fed to the broth (in terms of volume per unit time) V is volume of the broth at any time, t, $S_{FEED}$ is the concentration of nutrients in the feed supply (in terms of mass per unit volume), x is the concentration of biomass in the fermentation broth and $Y_s$ is the yield of grams of biomass per gram of nutrient.

Many different equations for modelling fermentation processes are known and will be useful for modelling different fermentation regimes, etc. These are well understood in the art and the equations given above are to be considered as exemplary only.

Chromatography

In addition to using the proportion of cell debris $m_{ph}/m_h$ as an indicator of the proportion of homogenate remaining in the biomaterial at commencement of chromatography, an enhanced model also takes into consideration the proportion of soluble components of the homogenate remaining in the biomaterial at commencement of chromatography. Alternatively, instead of using an indicator of the proportion of homogenate an indicator of the total amount of homogenate remaining in the biomaterial at commencement of chromatography could be used. In such a case, the model needs to account for the differences in geometry between the industrial chromatography column and the scale down chromatography column in order to determine values for the constants $b_{f1}$, $b_{f2}$ and $b_{f3}$ appearing in equations 26–28.

The chromatography model is based on size/exclusion chromatography, however, the model could be enhanced to consider adsorptive effects within the chromatography column. In particular, the size exclusion model may be extended to allow for the adsorption and desorption of molecules occurring during ion-exchange, affinity, HIC or IMAC types of chromatography. The extension involves the addition of suitable equations to describe the kinetics of the binding process, the equilibrium that is established between the stationary phase and the solute phase and the total binding capacity of the matrix for the molecule of interest of particular significance in such models will also be the estimations of the binding constants in the presence of a realistic spectrum of contaminants. These parameters may be obtained by scale-down experiments.

The number of chromatography models available within the simulation device may also be extended by the inclusion of an expanded bed chromatography model. This varies from the traditional packed bed chromatography models by virtue of a variation in the expanded bed voidage, $\epsilon$, as a function of the linear velocity, u, through the bed. The model also accounts for variations in the matrix particle size distribution throughout the bed and to the changes in the matrix binding capacity as a function of axial position in the bed. The other input parameters of importance will be the particle diameters and density of the solute and the solvent viscosity and density. The model outputs the mass of product recovered, the volume of fluid in which this product is contained, and the volumes of buffers needed to achieve the processing of the material.

Alternatively, the chromatography model could use a fractionation diagram and purification versus yield plot for assisting in the operation and control of a chromatographic separation. In this approach data from the complete chromatogram is analysed in terms of the amounts of product and protein present at each point in time, (or volume of eluate) from the start to the end of the chromatogram.

The data is then represented in a cumulative form with the fraction of total protein eluted as one axis and the fraction of product eluted on the other. The curve is then fitted by a cubic spline method to provide continuous data for the next stage of analysis where the fractionation diagram is converted into a purity versus yield plot. Using the fact that any chord connecting two points on the fractionation diagram determines the yield of product and, via its slope, the purification achieved, a search algorithm is used to obtain all combinations of yield and purification factor possible. The results can be plotted as a purification factor versus yield diagram to determine how these two performance criteria must be traded one with the other. In practice having determined a suitable combination of yield and degree of purification required the algorithm can be run backwards to identify the corresponding time or volumes of elution required to produce the desired level of performance.

Homogenisation

The homogenisation model may be extended to account for the changes in valve seat geometry which affect the values of constants $K_h$ and $a_h$ in equations (8) and (9). These values are also functions of temperature and relate both to the cell type being disrupted and to the conditions of growth employed. This latter feature then relates either the time of harvest in the case of batch or fed batch fermentations, or the growth rate employed in the case of continuous fermentation.

Cell disruption may also be achieved in a different geometry device, namely a bead or colloid mill. In this instance the same type of expressions may be used to determine the extent of product release but the rate of the process is now governed by a more complex group of variables including the bead density, bead volume, bead size, temperature, suspension viscosity, speed of revolution and biomaterial being disrupted.

Precipitation

In a more complete model, the values of $\alpha$ and m in equation 12 are allowed to vary as functions of the precipitation conditions employed for the different stages of a fractional precipitation procedure. The exact variations in constants as functions of precipitant concentration are biomaterial specific and may be determined through scale down experiments.

Also, precipitation as modelled in equations (13) to (15) describes a batch process carried out in a vessel of fixed volume. Additionally one may wish to achieve a similar effect but using a continuous reactor into which the two streams to be contacted meet in a tubular reactor, mix and pass to subsequent processing stages. Using common engineering relationships to relate pressure drop to the average shear rate, it is possible to determine the desired period of ageing in such a continuous device so as to achieve an acceptable quality of product in terms of size and density. The density of the aggregate phase may be estimated through an expression of the form:

$$\rho_a - \rho_L = k_{ppt}(d_{ppt})^{n_{ppt}}$$

where:
  $\rho_a$=aggregate density (kg/m$^3$),
  $\rho_L$=liquid density (kg/m$^3$),
  $d_{ppt}$=particle diameter (m), and
  $k_{ppt}$ and $n_{ppt}$ are experimentally determined constants.

Values of $\rho_L$ will be known from previous measurement whilst $d_{ppt}$ may be estimated from electrical sensing zone measurements. The values of $k_{ppt}$ and $n_{ppt}$ are system specific and determined by matching size data with sedimentation velocity data.

Enzyme Activity Impairment

None of the above described models account for loss of product activity. However, it is possible to introduce classical inactivation kinetics to the mass balance models to enable the effects of time and operating temperature on the degradation and loss of enzyme catalytic activity during processing to be accounted for.

Other Alternatives

In the above-described embodiment operating parameters are determined by an operator adjusting the parameters in the simulation until good results are obtained. However, it is also envisaged that the computer simulation device could include a suitable software application employing a Pareto Optimal method, for example, to determine and output operating parameter values which satisfy certain given output bioparameter requirements. Additionally, computer simulation device 60 could output fewer optimised operation parameters than the total amount available for controlling the industrial devices being modelled in order to simplify the computer simulation. Alternatively, if convenient, the computer simulation could output more optimised operating parameters including, for example, the optimum amount of shear to generate during the final phase of fermentation, or other operating parameters whose effect is somewhat smaller on the process as a whole.

The above embodiment is described as including parameterisation software for fitting various constants where the equations in which these constants appear are fairly complicated. However, other equivalent methods could be used such as traditional analytical methods involving plotting graphs and determining intercepts and gradients.

The above-described embodiment discloses moving straight from the simulation of an industrial process directly to the industrial process. However, the method could involve moving firstly from the simulation to a pilot process for confirmation of the accuracy of the simulation and then onto an industrial process.

Note that instead of only permitting a maximum of two operating parameters to have ranges for the purposes of producing a window of operation, three or more dimensional displays could be generated to permit three or more operating parameters to have ranges.

The development of an industrial bioprocess for producing alcohol dehydrogenase represents only one example of how the development tool 2 can be used to develop an industrial bioprocess. As an alternative example, the intracellular production of a plasmid DNA within genetically engineered *E. coli* could have been discussed. Such a process involves lysing the fermented *E. coli* instead of homogenising it. The amount of lysing agent is determined by development tool 2. Afer lysing, the post-lysing floc is removed either by gentle centrifugation (at a rate determined by development tool 2) or by filtering (with the properties of the filter being determined by the development tool 2). After removal of the floc, the solution is placed directly into a chromatography column or, alternatively, further purifying steps are employed. For example, a two stage precipitation process can be employed with the precipitate particles being removed at each stage either using gentle centrifugation or a filtering technique. Again, all of the operating parameters required to operate the industrial bioprocess in an acceptable manner can be determined using the development tool 2.

Large plasmids are more sensitive to shear forces than proteins and the bacterial chromosomal DNA which initially contaminates the plasmid DNA is acutely sensitive to any shear so that this index is especially critical at every stage. The gene which codes for a given protein is also much larger and less compact than the protein for which it codes. This means that chromatographic capacities are relatively very low and fouling will further diminish it. Thus the fouling index is also of particular significance.

The processing of plasmid DNA is an example where the indices described earlier affect the formulation stages which follow chromatographic purification particularly strongly. It is commonly necessary for effective delivery to associate the plasmid DNA with reagents such as lipids and polypeptides and also with molecules such as antibodies and steric protection agents such as polyethylene glycol. The formulation of these complexes is influenced by the level of shear fields involved. If materials are chosen which can compact the plasmid DNA they can reduce the impact of such hydrodynamic forces. The effects can be measured by the rotating disk device already described.

The information for the modelling can be obtained as described using devices such as the rotating disk device illustrated in FIG. 5. It is also possible to obtain such information automatically using an automated workstation of the type associated with many analytical uses of microwell systems, especially 96 well systems. Here a supply of fluids and, if necessary particles, is conveyed to a large number of small wells ranging from a few milliliters to a few microliters. In the current use the addition of a second fluid to a first fluid already in a well initiates mixing and a reaction which is subsequently measured. However, mixing can be sustained in such wells by shaking or agitation so that process reactions can be examined over a period of time. The microwell contents can be centrifuged and filtered and absorbents may be added so that fouling can be assessed. Precipitation reactions may also be examined. Though the application of shear to microwell contents requires ultra high disk speeds by comparison with that in the device of FIG. 5, it is possible to achieve similar effects using capillary shear by sucking up fluid repeatedly and returning it to microwells. Given that present day microwell systems are routinely coupled to software systems, the method allows a particularly convenient integration of the measurement of indices such as shear and fouling and the creation of process models.

Many biological macromolecules and cells are sensitive to shear and to associated effects. Thus, materials such as chromosomal and large plasmid DNA are highly sensitive to the hydrodynamic forces occurring in common process equipment such as industrial pumps and centrifuges. Materials such as animal cells used to produce biological substances are also sensitive as are precipitates of proteins. The greater sensitivity of animal cells to shear forces means that in the harvesting step it will be necessary to take greater account of this than is the case for micro-organisms. The sensitivity extends to viruses used to produce vaccines and to multi-cellular organisms such as nematodes used as biopesticides. Though protein molecules are too small to be directly affected by shear forces they are quickly damaged by combinations of high shear fields and gas-liquid, usually air-liquid, interfaces or solid-liquid interfaces. Thus the capacity to define these effects by means of a shear index is of broad importance.

As an alternative example, we could have considered the isolation of a wanted protein from milk produced by animals which have been genetically engineered to produce a particular wanted biomaterial as the bioproduct within their milk. In such a process, the milk is initially skimmed to remove as much as possible of the unwanted lipids. The wanted proteins can then be precipitated out using an arrangement similar to that described above with respect to alcohol dehydrogenase and finally the precipitated out protein can be separated further from unwanted proteins and unwanted lipids using a chromatography method. Again, all of the operating parameters required to perform such an industrial bioprocess can be determined using development tool 2.

Transgenic plants are now becoming a source of biomaterials such as antibodies and vaccines. Here it is necessary to assess quickly the shear forces required to break down the plant tissue sufficiently to release product versus that level of force which ruptures chloroplasts excessively and leads to contamination of the product. Pre-cut plant tissue may be examined to assess this in the disk device previously described.

A second embodiment of the present invention is concerned with determining acceptable operating parameters for only a single industrial bioprocessing device, namely disk stack centrifuge 200 when used as an unwanted protein precipitates centrifuge device. In this embodiment, centrifuge device 200 is analysed using computational fluid dynamics techniques and is found to generate regions of shear in excess of 5000 s$^{-1}$ to which substantially all biomaterial processed by the centrifuge device passes during normal operation of the device at rotational speeds in excess of 7500 RPM.

The likely effect of these shear stresses on a biomaterial comprised of a supernatant having protein precipitate particles suspended therein is determined in the following way. Firstly, the initial particle size distribution of the protein precipitate particles suspended in the biomaterial is determined using conventional particle size measuring apparatus. Secondly, the biomaterial is placed in the rotating disk device 400 described above with reference to FIG. 5 and the disk is rotated at a speed of 27,700 RPM. Thirdly, the particle size distribution of the protein precipitate particles is again measured using conventional particle size measurement apparatus. Finally, an acceptable value for the flow rate through centrifuge device 200 is set in dependence upon the expected rate of sedimentation of particles whose particle size distribution is given by that measured in respect of the sheared biomaterial.

As an alternative to setting the flow rate through a given centrifuge device, it is also envisaged that the centrifuge device could instead be replaced with a larger device or that a number of similar devices could be used in parallel to enable the maximum flow rate possible for sedimenting out the precipitate particles to be kept constant (with reference to the maximum flow rate which would be achievable if the precipitate particles were not shear sensitive).

The above second embodiment has been described with reference to a disk stack centrifuge. However, the present invention is equally applicable to other industrial centrifuge devices such as multi-chamber centrifuge devices and tubular centrifuge devices and also to other devices which generate shear, for example pumps and fermenters.

The second embodiment may be enhanced by combining any of the features described above with respect to the first embodiment. For example, instead of using conventional particle size measuring apparatus, a laboratory centrifuge could be used in the manner described above to determine the particle size distribution of the precipitate particles both before and after shearing.

Nomenclature $a_h$ constant in homogenisation model (eqs. 8 and 9)
$a_1$ coefficient reflecting the dependence of cell size distribution on growth rate (eq. 5)
$a_2$ coefficient reflecting the dependence of cell size distribution on growth rate (eq. 5)
A internal cross-sectional area of the chromatography column
$A_{up}$ constant in precipitates shear models
$b_1$ coefficient reflecting the dependence of cell size distribution on growth rate (eq. 6)
$b_2$ coefficient reflecting the dependence of cell size distribution on growth rate (eq. 6)
$b_{f1}$ constant in chromatography model (eq. 26)
$b_{f2}$ constant in chromatography model (eq. 27)
$b_{f3}$ constant in chromatography model (eq. 28)
$b_{hd}$ constant in homogenisation model (eq. 10)
$b_{hw}$ constant in homogenisation model (eq. 11)
$B_{up}$ constant in precipitates shear models
$c_s$ constant in shear index determination (eq. 17)
c concentration of solute in chromatography model (eq.20)
$c_p$ concentration of solute in pores of stationary phase particles (eqs. 20, 21)
$C_{hd}$ constant in homogenisation model (eq. 10)
$C_{hw1}$ constant in homogenisation model (eq. 11)
$C_{hw2}$ constant in homogenisation model (eq. 11)
$C_{pa}$ concentration of precipitation agent (eq. 12)
$C_v$ volume fraction of solids (eq. 7)
d particle diameter (eq. 7)
$d_c$ critical particle diameter (eq. 7)
$d_i$ representative particle diameter of $i^{th}$ interval (eq. 16)
$d_s$ constant in shear index determination (eq. 17)
$d_{50dr}$ median particle diameter of cell debris (cell debris removal centrifugation model)
$d_{50f}$ median particle diameter (fermentation model)
$d_{50h}$ median particle diameter (homogenisation model)
$d_{50hc}$ median particle diameter (harvest centrifugation model)
$d_{50pr}$ median particle diameter (precipitates removal centrifugation model)
$d_{50up}$ median particle diameter of precipitate particles (unwanted protein precipitation model)
$d'_{50up}$ median particle diameter of precipitate particles after shearing (eq 19)
$d_{50wp}$ median particle diameter of precipitate particles (wanted protein precipitation model)
$D_e$ chromatography transport parameter (eq. 24)
$D'_e$ chromatography transport parameter after fouling modification (eqs. 21, 22 and 24)
$D_L$ chromatography transport parameter (eq. 23)
$D'_L$ chromatography transport parameter after fouling modification (eq. 20, 22, 23)
$D_{up}$ constant in precipitates shear models
$e_s$ constant in shear index determination (eq. 17)
$E_{dr}$ amount of enzyme (cell debris removal centrifugation model)
$E_f$ amount of enzyme (fermentation model)
$E_h$ amount of enzyme (homogenisation model)
$E_{hc}$ amount of enzyme (harvest centrifugation model)
$E_{ph}$ amount of enzyme (precipitates recovery centrifugation model)
$E_{pr}$ amount of enzyme (precipitates removal centrifugation model)
$f_s$ constant in shear index determination (eq. 17)
F fraction of biomaterial remaining soluble (eq. 12)
$F_E$ fraction of enzyme remaining soluble (unwanted protein precipitation model)
$F_E'$ fraction of enzyme remaining soluble (wanted protein precipitation model)
$F_f$ feed rate (eq. 1, 2 and 3)
$F_{fi}$ initial feed rate (eq 2)
$F_{para}$ rate of increase parameter (eq. 2)
$F_R$ fraction of total protein remaining soluble (unwanted protein precipitation model)
$F_R'$ fraction of total protein remaining soluble (wanted protein precipitation model)
g acceleration due to gravity (eq. 7)
$g_s$ constant in shear index determination (eq. 36)
G extent of shear (precipitation models)
$h_s$ constant in shear index determination (eq. 36)
$H_{up}$ constant in precipitates shear models
$I_s^{d50}$ time-independent shear index for median diameter (eqs. 17 and 19)
$I_{f1}$ fouling index (eqs. 23 and 26)
$I_{f2}$ fouling index (eqs. 24 and 27)
$I_{f3}$ fouling index (eqs. 25 and 28)
$j_s$ constant in shear index determination (eq. 36)

$k_f$ fluid phase mass transfer coefficient (eq. 20 and 22)
K constant in grade efficiency curve (eq. 7)
$K_D$ breakage rate (eq. 14)
$K_h$ constant in homogenisation model (eqs. 8 and 9)
$K_v$ shape factor (eqs. 14 and 16)
m biomaterial solubility exponent (eq. 12)
$m_{dr}$ mass of cell debris (cell debris removal centrifugation model)
$m_e$ enzyme solubility exponent (unwanted protein precipitation model)
$M_f$ mass of biomaterial (fermentation model)
$M_h$ mass of yeast cell debris (homogenisation model)
$M_{hc}$ mass of harvested cells (harvest centrifugation model)
$m_i$ mass of particles within the $i^{th}$ interval (eq. 16)
$m_p$ total protein solubility exponent (unwanted protein precipitation model)
$m_{ph}$ mass of cell debris in sediment (precipitates recovery centrifugation model)
$m_{pr}$ mass of cell debris (precipitates removal centrifugation model)
$m_\epsilon$ is given by $\epsilon/(1-\epsilon)$ (eq. 20, chromatography model)
n constant in grade efficiency curve (eq.7)
N number of passes through homogeniser (eqs. 8, 9, 10 and 11)
$N_i$ number of particles in sub-population i (eqs. 13 to 16, unwanted protein precipitation model)
P homogeniser operating pressure (eqs. 8 and 9)
$\Delta P$ difference between homogeniser operating pressure and threshold pressure (eqs. 10 and 11)
$P_{th}$ threshold pressure (homogeniser model)
Q flow rate through centrifuge (eq. 7)
r distance from stationary phase particle centre (eq.21)
$R_{dr}$ amount of total protein (cell debris removal centrifugation model)
$R_f$ amount of total protein (fermentation model)
$R_h$ amount of total protein (homogenisation model)
$R_{hc}$ amount of total protein (harvest centrifugation model)
$R_p$ mean stationary phase particle radius (eq. 20)
$R_{ph}$ amount of total protein (precipitates recovery centrifugation model)
$R_{pr}$ amount of total protein (precipitates removal centrifugation model)
s reciprocal time (eq. 22)
t elapsed time (eqs. 1–3, 20 and 21)
$t_{dr}$ centrifuge fill time (cell debris removal centrifugation model)
$t_f$ duration of final phase of fermentation the centrifuge fill time (harvest centrifugation model)
$t_{ph}$ centrifuge fill time (precipitates recovery centrifugation model)
$t_{pr}$ centrifuge fill time (precipitates removal centrifugation model)
T(d) fraction of particles having diameter, d, sedimented out of flow (eq. 7)
u interstitial fluid velocity (eq. 20)
V volume of broth at any time, t, during fermentation (eqs. 1 and 3)
$V_{cent}$ volume of biomaterial in centrifuge tube (harvest configuration model)
$V_{fi}$ initial volume of broth at the commencement of the final phase of the fermentation (fermentation model)
$V_{dr}$ supernatant volume (cell debris removal centrifugation model)
$V_{pr}$ supernatant volume (precipitates removal centrifugation model)
$V_{up}$ volume of total material carried forward to precipitation removal centrifugation model (unwanted protein precipitation model)
$V_{wp}$ volume of total material carried forward to precipitation recovery (harvest) centrifugation model (wanted protein precipitation model)
$w_{dr}$ particle size spread of cell debris (cell debris removal centrifugation model)
$w_f$ particle size spread (fermentation model)
$w_h$ particle size spread (homogenisation model)
$w_{hc}$ particle size spread (harvest centrifugation model)
$w_{pr}$ particle size spread (precipitates removal centrifugation model)
$w_{up}$ particle size spread (unwanted protein precipitation model)
$w_{wp}$ particle size spread of precipitate particles (wanted protein precipitation model)
$x_{fi}$ initial biomass concentration (fermentation model)
x biomass concentration at any time, t (eq. 1)
y* severity of shear (eq. 18)
$Y_E$ yield of enzyme per unit mass of biomass (fermentation model)
$Y_p$ yield of protein per unit mass of biomass (fermentation model)
z axial distance through column (eq. 20)

Greek Letters

α biomaterial solubility coefficient (eq. 12)
$\alpha_E$ enzyme solubility coefficient (unwanted protein precipitation model)
$\alpha_p$ total protein solubility coefficient (unwanted protein precipitation model)
$\beta_o$ aggregation rate (eq. 13)
ε inter-particle void fraction (eq. 20)
$\epsilon_p$ intra-particle inclusion porosity (eq. 25)
$\epsilon_p'$ modified intra-particle inclusion porosity (eqs. 21, 22 and 25)
μ growth rate (eqs. 1, 5 and 6)
η viscosity (eq. 7)
Δρ difference in density between particulate matter and suspension as a whole (eq. 7)
$\rho_a$ density of the particles (eq. 16)
$\rho_f$ density of cells (harvest centrifugation model)
$\rho_l$ density of liquid (alternative precipitation method)
Σ equivalent settling area (eq. 7)
τ correction coefficient in grade efficiency curve (eq. 7)
Φ(d) fraction of particles of diameter greater than d (eq. 4)

The invention claimed is:

1. A method for generating values for operating parameters for a multiple stage industrial or pilot scale bioprocess for obtaining a product from a biomaterial, said method comprising:
   (a) determining for at least one stage conditions which affect the properties of the material being processed;
   (b) simulating said conditions in at least one scale down experiment;
   (c) subjecting a test quantity of said biomaterial, or a derivative thereof, to the conditions simulated in said scale down experiment;
   (d) obtaining measurements of the effect of said simulated conditions on said test quantity of biomaterial or derivative; and
   (e) performing computer modelling utilising said measurements to obtain values for said operating parameters to achieve acceptable quality and yield of said product;

wherein the step (d) of obtaining measurements of the effect of simulated conditions on a test quantity of biomaterial or derivative uses biomaterial or derivative similar in composition and physical properties to that which would be obtained in an industrial or pilot scale process.

2. A method as claimed in claim 1 including computer modelling a plurality of said stages.

3. A method as claimed in claim 1 wherein the conditions determined in step (a) comprise shear stress experienced by said biomaterial or derivative.

4. A method as claimed in claim 3 comprising using computational fluid dynamics to determine shear stress.

5. A method as claimed in claim 3 wherein the shear stress conditions are determined for a centrifugation stage of said bioprocess.

6. A method as claimed in claim 3 wherein said scale down experiment includes subjecting said test quantity to a predetermined level of shear within a scale down device.

7. A method as claimed in claim 6 wherein the scale down device comprises a rotating disk device which comprises a disk rotatably mounted within a chamber and adapted to subject material placed in said chamber to shear upon rotation of said disk.

8. A method as claimed in claim 3 wherein said test quantity comprises a plurality of particles suspended in a liquid, said particles having a size distribution which varies as a function of the degree and duration of shear to which said test quantity is subjected.

9. A method as claimed in claim 3 wherein a value for shear susceptibility is calculated as a shear index during the computer modelling step (e), said shear index relating changes in a property of said biomaterial or derivative to the degree and duration of shear to which said biomaterial or derivative is subjected.

10. A method as claimed in claim 1 wherein the conditions determined in step (a) comprise the extent of fouling of a stationary phase within a chromatography column by impurities derived from said biomaterial.

11. A method as claimed in claim 10 wherein said scale down experiment comprises measuring the elution time for a scale down chromatography column of a biomaterial of known composition passing through a clean column and the elution time of said biomaterial of known composition passing through a column fouled with a known concentration of contaminant.

12. A method as claimed in claim 11 wherein the susceptibility to fouling of the stationary phase of said chromatography column and the susceptibility of the biomaterial to cause fouling are calculated as a fouling index during the computer modelling step (e) which relates a change in yield and/or a change in product purity to the degree of fouling which is present.

13. A method as claimed in claim 1 wherein the conditions determined in step (a) are centrifugation conditions and comprise the average residence times within a centrifuge for first and second components of input biomaterial, said first component being a material which passes through said centrifuge and said second component being a material which is sedimented out by said centrifuge.

14. A method as claimed in claim 13 wherein said scale down experiment comprises centrifuging said test quantity in a laboratory centrifuge device for a first period; decanting a first portion of said test quantity and measuring one or more properties thereof; centrifuging the remainder of said test quantity for a second period, and measuring one or more properties of the remainder of said test quantity.

15. A method of producing a product comprising the steps of generating values for operating parameters according to the method of any one of claims 1 to 14 further comprising operating a multiple stage industrial scale bioprocess in accordance with the operating parameters thus obtained.

16. A method according to claim 15 including the additional step of performing pilot scale trials prior to performing the industrial scale bioprocess.

17. A method as claimed in claim 1 wherein step (a) comprises determining for at least two stages conditions which affect the properties of the material being processed, and wherein step (d) comprises obtaining measurements of the effect of simulated conditions on a test quantity of biomaterial obtained from an earlier stage of scale down and simulation.

18. A system for generating values for operating parameters for a multiple stage industrial or pilot scale bioprocess for obtaining a product from a biomaterial, said system comprising:
(a) means for determining for at least one stage conditions which affect properties of a material being processed;
(b) means for simulating said conditions in a scale down experiment;
(c) means for subjecting a test quantity of biomaterial or a derivative thereof to the conditions simulated in said scale down experiment;
(d) means for measuring the effect of said simulated conditions on said biomaterial or derivative; and
(e) a computer simulation device for modelling the effect of said at least one stage on the properties of said material and for generating values for operating parameters for at least said at least one stage that achieve acceptable quality and yield of said product;
wherein said test quantity of biomaterial or derivative is biomaterial or derivative similar in composition and physical properties to that which would be obtained in an industrial or pilot scale process.

19. The system as claimed in claim 18 wherein the computer simulation device includes modelling means for modelling the effect of at least one industrial device on biomaterial which is processed by the device, wherein said modelling means includes means for determining the amount of shear stress inflicted on the biomaterial as a function of one or more operating conditions of the device.

20. A method for deriving values for operating parameters for a multiple stage industrial or pilot scale bioprocess for obtaining a product from a biomaterial, said method comprising:
(a) subjecting a test quantity of said biomaterial, or a derivative thereof, to at least one scale down experiment which simulates conditions that affect the properties of the material being processed;
(b) obtaining measurements of the effect of said simulated conditions on said test quantity of biomaterial or derivative; and
(c) performing modelling in a computer utilising said measurements to derive values for said operating parameters that achieve acceptable quality and yield of said product.

21. A method for deriving values defining design and/or operating parameters for at least one stage of a multiple stage industrial or pilot scale bioprocess for obtaining a product from a biomaterial, said method comprising:
(a) subjecting a test quantity of biomaterial having a composition and physical properties substantially corresponding to those which would occur in a corresponding stage of an industrial or pilot scale bioprocess to conditions which simulate one or more features of an industrial scale device engineering environment that affect biomaterial properties;

(b) obtaining measurements of the effects of said simulated conditions on said test quantity of biomaterial; and (c) performing modelling in a computer utilising said measurements to derive values defining said design and/or operating parameters that achieve a predetermined quality and yield of said product.

22. A method as claimed in claim 21 including computer modelling of a plurality of said stages.

23. A method as claimed in claim 21 wherein the conditions simulated in step (a) comprise shear stress experienced by said biomaterial.

24. A method as claimed in claim 23 comprising using computational fluid dynamics to determine shear stress.

25. A method as claimed in claim 23 wherein the shear stress conditions are determined for a centrifugation stage of said bioprocess.

26. A method as claimed in claim 23 wherein said test quantity is subjected to a predetermined level of shear within a scale down device adapted to simulate the level of shear generated within an industrial scale centrifuge or pump.

27. A method as claimed in claim 26 wherein the scale down device comprises a rotating disk device which comprises a disk rotatably mounted within a chamber and adapted to subject material placed in said chamber to shear upon rotation of said disk.

28. A method as claimed in claim 23 wherein said test quantity comprises a plurality of particles suspended in a liquid, said particles having a size distribution which varies as a function of the degree and duration of shear to which said test quantity is subjected.

29. A method as claimed in claim 23 wherein a value for shear susceptibility is calculated as a shear index during the computer modelling step (c), said shear index relating changes in a property of said biomaterial to the degree and duration of shear to which said biomaterial is subjected.

30. A method as claimed in claim 21 wherein the conditions simulated in step (a) comprise the extent of fouling of a stationary phase within a chromatography column by impurities derived from said biomaterial.

31. A method as claimed in claim 30 comprising measuring the elution time for a scale down chromatography column of a biomaterial of known composition passing through a clean column and the elution time of said biomaterial of known composition passing through a column fouled with a known concentration of contaminant.

32. A method as claimed in claim 31 wherein the susceptibility to fouling of the stationary phase of said chromatography column and the susceptibility of the biomaterial to cause fouling are calculated as a fouling index during the computer modelling step (c) which relates a change in yield and/or a change in product purity to the degree of fouling that is present.

33. A method as claimed in claim 21 wherein the conditions simulated in step (a) are centrifugation conditions and comprise the average residence times within a centrifuge for first and second components of input biomaterial, said first component being a material which passes through said centrifuge and said second component being a material which is sedimented out by said centrifuge.

34. A method as claimed in claim 33 comprising centrifuging said test quantity in a laboratory centrifuge device for a first period; decanting a first portion of said test quantity and measuring one or more properties thereof; centrifuging the remainder of said test quantity for a second period, and measuring one or more properties of the remainder of said test quantity.

35. A method as claimed in claim 21 wherein step (a) comprises simulating for at least two stages conditions which affect the properties of the material being processed, and wherein step (b) comprises obtaining measurements of the effects of simulated conditions on a test quantity of biomaterial obtained from an earlier stage of simulation.

36. A method according to claim 21 including the additional step of performing pilot scale trials prior to performing the industrial scale bioprocess.

37. A method of producing a product comprising the steps of generating operating parameters according to the method of any one of claims 21 to 35, or 36, further comprising operating a multiple stage industrial scale bioprocess in accordance with the operating parameters thus obtained.

* * * * *

UNITED STATES PATENT AND TRADEMARK OFFICE
CERTIFICATE OF CORRECTION

PATENT NO.         : 7,099,721 B2
APPLICATION NO. : 10/312447
DATED              : August 29, 2006
INVENTOR(S)       : Peter Dunnill et al.

It is certified that error appears in the above-identified patent and that said Letters Patent is hereby corrected as shown below:

In claim 15, column 56, line 3, "14 further" should read -- 14, further --.

Signed and Sealed this

Fifth Day of December, 2006

JON W. DUDAS
*Director of the United States Patent and Trademark Office*